(12) United States Patent
Horiuchi

(10) Patent No.: US 11,102,073 B2
(45) Date of Patent: Aug. 24, 2021

(54) INFORMATION PROCESSING SYSTEM, DEVICE REGISTRATION METHOD, INFORMATION PROCESSING DEVICE, COMMUNICATION TERMINAL, AND CONTROL METHOD AND CONTROL PROGRAM THEREFOR

(71) Applicant: NEC Corporation, Tokyo (JP)

(72) Inventor: Sho Horiuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 498 days.

(21) Appl. No.: 16/069,539

(22) PCT Filed: Dec. 21, 2016

(86) PCT No.: PCT/JP2016/088181
§ 371 (c)(1),
(2) Date: Jul. 12, 2018

(87) PCT Pub. No.: WO2017/126282
PCT Pub. Date: Jul. 27, 2017

(65) Prior Publication Data
US 2019/0014004 A1 Jan. 10, 2019

(30) Foreign Application Priority Data

Jan. 18, 2016 (JP) .............................. JP2016-007354

(51) Int. Cl.
*H04L 12/24* (2006.01)
*G06F 13/00* (2006.01)

(52) U.S. Cl.
CPC .......... *H04L 41/0883* (2013.01); *G06F 13/00* (2013.01); *H04L 41/0893* (2013.01); *H04L 41/147* (2013.01); *H04L 41/0859* (2013.01)

(58) Field of Classification Search
CPC ............. H04L 41/0883; H04L 41/0893; H04L 41/147; H04L 41/0859; G06F 13/00
(Continued)

(56) References Cited

U.S. PATENT DOCUMENTS

2006/0262665 A1* 11/2006 Cho ...................... G06F 3/1247
369/1
2007/0210916 A1* 9/2007 Ogushi .............. G06Q 10/0875
340/531
(Continued)

FOREIGN PATENT DOCUMENTS

JP 2007-243478 A 9/2007
JP 2008-217612 A 9/2008
(Continued)

OTHER PUBLICATIONS

International Search Report for PCT Application No. PCT/JP2016/088181, dated Mar. 21, 2017.
(Continued)

*Primary Examiner* — Kevin T Bates
*Assistant Examiner* — Chen-Liang Huang
(74) *Attorney, Agent, or Firm* — Sughrue Mion, PLLC

(57) ABSTRACT

The present invention relates to an information processing device that estimates processing rules for a connected device and simplifies the registration of link information, thereby simplifying device connection. This information processing device comprises: a storage unit that stores a history of relationships between device data received from a device and processing rules registered for the device; an estimation unit that, if a processing rule for processing the connected device has not been registered, references the history to estimate a processing rule for a connected device on the basis of device data received from the connected device; and a registration unit that registers the processing rule estimated
(Continued)

by the estimation unit in association with identification information of the connected device.

13 Claims, 42 Drawing Sheets

(58) Field of Classification Search
USPC .......................................................... 709/220
See application file for complete search history.

(56) References Cited

U.S. PATENT DOCUMENTS

2014/0214914 A1* 7/2014 Alex .................... G06F 9/5033
                                                                            709/201
2016/0142493 A1    5/2016  Moriguchi et al.

FOREIGN PATENT DOCUMENTS

| JP | 2011-180809 A | 9/2011 |
| JP | 2012-164369 A | 8/2012 |
| JP | 2015-028742 A | 2/2015 |

OTHER PUBLICATIONS

English translation of Written opinion for PCT Application No. PCT/JP2016/088181.

* cited by examiner

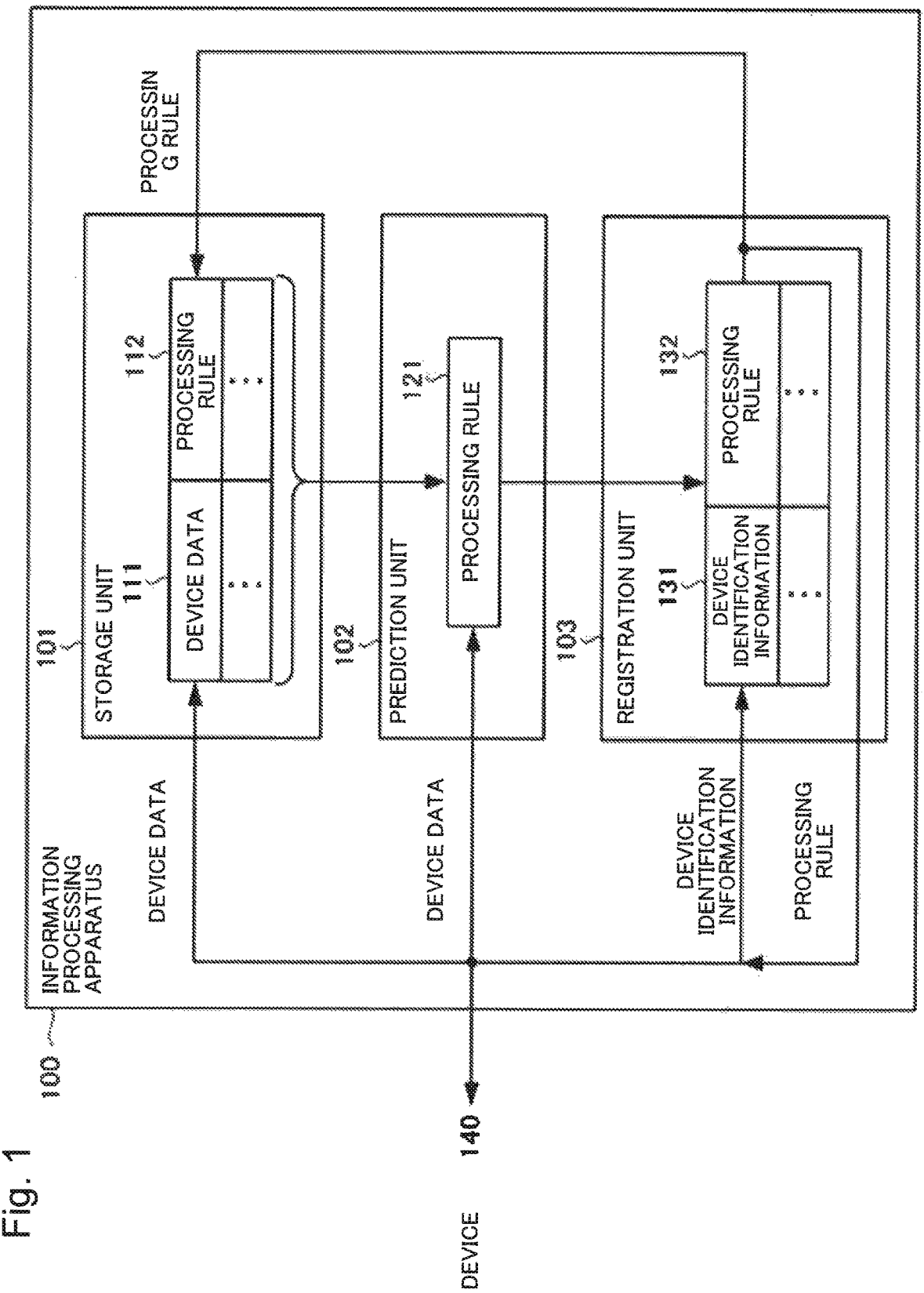

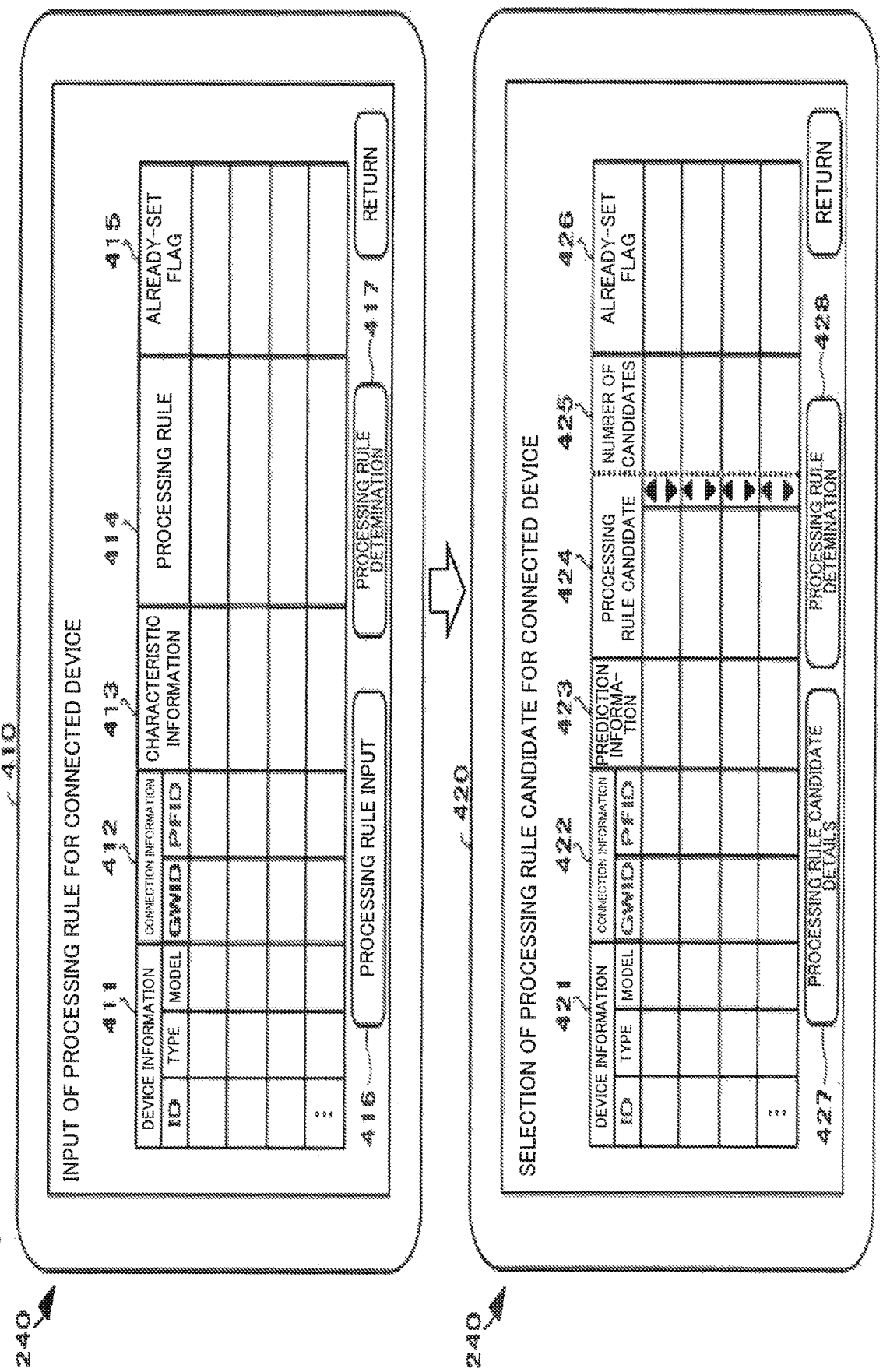

| DEVICE ID (1101) | PROCESSING RULE (1102) |
|---|---|
| 001 | TEMPERATURE INFORMATION IS ACCUMULATED AND AVERAGE VALUE IS CALCULATED |
| 002 | NOTIFICATION TO COMMON RF IS MADE WHEN THRESHOLD △△ IS EXCEEDED |
| 003 | CONVERSION TO □□ FORMAT IS EXECUTED |
| ⋮ | |

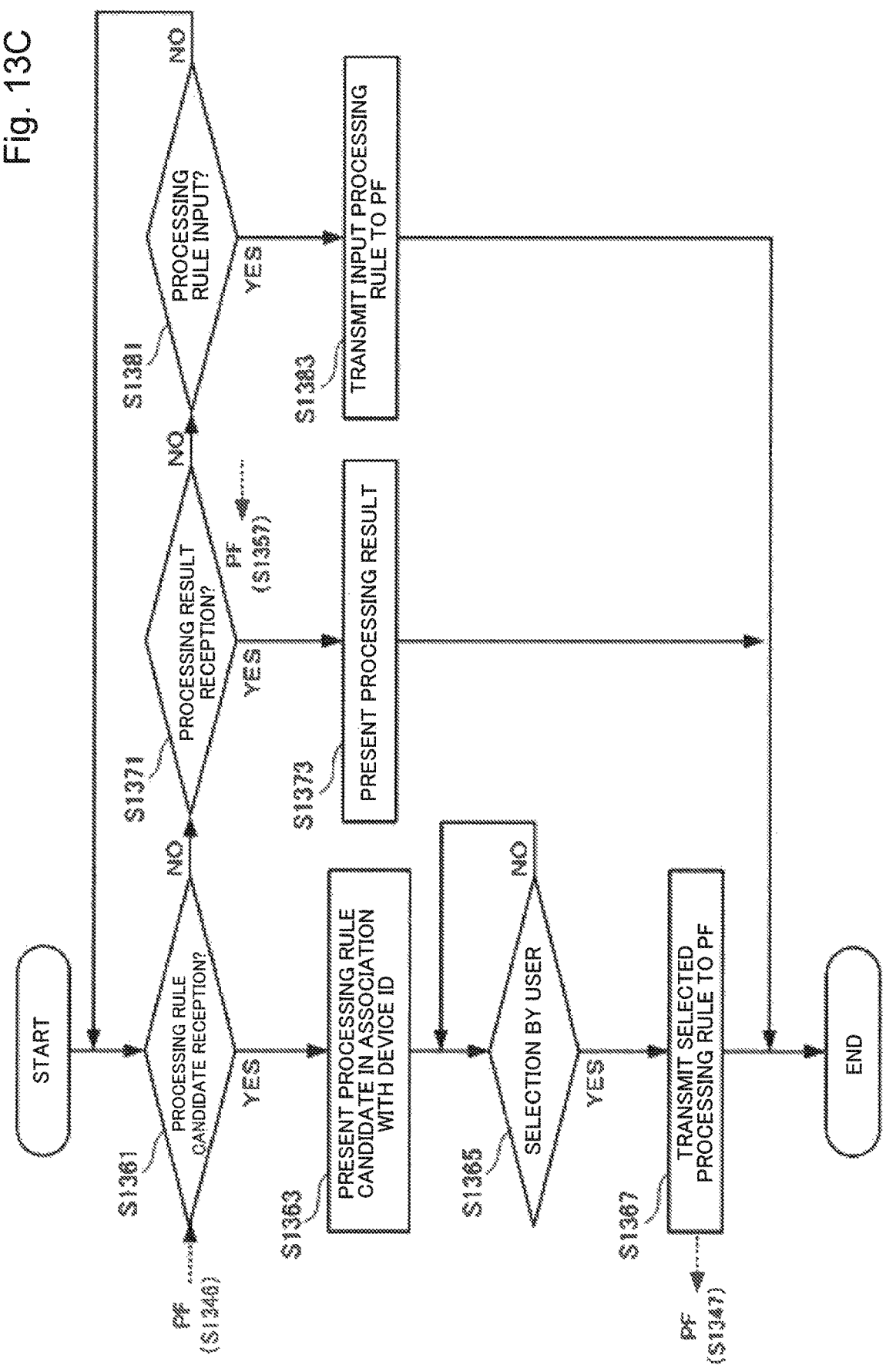

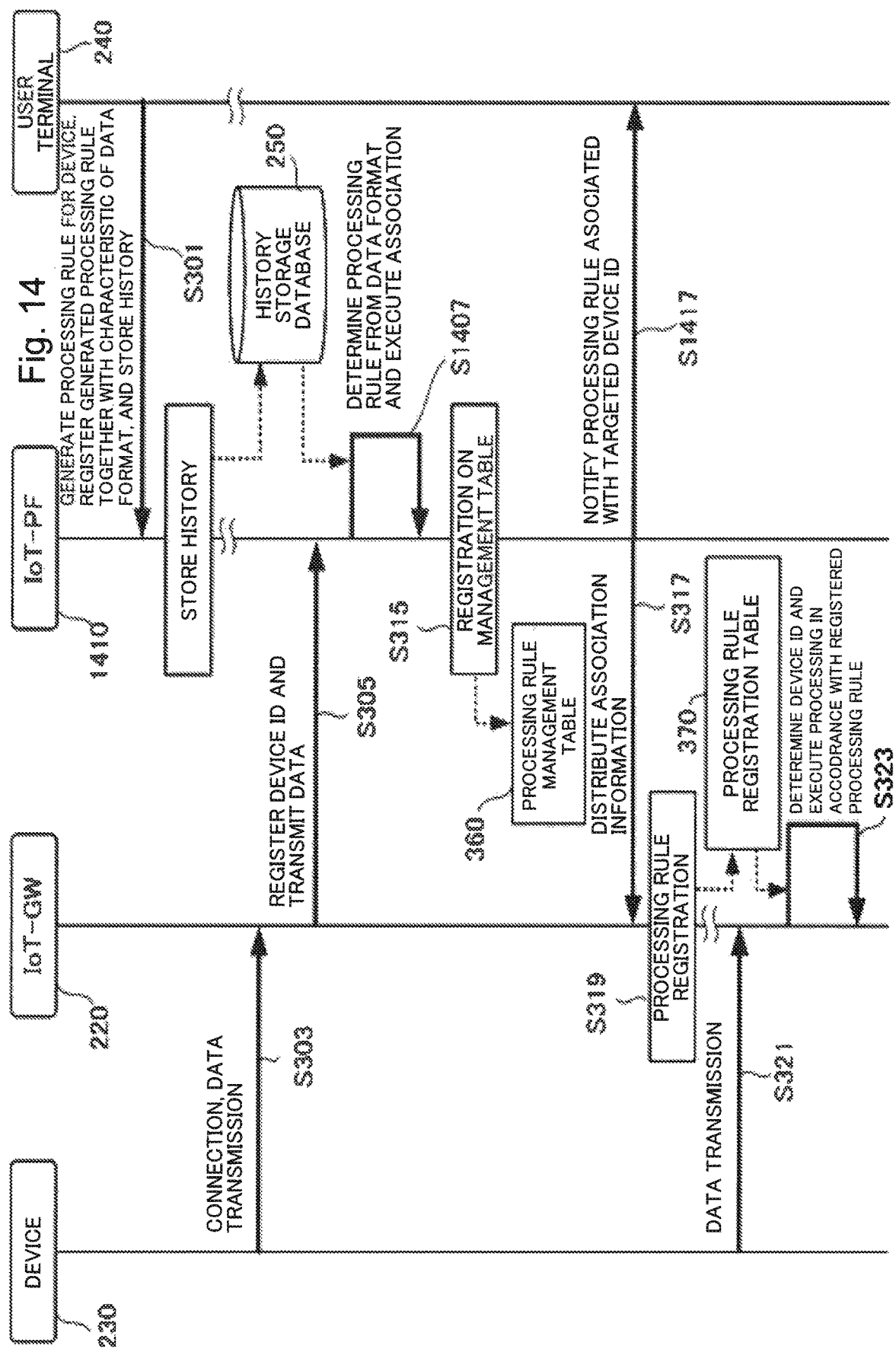

Fig. 19C

| FIRST DEVICE ID 1941 | SECOND DEVICE ID 1942 | ... | Nth DEVICE ID 1943 | PROCESSING RULE 1944 |
|---|---|---|---|---|
| 001 | | | | TEMPERATURE INFORMATION IS ACCUMULATED AND AVERAGE VALUE IS CALCULATED |
| 002 | | | | WHEN THRESHOLD △△ IS EXCEEDED, NOTIFICATION TO COMMON RF IS MADE |
| 003 | | | | CONVERSION TO □□ FORMAT IS EXECUTED |
| ... | | | | |
| 001 | 002 | | | HEAT STROKE INDEX IS CALCULATED FROM TEMPERATURE/HUMIDITY |
| | 002 | | 00n | POSITION INFORMATION IS NOT TRANSMITTED FOR COMMUNICATION AMOUNT REDUCTION |
| ... | | | | |

1860, 1870

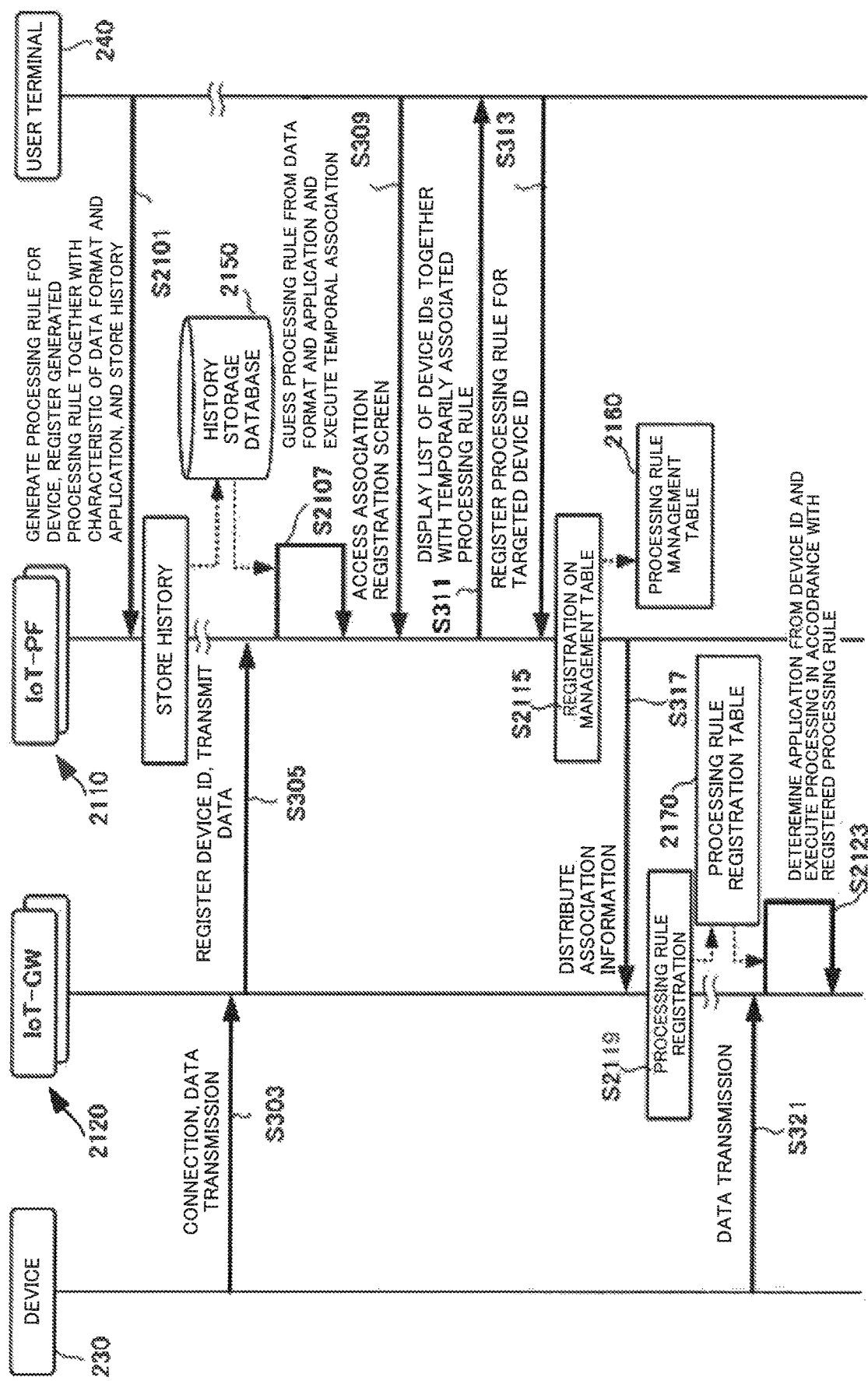

Fig. 25B

| DEVICE ID | PREDICTION INFORMATION OF DEVICE | GATEWAY ID | PROCESSING RULE CANDIDATE | CON-CORD-ANCE RATE |
|---|---|---|---|---|
| 1001 | 1002 | 2532 | 1003 | 1004 |
| | | | | |
| | ... | | ... | |
| | | | | |

INFORMATION PROCESSING SYSTEM, DEVICE REGISTRATION METHOD, INFORMATION PROCESSING DEVICE, COMMUNICATION TERMINAL, AND CONTROL METHOD AND CONTROL PROGRAM THEREFOR

This application is a National Stage Entry of PCT/JP2016/088181 filed on Dec. 21, 2016, which claims priority from Japanese Patent Application 2016-007354 filed on Jan. 18, 2016, the contents of all of which are incorporated herein by reference, in their entirety.

TECHNICAL FIELD

The present invention relates to an information processing system, a device registration method, an information processing apparatus, a communication terminal, and a control method and a control program therefor.

BACKGROUND ART

In the above-described technical field, PTL 1 discloses a technique in which a gateway device collects data from a sensor, executes setting processing, and transmits the execution result to a data collection server, based on various settings (of conversion/processing/threshold/determination/compression/transmission time of sensor data) transmitted from the data collection server to the gateway device.

CITATION LIST

Patent Literature

PTL 1: Japanese Unexamined Patent Application Publication No. 2015-028742

SUMMARY OF INVENTION

Technical Problem

However, in the technique described in the above-described document, with respect to various settings (a so-called processing rule) to a gateway device, in order to connect a new device to a gateway, a worker needs to previously set a data format and a processing rule for a gateway and a data collection server, resulting in a lot of trouble. Therefore, when a plurality of types of devices are connected to a gateway, settings for which device provides received device data and which processing rule needs to be applied are cumbersome, and therefore devices connected to a gateway are limited to devices of the same type, or devices that operate in the same protocol and the same data format even in a plurality of types, and it has been difficult for devices other than these to be easily connected.

While heretofore, these problems have potentially existed, with recent spread of Internet of things (IoT)/machine to machine (M2M) systems, the number of devices and the number of device types have increased, and therefore these problems have become further actualized than before.

An object of the present invention is to provide a technique for solving the above-described problems.

Solution to Problem

In order to solve the above object, an information processing apparatus according to the present invention includes: storage means for storing a history of a relationship between device data received from a device and a processing rule registered for the device; prediction means for referring to, when a processing rule for processing a connected device is not registered, the history and predicting a processing rule for the connected device, based on device data received from the connected device; and registration means for registering the processing rule predicted by the prediction means in association with identification information of the connected device.

In order to solve the above object, a control method for an information processing apparatus, the method includes: a storage step of storing a history of a relationship between device data received from a device and a processing rule registered for the device, on storage means; a prediction step of referring to, when a processing rule for processing a connected device is not registered, the history and predicting a processing rule for the connected device, based on device data received from the connected device; and a registration step of registering the processing rule predicted in the prediction step on registration means in association with identification information of the connected device.

In order to solve the above object, a control program for an information processing apparatus, the program causing a computer to execute: a storage step of storing a history of a relationship between device data received from a device and a processing rule registered for the device, on storage means; a prediction step of referring to, when a processing rule for processing a connected device is not registered, the history and predicting a processing rule for the connected device, based on device data received from the connected device; and a registration step of registering the processing rule predicted in the prediction step on registration means in association with identification information of the connected device.

In order to solve the above object, a communication terminal includes: candidate reception means for receiving, from an information processing apparatus, a candidate for a processing rule corresponding to identification information of a connected device, the candidate being predicted, based on device data received from the connected device, by referring to a history of a relationship between the device data stored on the information processing apparatus and a processing rule for the device; display means for displaying the received candidate for the processing rule in such a way as to enable a user to make a registration instruction; and notification means for accepting the registration instruction made by the user and notifying the information processing apparatus of a processing rule to be registered on registration means in association with the identification information of the connected device.

In order to solve the above object, a control method for a communication terminal, the method includes: a candidate reception step of receiving, from an information processing apparatus, a candidate for a processing rule corresponding to identification information of a connected device, the candidate being predicted, based on device data received from the connected device, by referring to a history of a relationship between the device data stored on the information processing apparatus and a processing rule for the device; a display step of displaying the received candidate for the processing rule on display means in such a way as to enable a user to make a registration instruction; and a notification step of accepting the registration instruction made by the user and notifying the information processing apparatus of a processing rule to be registered on registration means in association with the identification information of the connected device.

In order to solve the above object, a control program for a communication terminal, the program causing a computer to execute: a candidate reception step of receiving, from an information processing apparatus, a candidate for a processing rule corresponding to identification information of a connected device, the candidate being predicted, based on device data received from the connected device, by referring to a history of a relationship between the device data stored on the information processing apparatus and a processing rule for the device; a display step of displaying the received candidate for the processing rule on display means in such a way as to enable a user to make a registration instruction; and a notification step of accepting the registration instruction made by the user and notifying the information processing apparatus of a processing rule to be registered on registration means in association with the identification information of the connected device.

In order to solve the above object, an information processing system includes: storage means for storing a history of a relationship between device data received from a device and a processing rule registered for the device; prediction means for referring to, when a processing rule for processing a connected device is not registered, the history and predicting a processing rule for the connected device, based on device data received from the connected device; presentation means for presenting the processing rule predicted by the prediction means to a user: registration instruction means for accepting a registration instruction for the presented processing rule made by the user; registration means for registering the processing rule predicted by the prediction means in association with identification information of the connected device in accordance with the accepted registration instruction; and device processing means for processing the connected device in accordance with a processing rule registered on the registration means in association with the identification information of the connected device.

In order to solve the above object, a device registration method includes: a storage step of storing a history of a relationship between device data received from a device and a processing rule registered for the device, on storage means; a prediction step of referring to, when a processing rule for processing a connected device is not registered, the history and predicting a processing rule for the connected device, based on device data received from the connected device; a presentation step of presenting the processing rule predicted in the prediction step to a user: a registration instruction step of accepting a registration instruction for the presented processing rule made by the user; a registration step of registering the processing rule predicted in the prediction step on registration means in association with identification information of the connected device in accordance with the accepted registration instruction; and a device processing step of processing the connected device in accordance with a processing rule registered on the registration means in association with the identification information of the connected device.

Advantageous Effects of Invention

According to the present invention, a processing rule for a connected device is predicted and thereby registration of association information can be simplified, and therefore connection of a device can be simplified.

BRIEF DESCRIPTION OF DRAWINGS

FIG. 1 is a block diagram illustrating a configuration of an information processing apparatus according to a first example embodiment of the present invention.

FIG. 4 is a diagram illustrating a processing rule selection screen of a user terminal according to the second example embodiment of the present invention.

FIG. 11 is a diagram illustrating a configuration of a processing rule management table/a processing rule registration table according to the second example embodiment of the present invention.

FIG. 13C is a flowchart illustrating a processing procedure of the user terminal according to the second example embodiment of the present invention.

FIG. 14 is a sequence diagram illustrating an operation procedure of a main configuration of an information processing system including an information processing apparatus according to a third example embodiment of the present invention.

FIG. 19C is a diagram illustrating a configuration of a processing rule management table/a processing rule registration table according to the fourth example embodiment of the present invention.

FIG. 21 is a sequence diagram illustrating an operation procedure of a main configuration of an information processing system including an information processing apparatus according to a fifth example embodiment of the present invention.

FIG. 25B is a diagram illustrating a configuration of a processing rule prediction table according to the sixth example embodiment of the present invention.

EXAMPLE EMBODIMENT

Figure 2A:
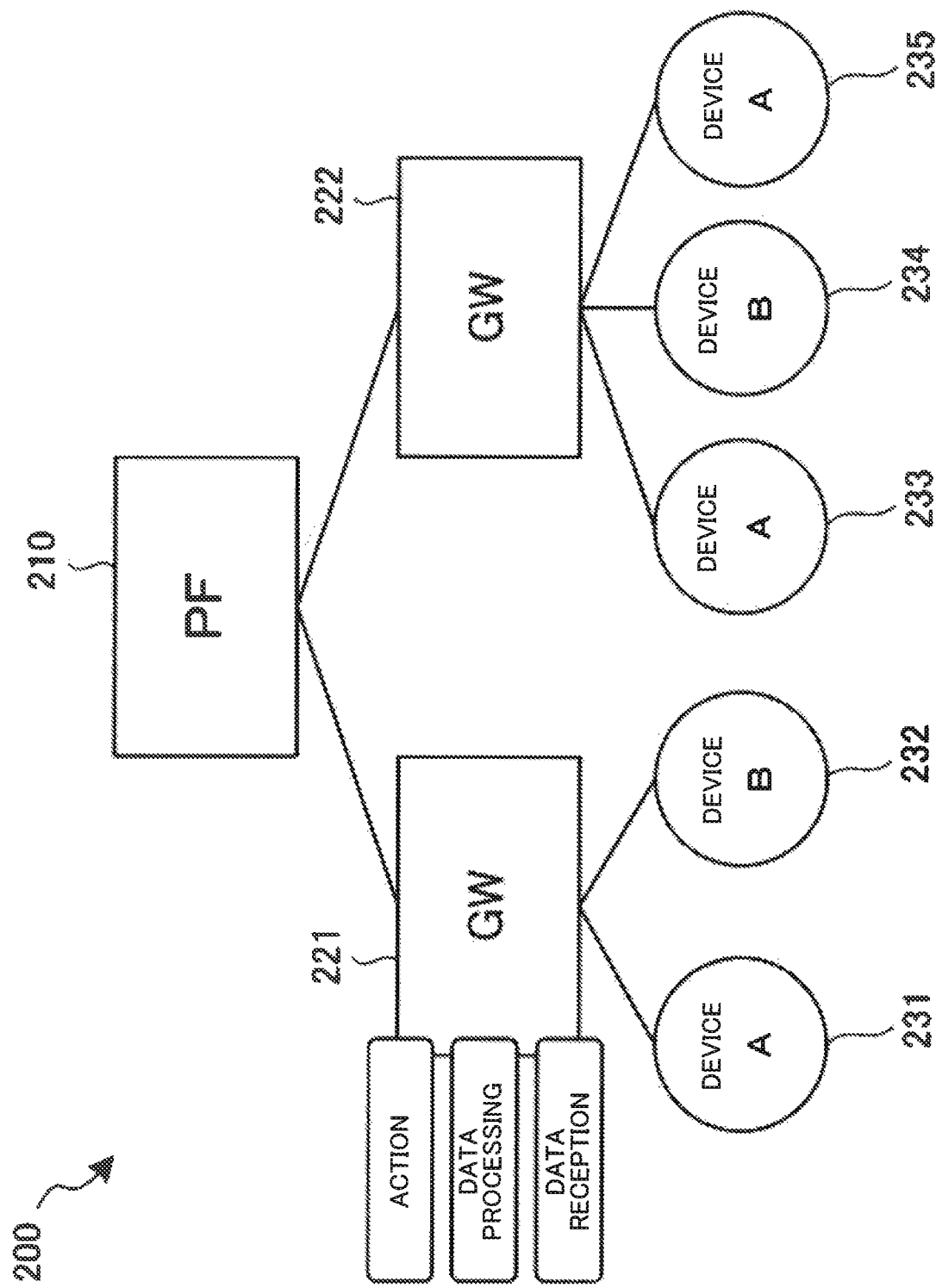
FIG. 2A is a block diagram illustrating a main configuration of an information processing system including an information processing apparatus according to a second example embodiment of the present invention.

With reference to the accompanying drawings, example embodiments of the present invention are illustratively described in detail below. However, components described in the following example embodiments are only illustrative and are not intended to limit the technical scope of the present invention only thereto.

First Example Embodiment

An information processing apparatus 100 as a first example embodiment of the present invention is described using FIG. 1. The information processing apparatus 100 is an apparatus that registers a processing rule for a connected device.

As illustrated in FIG. 1, the information processing apparatus 100 includes a storage unit 101, a prediction unit 102, and a registration unit 103. The storage unit 101 stores a history of a relationship between device data 111 received from a device 140 and a processing rule 112 registered for the device 140. The prediction unit 102 refers to, when a processing rule for processing a connected device 140 is not registered, the history and predicts a processing rule 121 for the connected device 140, based on device data received from the connected device 140. The registration unit 103 registers a processing rule 132 predicted by the prediction unit 102 in association with identification information 131 of the connected device 140.

According to the present example embodiment, a processing rule for a connected device is predicted and thereby registration of association information can be simplified, and therefore connection of a device can be simplified.

Second Example Embodiment

Next, an information processing system including an information processing apparatus according to a second example embodiment of the present invention is described.

In an Internet of things (IoT) system or a machine to machine (M2M) system of the information processing system including the information processing apparatus according to the present example embodiment, a processing rule for processing data collected from a connected device is predicted based on device data acquired upon connection, subjected to device registration, and set by a simple user operation. In other words, a history of a processing rule associated with characteristic information of data collection included in device data is stored, and thereby a processing rule is predicted by using the characteristic information as prediction information. A user (system operator) selects an appropriate processing rule from predicted processing rule candidates and thereby can set a processing rule for each connected device. The processing rule is not limited to a rule for processing data collected from a connected device, but also includes processing of data for a connected device and processing for controlling a device (e.g. firmware of a device).

A configuration example in which a processing rule management table that manages a processing rule in the present example embodiment is stored on an IoT-platform (PF) and is developed on an IoT-gateway (GW) is described and a key of the processing rule management table is assumed to be a media access control (MAC) address, without limitation to these matters. An IoT-PF and an IoT-GW may be described as a PF and a GW for abbreviation, respectively.

<<Information Processing System>>

With reference to FIG. 2A to FIG. 5C, an outline of a configuration and an operation of the information processing system including the information processing apparatus of the present example embodiment is described.

(System Block)

FIG. 2A is a block diagram illustrating a main configuration of an information processing system 200 including the information processing apparatus according to the present example embodiment.

A main configuration of the information processing system 200 includes a PF 210, GWs 221 and 222, and a plurality of device groups 231 to 235. The PF 210 is connected to a plurality of GWs 221 and 222, and controls a plurality of device groups. The GWs 221 and 222 are connected with a plurality of device groups 231 to 235. The GWs 221 and 222 collect data from the device groups and process data from each device in accordance with a predetermined processing rule. Each one of the device groups 231 to 235 is a data collection device including a sensor and the like.

Figure 2B:
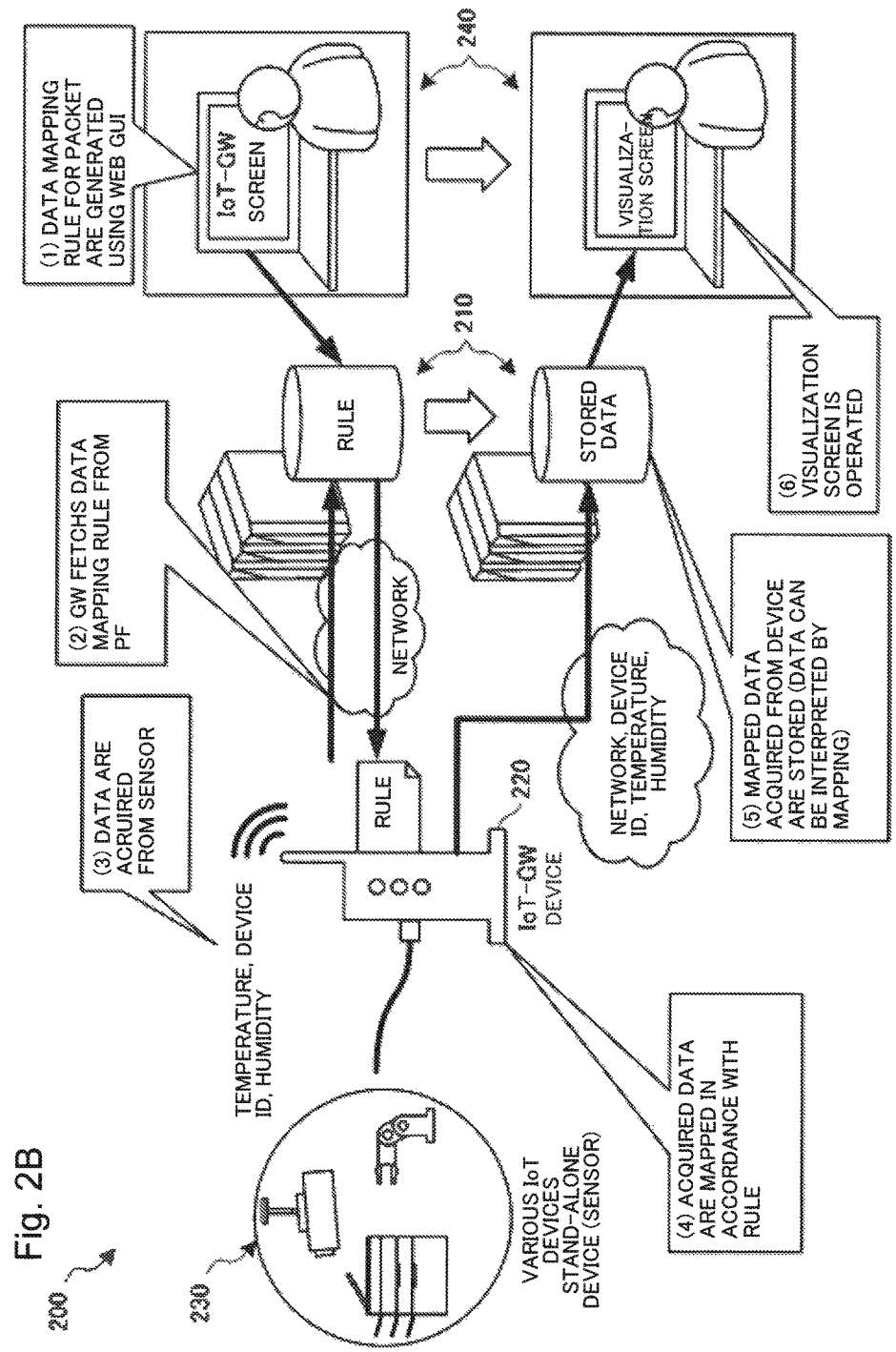
FIG. 2B is a block diagram illustrating an entire configuration of the information processing system including the information processing apparatus according to the second example embodiment of the present invention.

FIG. 2B is a block diagram illustrating an entire configuration of the information processing system 200 including the information processing apparatus according to the present example embodiment. In FIG. 2B, a component similar to a component in FIG. 2A is assigned with the same reference number, and thereby overlapping description is omitted.

The entire configuration of the information processing system 200 includes a GW 220 representing the GWs 221 and 222, a device (sensor) 230 representing the device groups 231 to 235, and a user terminal 240. The user terminal 240 is a communication terminal used by a customer or an operator of a system.

An operation outline in the entire configuration of the information processing system 200 is described below. In FIG. 2B, illustration of prediction of a processing rule of the present example embodiment is omitted. Prediction of a processing rule of the present example embodiment is described in detail in FIG. 3. (1) A customer or an operator creates a data mapping rule for a packet by using a web graphical user interface (GUI) of the user terminal 240 and stores the created rule on the PF 210. (2) The GW 220 fetches a data mapping rule corresponding to a device from the PF 210. (3) The GW 220 acquires data from a connected device 230. (4) The GW 220 maps the acquired data in accordance with a processing rule. (5) The mapped data acquired from the GW 220 are stored on the PF 210 (data become interpretable through mapping). (6) The customer or the user operates a visualization screen of the user terminal 240.

<<Operation Sequence>>

Figure 3:
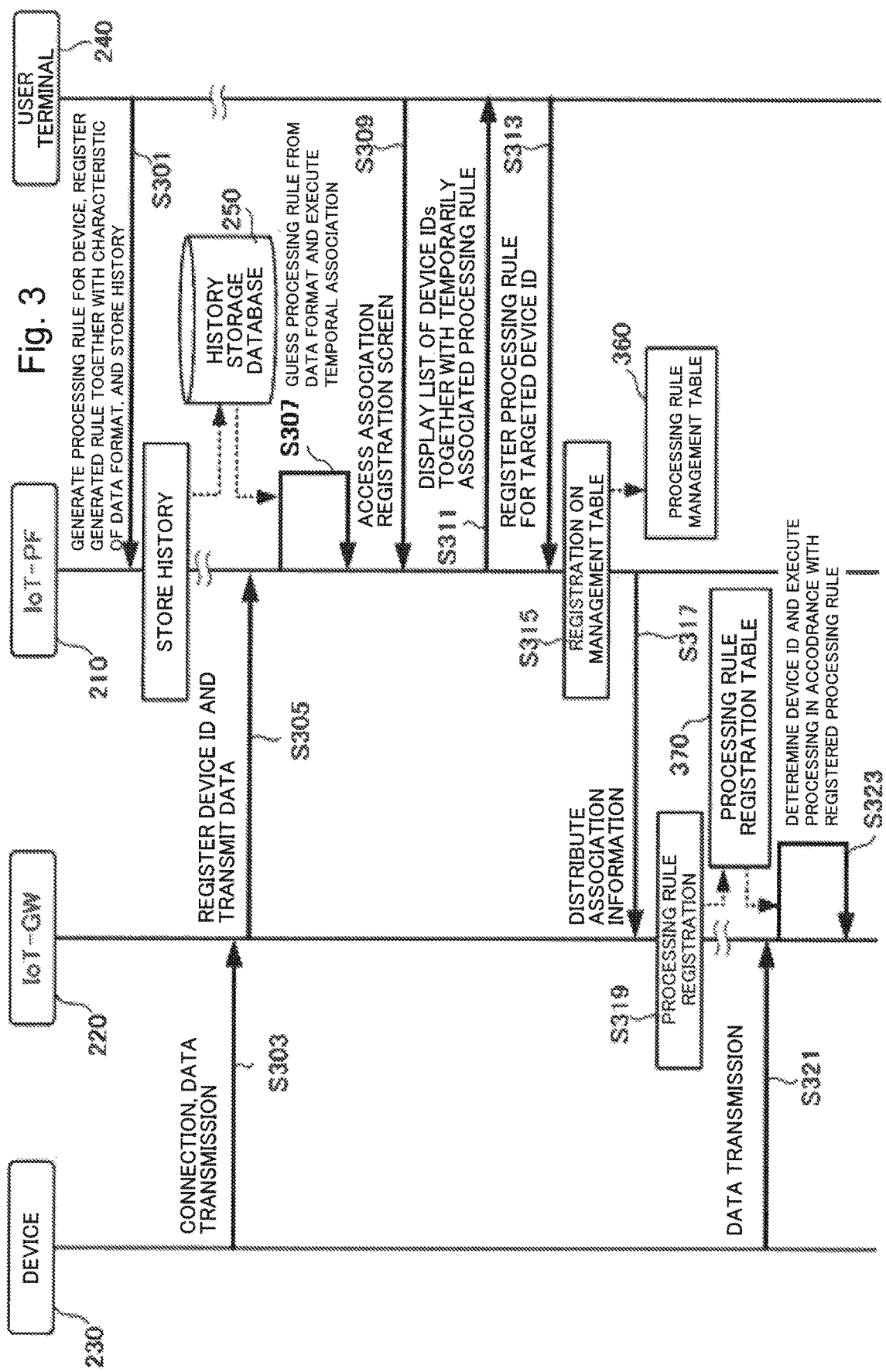
FIG. 3 is a sequence diagram illustrating an operation procedure of a main configuration of the information processing system including the information processing apparatus according to the second example embodiment of the present invention.

FIG. 3 is a sequence diagram illustrating an operation procedure of a main configuration of the information processing system 200 including the information processing apparatus according to the present example embodiment.

First, in step S301, a processing rule for each device generated as initial data is transmitted from the user terminal 240 to the IoT-PF 210 in association with characteristic information such as a characteristic of a data format and is stored on a history storage database 250 of the IoT-PF 210. This characteristic information is prediction information for predicting a processing rule for a newly connected device. The prediction information includes, for example, at least one of characteristic information (a character type, the number of characters, the number of rows, the number of columns, a delimiter, and the like) of a data format, a data transmission frequency, a file size of data, or a communication protocol (Hypertext Transfer Protocol: HTTP, File Transfer Protocol: FTP, and the like).

When receiving device data from a newly connected device 230 in step S303, in step S305, the IoT-GW 220 transmits the received data together with a device identifier (in the present example, a MAC address is used, however, the identifier has only to be an identifier capable of identifying a device and is not limited to the MAC address) to the IoT-PF 210. In step S307, the IoT-PF 210 refers to the history storage database 250 and predicts a processing rule having a high possibility for corresponding to the new device 230, based on prediction information extracted from the device data. While in FIG. 3, an example in which the IoT-PF 210 extracts prediction information from device data is described, the IoT-GW 220 may execute such extraction.

In response to an access to a registration screen from the user terminal 240 in step S309, the IoT-PF 210 notifies, in step S311, a user of the user terminal 240 of the predicted processing rule together with a MAC address read from communication information between the device 230 and the IoT-GW 220. When determining that the notified processing rule is correct, in step S313, the user issues a registration instruction to the IoT-PF 210 from the user terminal 240. A plurality of processing rule candidates may be displayed, and in this case, a user selects a correct processing rule.

The IoT-PF 210 registers, in step S315, as registration information, the processing rule selected by the user on a processing rule management table 360 in association with the MAC address and transmits the registered processing rule to the IoT-GW 220 in step S317. The IoT-GW 220 registers and stores, in step S319, the received registration information on a processing rule registration table 370 of the IoT-GW 220.

In step S321, when receiving data acquired from a newly connected device 230, the IoT-GW 220 refers to, in step S323, the registration information registered on the processing rule registration table 370, based on a device identifier (MAC address) included in the data and executes processing, based on the associated processing rule.

(Processing Rule Selection Screen)

FIG. 4 is a diagram illustrating a processing rule selection screen 420 of the user terminal 240 according to the present example embodiment. In FIG. 4, as a comparison target, a processing rule input screen 410 for conventional sequential setting of a processing rule is also illustrated.

In the processing rule input screen 410, it is necessary for a user to input and set device information 411, connection information 412, characteristic information 413, and a processing rule 414. When the input is finished, an already-set flag 415 is set by a processing rule input button 416 and a processing rule determination button 417. The device information 411 includes, for example, a device identifier (ID), a device type, a device model and the like. The connection information 412 includes a GW-ID, a PF-ID and the like. Initial processing rule setting in step S301 difficult to predict based on stored data is executed from the processing rule input screen 410.

In the processing rule selection screen 420, device information 421, connection information 422, prediction information 423 extracted from device data, and a processing rule candidate 424 and the number of candidates 425 of a prediction result are automatically displayed in response to an access from the user terminal 240. When there is a plurality of processing rule candidates 424, a scroll button (arrow) is preferably displayed. A user can view details of each processing rule candidate 424 from the processing rule selection screen 420 by using a processing rule candidate details button 427. An already-set flag 426 is set by a processing rule determination button 428.

In this manner, in the present example embodiment, a processing rule for a new device is predicted from a processing rule of a stored history, whereby a processing rule can be simply set and the device can be simply connected.

(Processing Rule Prediction Procedure)

Figure 5A:
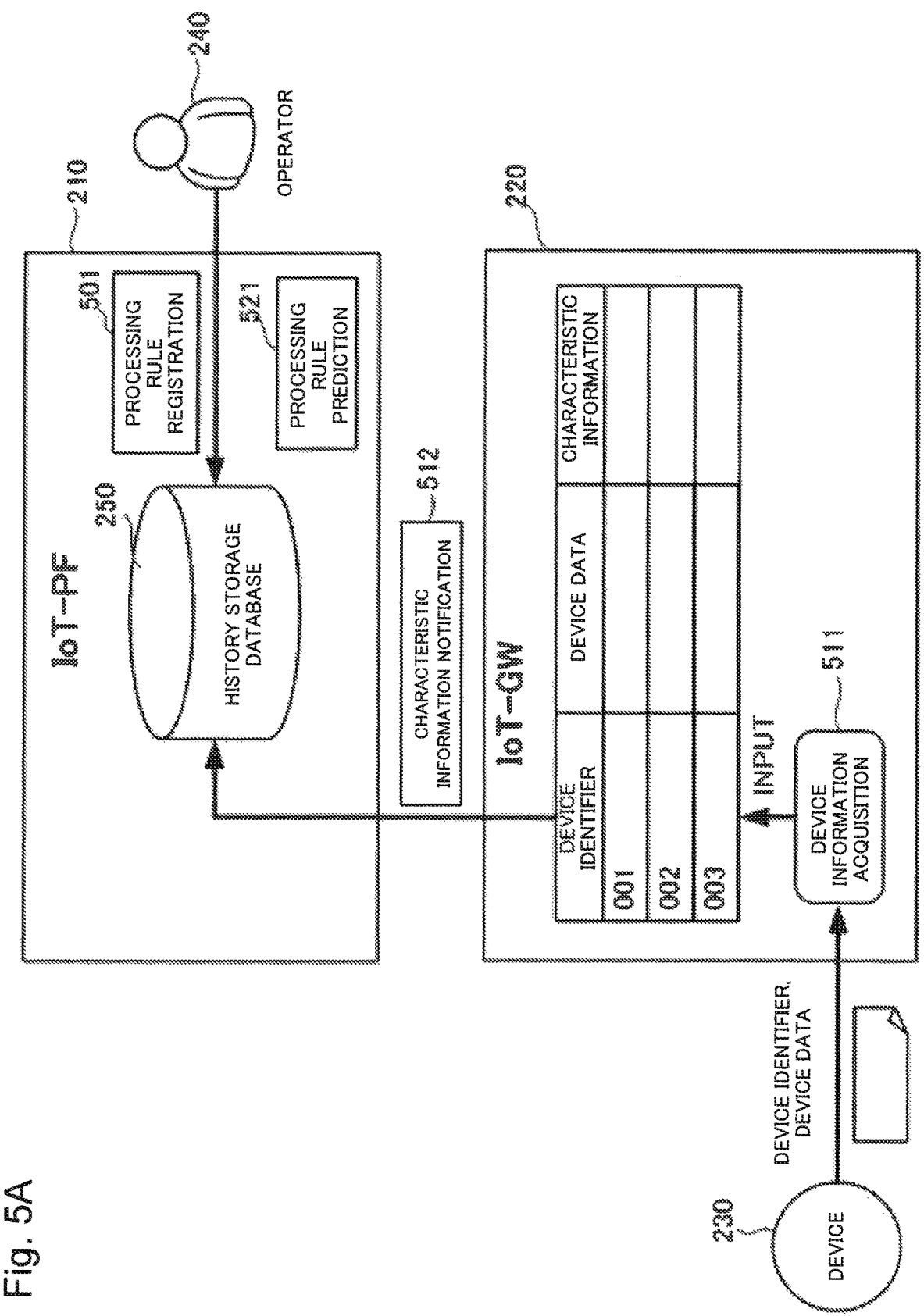
FIG. 5A is a diagram illustrating a processing rule prediction procedure of a main configuration of the information processing system including the information processing apparatus according to the second example embodiment of the present invention.

FIG. 5A is a diagram illustrating a processing rule prediction procedure of a main configuration of the information processing system 200 including the information processing apparatus according to the present example embodiment.

Processing rule registration 501 indicates processing in which a user (operator) executes sequential input from the user terminal 240. A sequentially input processing rule is stored on the history storage database 250 in association with characteristic information (prediction information) of a device.

When a new device 230 is connected, the IoT-GW 220 acquires device data together with a device identifier (511), extracts characteristic information, and notifies the IoT-PF 210 of the extracted information (512). The IoT-PF 210 predicts a processing rule from a relationship between characteristic information of a device and a processing rule stored on the history storage database 250 (521). While in FIG. 5A, an example in which the IoT-GW 220 extracts characteristic information is illustrated, the IoT-PF 210 may extract characteristic information. Information simply interpreted in characteristic information may be extracted in the IoT-GW 220 and information that needs a time elapse such as a cycle may be extracted in the IoT-PF 210.

Figure 5B:
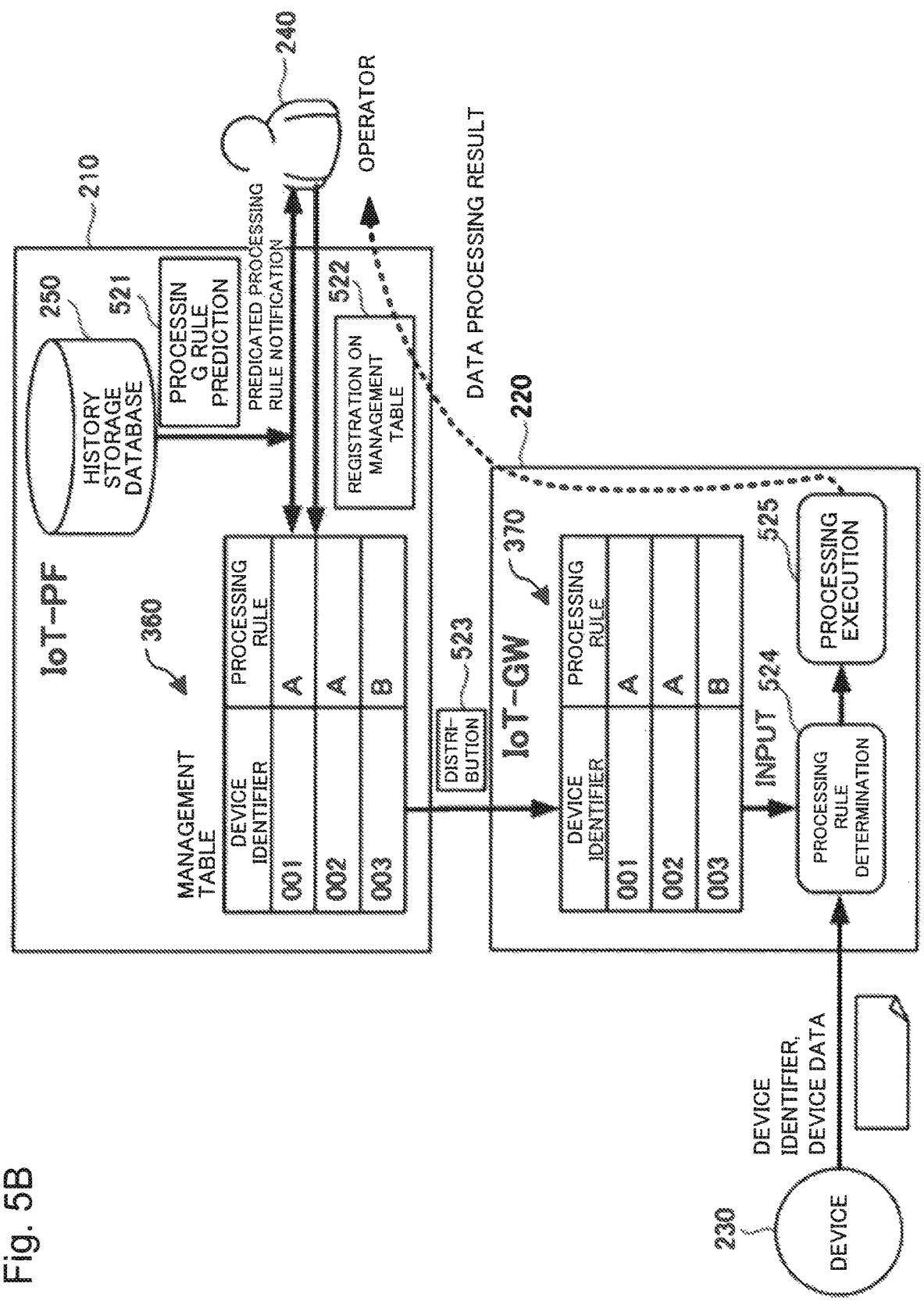
FIG. 5B is a diagram illustrating a processing rule registration procedure of a main configuration of the information processing system including the information processing apparatus according to the second example embodiment of the present invention.

(Processing Rule Registration Procedure) FIG. 5B is a diagram illustrating a processing rule registration procedure of a main configuration of the information processing system 200 including the information processing apparatus according to the present example embodiment.

A result of processing rule prediction 521 is transmitted from the IoT-PF 210 to the user terminal 240, and awaits selection or confirmation by a user. When selection or confirmation by the user is performed in the user terminal 240, the result is registered (522) on a processing rule management table 360 of the IoT-PF 210, the table managing a processing rule in association with a new device ID. A processing rule associated with a device ID registered on the processing rule management table 360 is distributed (523) from the IoT-PF 210 to the IoT-GW 220 and is registered on a processing rule registration table 370 of the IoT-GW 220. The processing rule registration table 370 may include a content similar to a content of the processing rule management table 360 or a content selected correspondingly to the IoT-GW 220. When the processing rule registration table 370 includes a content similar to a content of the processing rule management table 360, a processing rule corresponding to a device ID is used regardless of which IoT-GW 220 a device is connected to.

When data acquired from a device 230 is transmitted, an appropriate processing rule is acquired from the processing rule registration table 370 in association with a device ID (524) and the received data are executed in the IoT-GW 220, based on the acquired processing rule (525). The data processed in accordance with the processing rule are transmitted from the IoT-GW 220 to the IoT-PF 210 and collected, further subjected to processing in accordance with an application, and notified from the user terminal 240 to the user. Alternatively, it is possible that the data are stored on a superordinate application server and another application processing is executed.

(Processing Rule Execution Procedure)

Figure 5C:
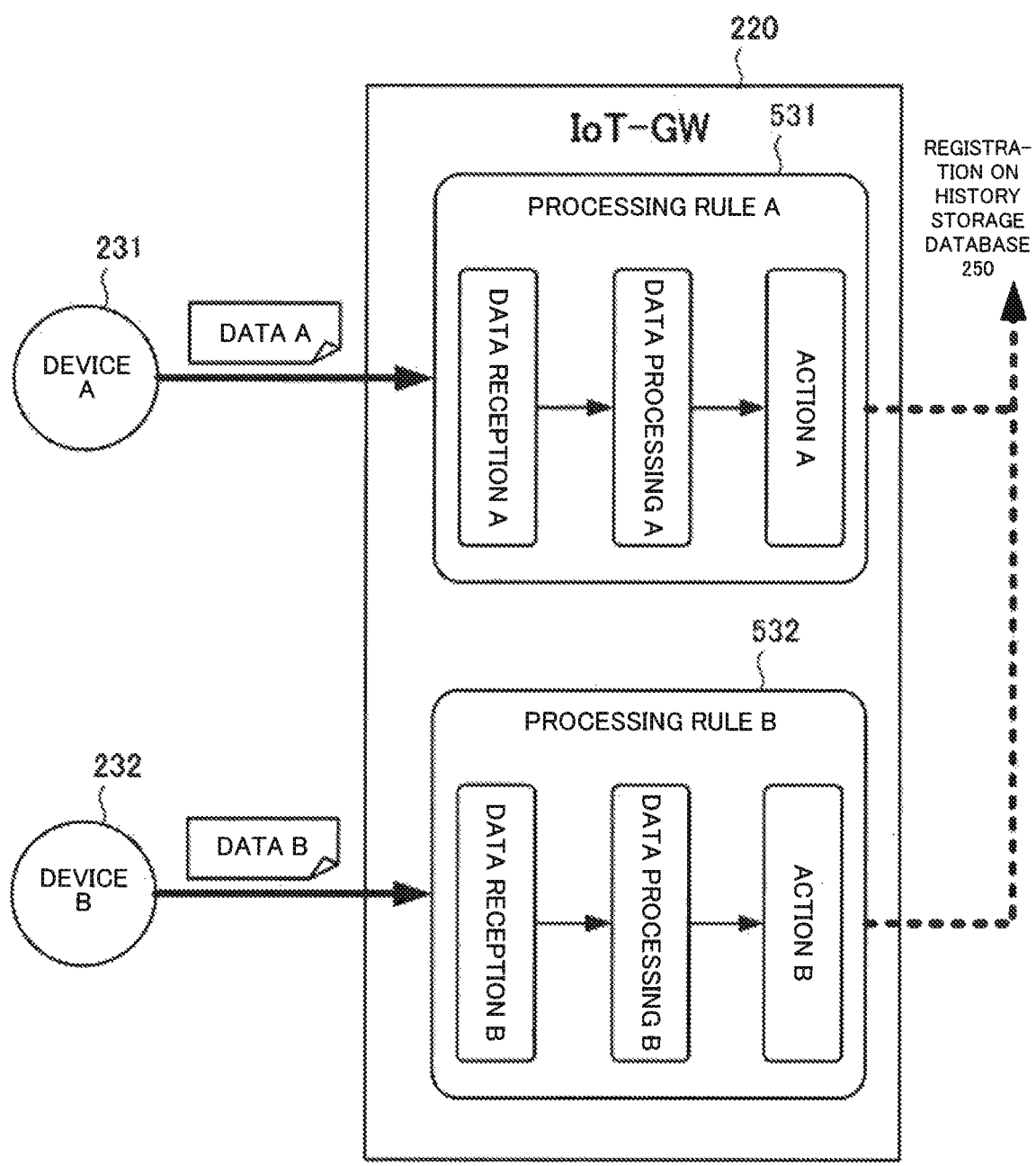
FIG. 5C is a diagram illustrating a processing rule execution procedure of a main configuration of the information processing system including the information processing apparatus according to the second example embodiment of the present invention.

FIG. 5C is a diagram illustrating a processing rule execution procedure of a main configuration of the information processing system 200 including the information processing apparatus according to the present example embodiment. A processing rule is, for example, a rule for a processing method for data acquired by a device or assignment of an operation such as issuing a warning when a predetermined threshold is exceeded.

In the IoT-GW 220, a processing rule A (531) is registered on the processing rule registration table 370 in association with an identifier of a device A (231). A processing rule B (532) is registered in association with an identifier of a device B (232). Each processing rule includes, for example, a rule for data reception, a rule for data processing, and a rule for an action.

Data received from the device 231 or the device 232 are processed in accordance with the processing rule 531 or the processing rule 532 and transmitted to the IoT-PF 210. On the other hand, a relationship between a device ID and an executed processing rule is stored on the history storage database 250 of the IoT-PF 210 and used for subsequent processing rule prediction.

(Functional Configuration of an Information Processing Apparatus)

Figure 6:
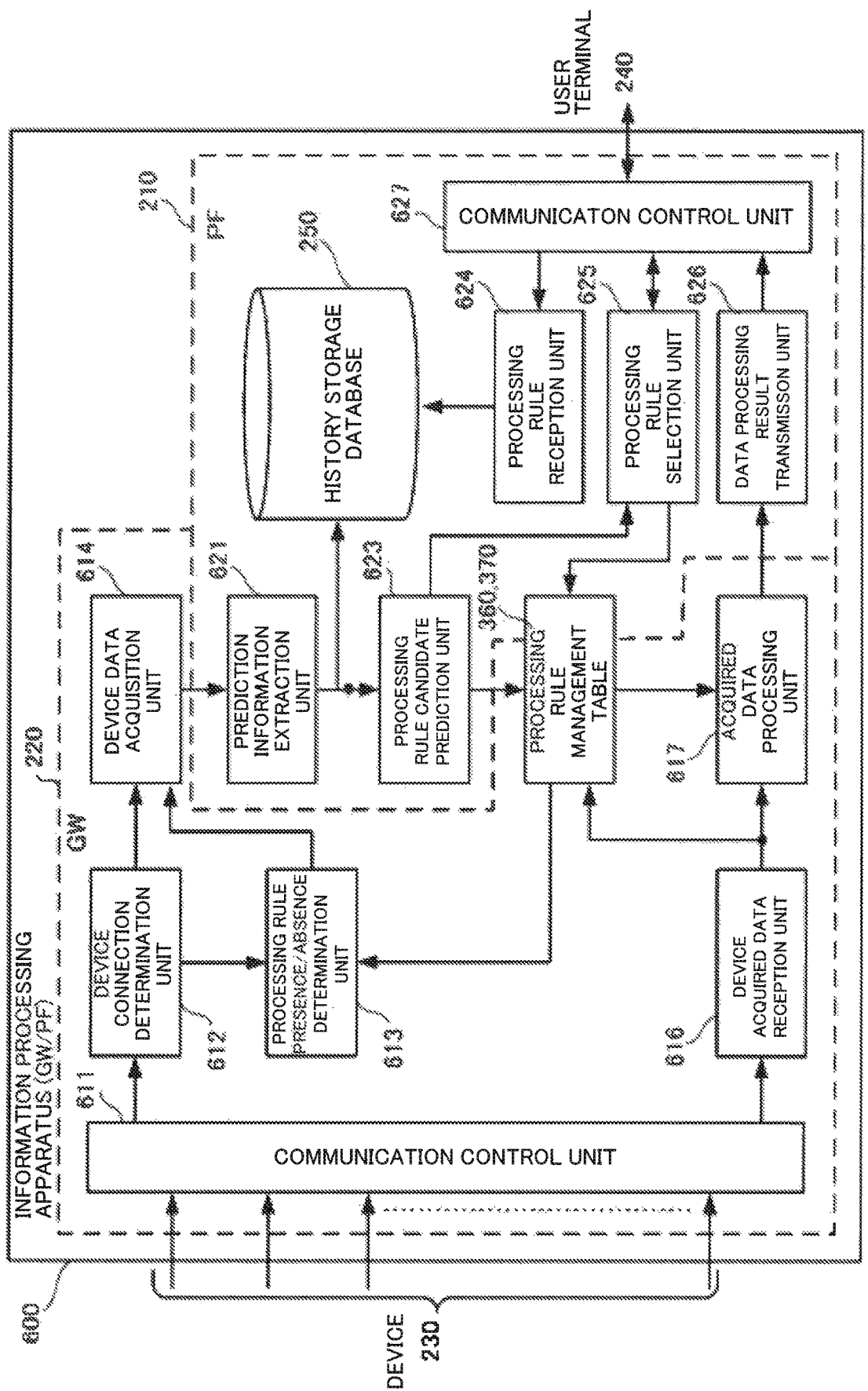
FIG. 6 is a block diagram illustrating a functional configuration of the information processing apparatus according to the second example embodiment of the present invention.

FIG. 6 is a block diagram illustrating a functional configuration of an information processing apparatus 600 according to the present example embodiment. In FIG. 6, the information processing apparatus 600 including the IoT-PF 210 and the IoT-GW 220 is described. Hereinafter, the IoT-PF 210 may be abbreviated as a PF 210 and the IoT-GW 220 may be abbreviated as a GW 220.

The information processing apparatus 600 includes a communication control unit 611 that executes communication control by being connected to a device 230, a device connection determination unit 612, a processing rule presence/absence determination unit 613, a processing rule management table 360 (processing rule registration table 370), a device data acquisition unit 614, a device acquired data reception unit 616, and an acquired data processing unit 617. The information processing apparatus 600 further includes a prediction information extraction unit 621, a history storage database 250, a processing rule candidate prediction unit 623, a processing rule reception unit 624, a processing rule selection unit 625, a data processing result transmission unit 626, and a communication control unit 627 that controls communication with a user terminal 240. The communication control unit 611 and the communication control unit 627 may be integrated.

The device connection determination unit 612 determines connection of a device 230 from an initial communication protocol with the device 230 and extracts a device ID. The processing rule presence/absence determination unit 613 determines whether a processing rule corresponding to a device ID is already stored on the processing rule management table 360 (processing rule registration table 370). The device data acquisition unit 614 acquires device data from the device 230. The device acquired data reception unit 616 receives data acquired by the device 230 after a processing rule is registered. The acquired data processing unit 617 acquires a processing rule corresponding to the device ID from the processing rule management table 360 (processing rule registration table 370) and processes data received from the device. In the present example embodiment, the above-described function configuring units are included in the GW 220.

The prediction information extraction unit 621 extracts prediction information that is characteristic information of device data acquired by the device data acquisition unit 614. The history storage database 250 stores a history of a relationship between prediction information extracted from device data and a processing rule. The processing rule candidate prediction unit 623 refers to a past history stored on the history storage database 250 and predicts, based on prediction information extracted from device data of a newly connected device 230, a candidate for a corresponding processing rule. The processing rule reception unit 624 receives a processing rule input from the user terminal 240 and stores the received rule on the history storage database 250. The processing rule selection unit 625 displays a processing rule candidate predicted by the processing rule candidate prediction unit on the user terminal 240 and registers a processing rule selected by a user from the user terminal 240 on the processing rule management table 360 (processing rule registration table 370). The data processing result transmission unit 626 transmits a processing result processed by the acquired data processing unit 617 in accordance with a processing rule to the user terminal 240 and notifies the user of the result. In the present example embodiment, the above-described function configuring units are included in the PF 210.

The processing rule management table 360 (processing rule registration table 370) is shared between the PF 210 and the GW 220. The function division between the PF 210 and the GW 220 is not limited to FIG. 6. The prediction information extraction unit 621 may be included in the GW 220 or partially shared between the PF 210 and the GW 220.

<<Functional Configuration of a User Terminal>>

Figure 7:
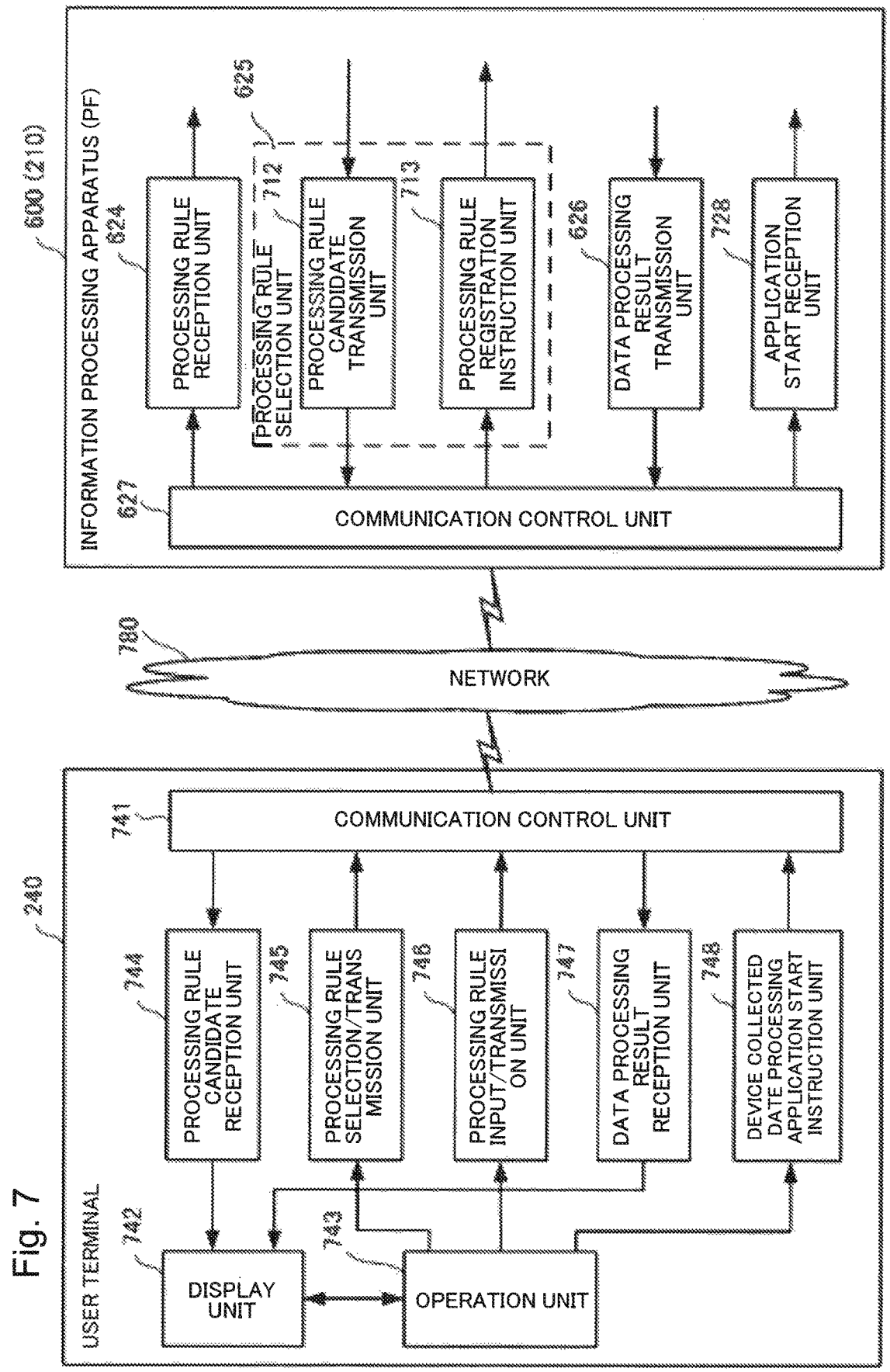
FIG. 7 is a block diagram illustrating a functional configuration of the user terminal according to the second example embodiment of the present invention.

FIG. 7 is a block diagram illustrating a functional configuration of the user terminal 240 according to the present example embodiment. In FIG. 7, a part of the PF 210 of the information processing apparatus 600 is also illustrated. A function configuring unit similar to a function configuring unit in FIG. 6 is assigned with the same reference sign, and thereby overlapping description is omitted.

The user terminal 240 includes a communication control unit 741 that controls communication with the information processing apparatus 600 via a network 780, a display unit 742, an operation unit 743, a processing rule candidate reception unit 744, a processing rule selection/transmission unit 745, a processing rule input/transmission unit 746, a data processing result reception unit 747, and a device collected date processing application start instruction unit 748.

The PF 210 of a corresponding information processing apparatus 600 includes a processing rule candidate transmission unit 712 and a processing rule registration instruction unit 713, configuring a processing rule selection unit 625. The PF 210 includes an application start reception unit 728 that starts an application instructed from the user terminal 240.

The display unit 742 includes a display screen such as a liquid crystal screen and displays a processing rule candidate and a data processing result. The operation unit 743 includes a touch panel, a keyboard or the like and executes an operation such as input of a processing rule, selection of a processing rule candidate, or start of an application. The processing rule candidate reception unit 744 receives a processing rule candidate from the PF 210 of the information processing apparatus 600 and displays the received candidate on the display unit 742. The processing rule selection/transmission unit 745 notifies the PF 210 of the information processing apparatus 600, of a processing rule selected by the operation unit 743, and causes the PF 210 to register the notified rule on the processing rule management table 360 (processing rule registration table 370). The processing rule input/transmission unit 746 acquires input of a processing rule and transmits the acquired rule to the PF 210 of the information processing apparatus 600 in an initial state where a history is not stored or when it is difficult to predict a processing rule. The data processing result reception unit 747 receives a processing result of data transmitted from the data processing result transmission unit 626 of the PF 210 and displays the received result on the display unit 742 in a predetermined format. The device collected date processing application start instruction unit 748 instructs, based on an operation from the operation unit 743, the application start reception unit 728 of the PF 210 to start an application that processes device collected data.

(Prediction Information Extraction Table)

Figure 8:
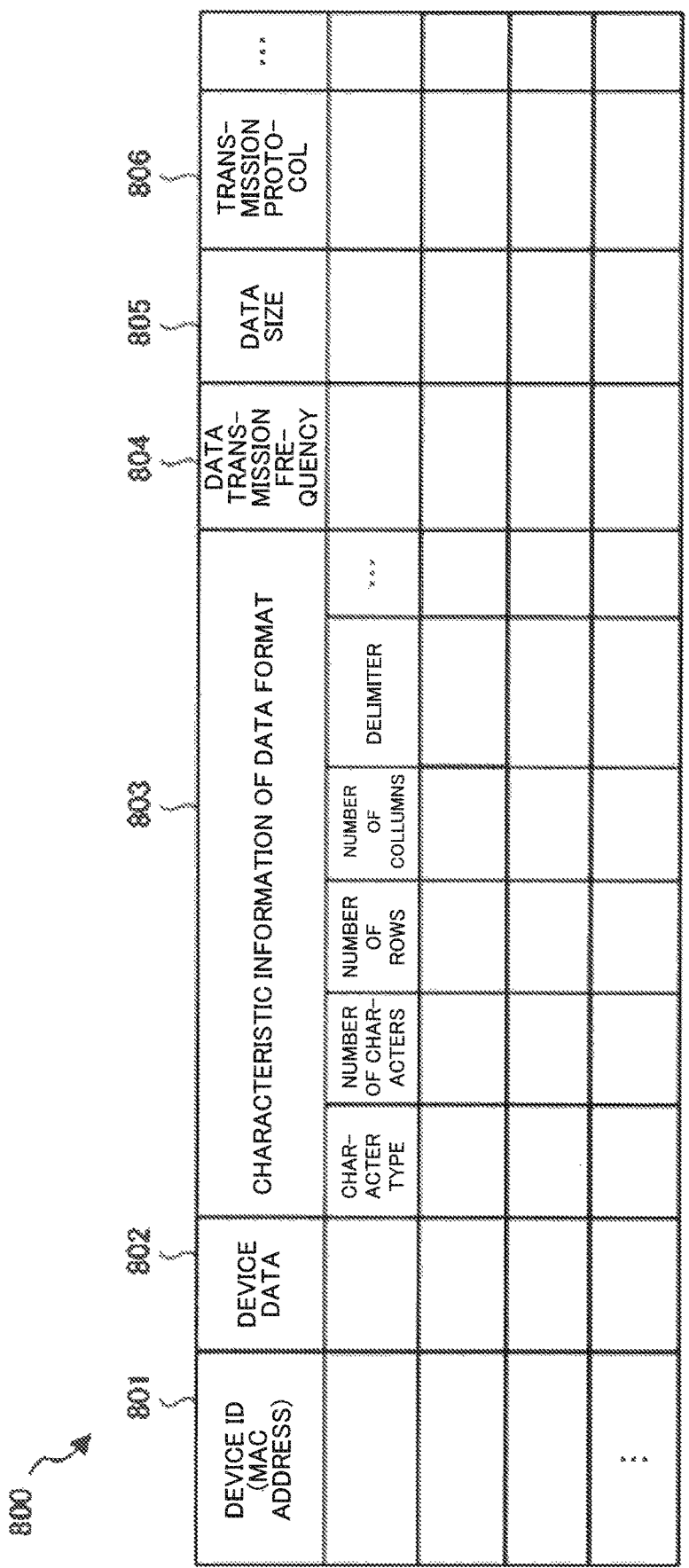
FIG. 8 is a diagram illustrating a configuration of a prediction information extraction table according to the second example embodiment of the present invention.

FIG. 8 is a diagram illustrating a configuration of a prediction information extraction table 800 according to the present example embodiment. The prediction information extraction table 800 is used in order for the prediction information extraction unit 621 to extract prediction information.

The prediction information extraction table 800 stores, in association with a device ID (e.g. a MAC address) 801, device data 802 received from a device, and characteristic information 803 of a data format, a data transmission frequency 804, a data size 805, a transmission protocol 806, and the like, as prediction information extracted, acquired, or generated from the device data 802. The characteristic information 803 of a data format includes, for example, a character type, the number of characters, the number of rows, the number of columns, and a delimiter.

As prediction information extracted, acquired, or generated from the device data 802, •option information of a communication protocol: e.g. a method of an HTTP protocol, •a file format (extension): e.g. an extensible markup language (XML) and comma-separated values (CSV), •a presence or absence of a specific character string: e.g. a specific tag in XML, •a transmission time: e.g. transmission at 9 o'clock and 17 o'clock every day, •a GW of a transmission destination (or a PF or an application), and •a vender code of a transmission source MAC address are used, and thereby a more appropriate processing rule can be predicted. These pieces of prediction information are stored on a history storage database 250 in FIG. 9 and used for predicting a processing rule in a processing rule prediction table 1000 in FIG. 10.

(History Storage Database)

Figure 9:
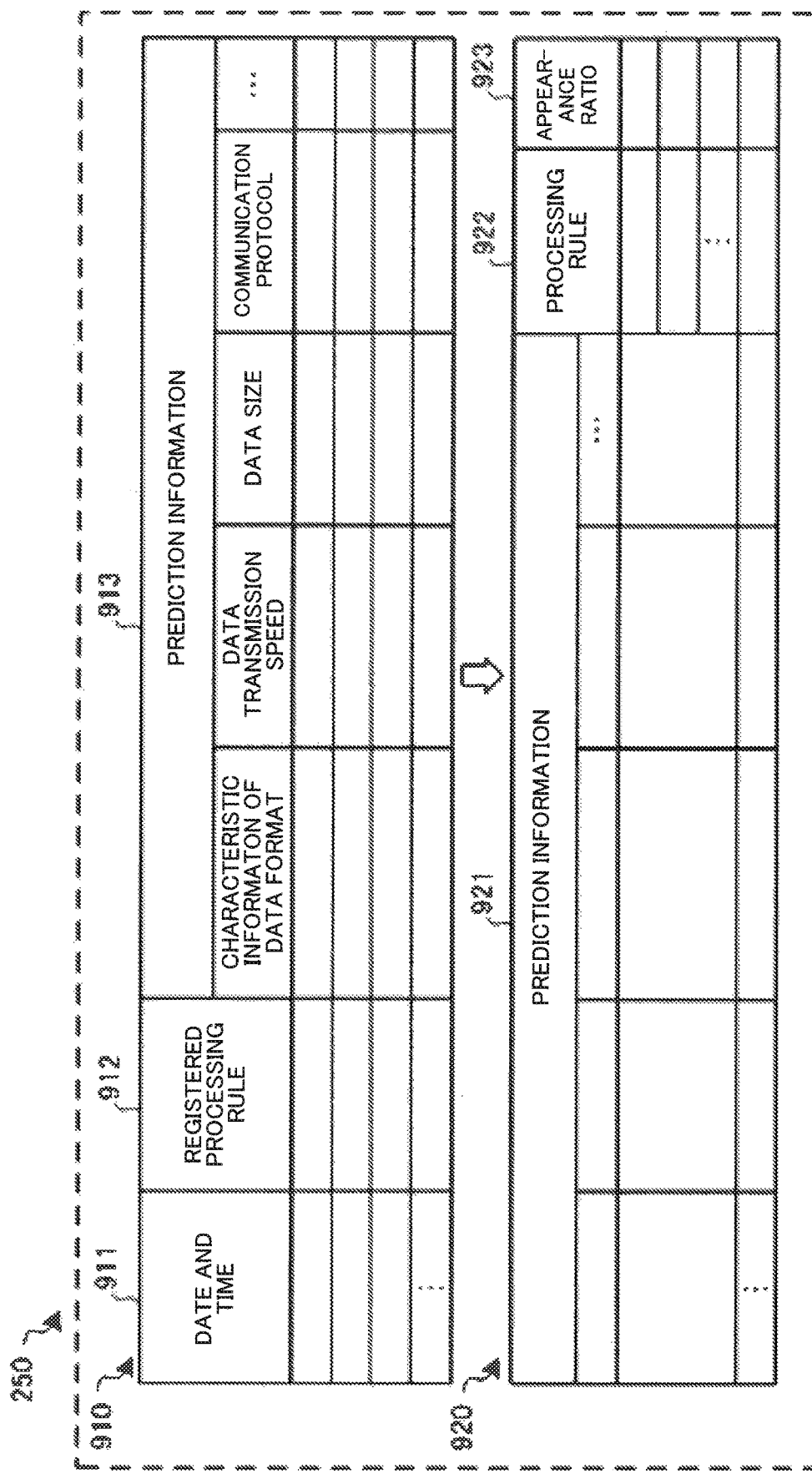
FIG. 9 is a diagram illustrating a configuration of a history storage database according to the second example embodiment of the present invention.

FIG. 9 is a diagram illustrating a configuration of the history storage database 250 according to the present example embodiment. The history storage database 250 is used for storing a history of a relationship between prediction information and a processing rule and predicting a processing rule to be set and registered for a new device. The history storage database 250 includes a history storage area 910 that stores a history of a relationship between prediction information and a processing rule and a prediction table 920 for predicting a processing rule from a history stored on the history storage area 910.

The history storage area 910 stores a registered processing rule 912 and corresponding prediction information 913 in association with a stored date and time 911. The prediction table 920 stores a plurality of possible processing rules 922 and appearance ratios thereof 923 in association with prediction information 921.

(Processing Rule Prediction Table)

Figure 10:
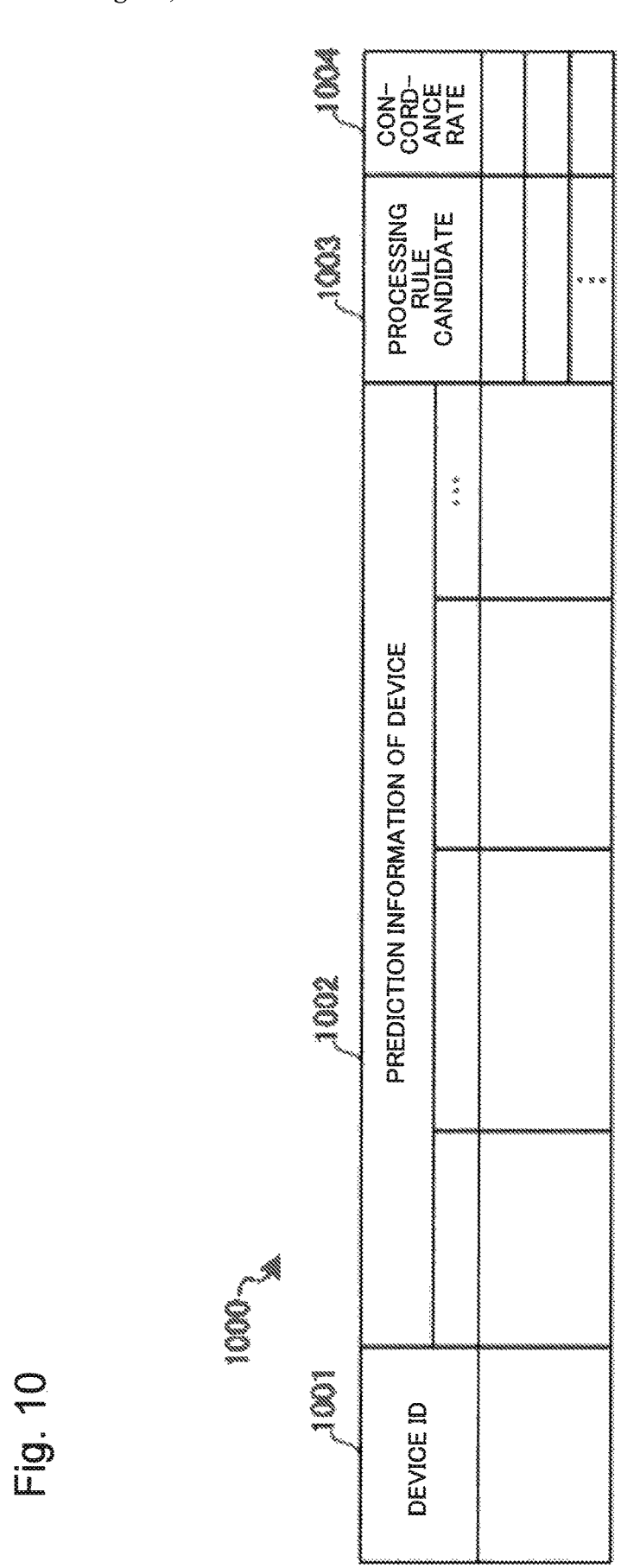
FIG. 10 is a diagram illustrating a configuration of a processing rule prediction table according to the second example embodiment of the present invention.

FIG. 10 is a diagram illustrating a configuration of a processing rule prediction table 1000 according to the present example embodiment. The processing rule prediction table 1000 is used in order for the processing rule candidate prediction unit 623 to predict a processing rule candidate corresponding to prediction information from each device.

The processing rule prediction table 1000 stores a plurality of processing rule candidates 1003 and concordance rates thereof 1004 in association with a device ID 1001 and prediction information 1002 extracted from device data thereof.

(Processing Rule Management Table/Processing Rule Registration Table)

FIG. 11 is a diagram illustrating a configuration of the processing rule management table 360/the processing rule registration table 370 according to the present example embodiment. The processing rule management table 360/the processing rule registration table 370 is used for storing a processing rule corresponding to a device ID and processing data from a connected device in the acquired data processing unit 617.

The processing rule management table 360/the processing rule registration table 370 stores a processing rule 1102 selected from processing rule candidates and registered in association with a device ID 1101. In FIG. 11, as an example of a processing rule, a rule for processing data collected from a device is illustrated, but a processing rule for data to be output to a device or a processing rule (e.g. firmware of a device) for controlling a device is employable.

<<Hardware Configuration of a Platform>>

Figure 12A:
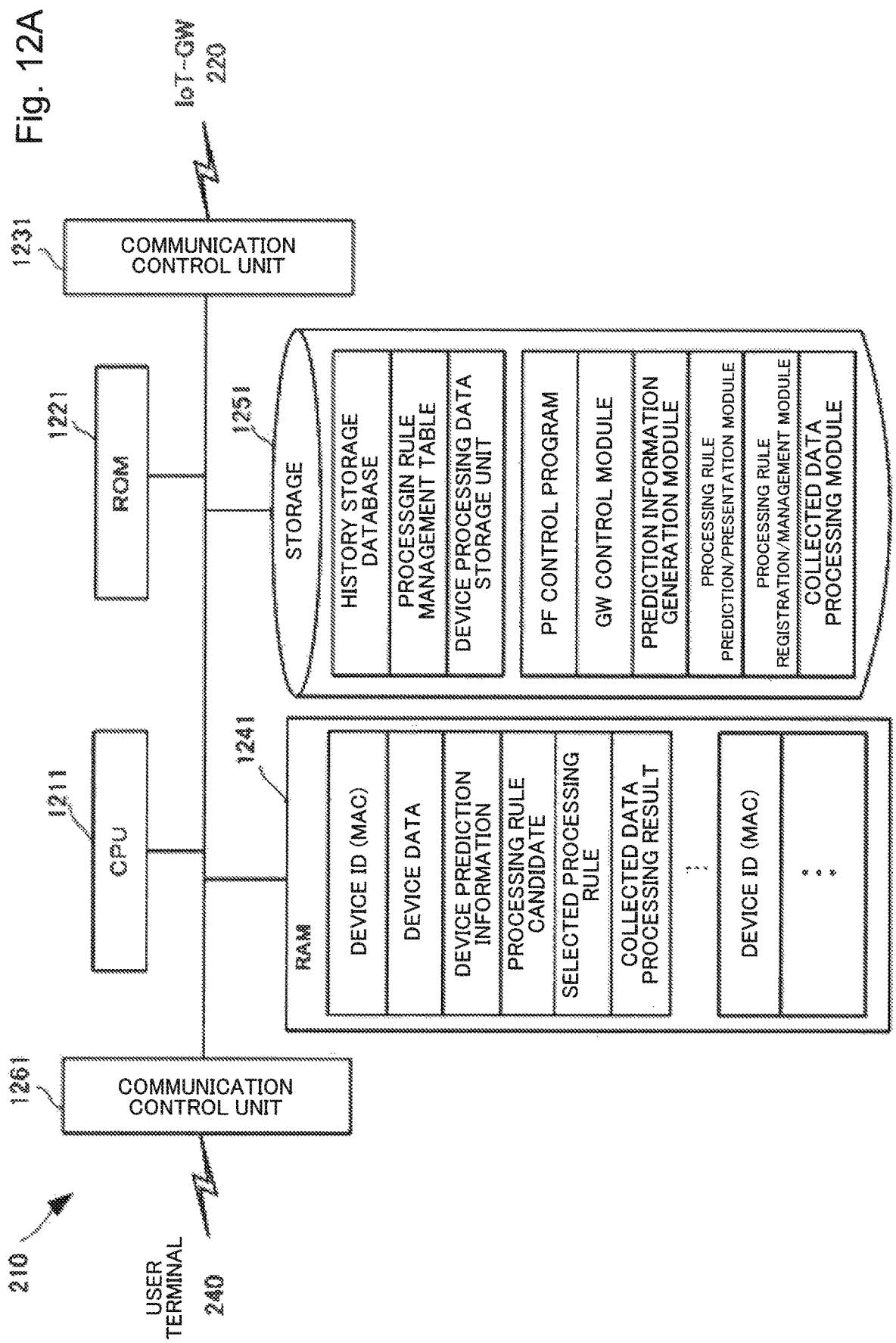
FIG. 12A is a block diagram illustrating a hardware configuration of a platform included in the information processing apparatus according to the second example embodiment of the present invention.

FIG. 12A is a block diagram illustrating a hardware configuration of a platform (the PF 210) included in the information processing apparatus according to the present example embodiment.

In FIG. 12A, a central processing unit (CPU) 1211 is a processor for operation control and realizes the function configuring units in FIG. 6 by executing a program. A read only memory (ROM) 1221 stores fixed data and a fixed program such as initial data and an initial program. A communication control unit 1231 controls communication with the IoT-GW 220 via a network. A communication control unit 1261 controls communication with the user terminal 240 via a network.

A random access memory (RAM) 1241 is a random access memory used by the CPU 1211 as a temporal storage work area. In the RAM 1241, an area that stores data necessary for realizing the present example embodiment is ensured. A device ID (MAC address) is an identifier of a device used in the present example embodiment. Device data are data acquired from an initially connected device. Device prediction information is prediction information extracted from device data, for predicting a processing rule candidate. A processing rule candidate is a candidate for a processing rule predicted for a device ID by referring to a history storage database, based on prediction information and is transmitted to the user terminal 240. A selected processing rule is a processing rule to be registered, the rule being selected by a user by using the user terminal 240. A collected data processing result is a processing result based on a registered processing rule, acquired from data collected from a device and is transmitted to the user terminal 240 or a superordinate application server. Thereafter, a storage area of each piece of data is ensured in association with a difference of a device ID (MAC address).

A storage 1251 stores a database and various parameters or the following data or program necessary for realizing the present example embodiment. A history storage database is a database used for storing a relationship between prediction information and a processing rule and predicting a candidate for a processing rule, based on prediction information of a device. A processing rule management table is a table in which a processing rule selected by a user from processing rule candidates is registered in association with a device ID. A device processing data storage unit is an area that stores a processing result of processing executed in accordance with a processing rule through acquisition from a device. The storage 1251 stores the following programs. A PF control program is a program that controls the entire PF 210. A GW control module is a module that controls the GW 210. A prediction information generation module is a module that generates prediction information from device data received from a device. A processing rule prediction/presentation module is a module that predicts a processing rule corresponding to a device ID from prediction information and presents the predicted rule to the user terminal 240. A processing rule registration/management module is a module that registers and manages a processing rule selected in association with a device ID. A collected data processing module is a module that processes, in accordance with a processing rule, data collected by a device.

In the RAM 1241 and the storage 1251 in FIG. 12A, a program and data relating to a general-purpose function included in the PF 210 and another realizable function are not illustrated.

<<Hardware Configuration of a Gateway>>

Figure 12B:
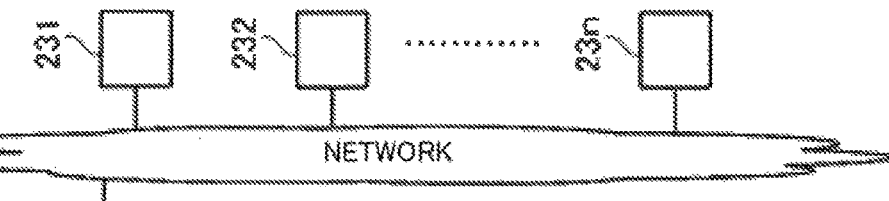
FIG. 12B is a block diagram illustrating a hardware configuration of a gateway included in the information processing apparatus according to the second example embodiment of the present invention.

FIG. 12B is a block diagram illustrating a hardware configuration of a gateway (GW 220) included in the information processing apparatus according to the present example embodiment.

In FIG. 12B, a CPU 1212 is a processor for operation control and realizes the function configuring units in FIG. 6 by executing a program. A ROM 1222 stores fixed data and a fixed program such as initial date and an initial program. A communication control unit 1232 controls communication with the IoT-PF 210 via a network. A communication control unit 1262 controls communication with a device 230 (231 to 23*n*) via a network.

A RAM 1242 is a random access memory used by the CPU 1212 as a temporal storage work area. In the RAM 1242, an area that stores data necessary for realizing the present example embodiment is ensured. A device ID (e.g. a MAC address) is an identifier of a device used in the present example embodiment. Device data are data acquired from an initially connected device. Device prediction information is prediction information extracted from device data, for predicting a processing rule candidate. A processing rule is a processing rule selected by a user by using the user terminal 240 and registered. A data processing result is a processing result based on a registered processing rule, acquired from data collected from a device and is transmitted to the IoT-PF 210. Thereafter, a storage area of each piece of data is ensured in association with a difference of a device ID (MAC address).

A storage 1252 stores a database and various parameters or the following data or program necessary for realizing the present example embodiment. A processing rule registration table is a table in which a processing rule distributed to the GW 220 is registered in association with a device ID. A storage 1252 stores the following programs. A GW control program is a program that controls the entire GW 220. A device data acquisition module is a module that acquires device data from a connected device. A device prediction information acquisition module is a module that acquires prediction information from device data received from a device. A processing rule registration module is a module that registers a processing rule selected in association with a device ID and processes data from the device. A device control module is a module that controls a device in accordance with a processing rule.

In the RAM 1242 and the storage 1252 in FIG. 12B, a program and data relating to a general-purpose function included in the GW 220 and another realizable function are not illustrated.

<<Hardware Configuration of a User Terminal>>

Figure 12C:
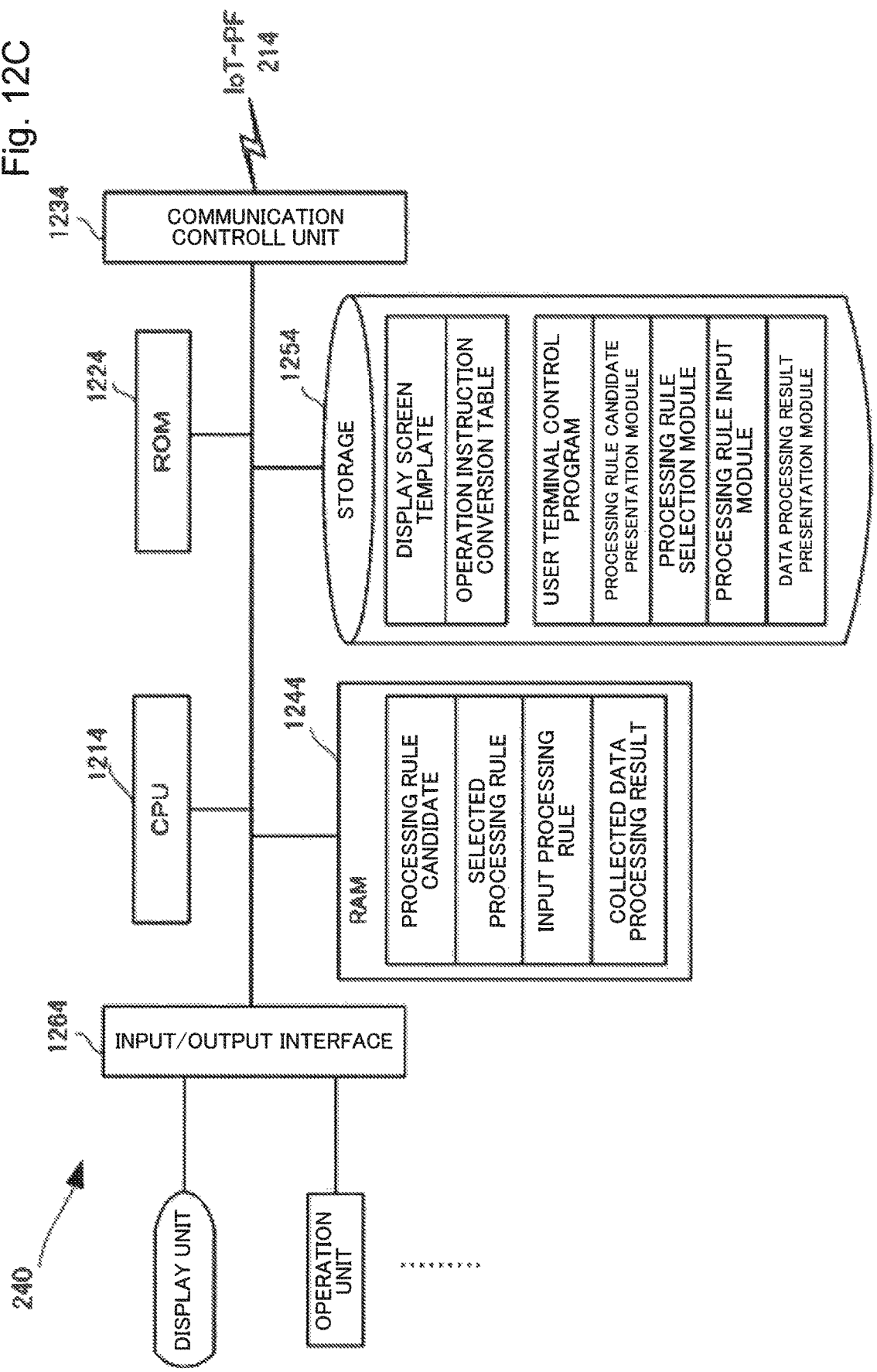
FIG. 12C is a block diagram illustrating a hardware configuration of the user terminal according to the second example embodiment of the present invention.

FIG. 12C is a block diagram illustrating a hardware configuration of the user terminal 240 according to the present example embodiment.

In FIG. 12C, a CPU 1214 is a processor for operation control and realizes the function configuring units in FIG. 7 by executing a program. A ROM 1224 stores fixed data and a fixed program such as initial date and an initial program. A communication control unit 1234 controls communication with the IoT-PF 210 via a network. An input/output interface 1264 controls input/output of a display unit, an operation unit and the like.

A RAM 1244 is a random access memory used by the CPU 1214 as a temporal storage work area. In the RAM 1244, an area that stores data necessary for realizing the present example embodiment is ensured. A processing rule candidate is display data of a processing rule candidate corresponding to a device ID (MAC address) and is displayed on a display unit. A selected processing rule is data of a processing rule selected by a user from processing rule candidates by using an operation unit. An input processing rule is data of a processing rule sequentially input by a user by using an operation unit. A collected data processing result is a processing result based on a registered processing rule, acquired from data collected from a device, and is transmitted from the IoT-PF 210 and displayed on a display unit.

A storage 1254 stores a database and various parameters or the following data or program necessary for realizing the present example embodiment. A display screen template is a template for generating a display screen as in FIG. 4. An operation instruction conversion table is a table that converts an operation from an operation unit to an internal instruction command. The storage 1254 stores the following programs. A user terminal control program is a program that controls the entire user terminal 240. A processing rule candidate presentation module is a module that presents a processing rule candidate transmitted from the IoT-PF 210 on a display unit. A processing rule selection module is a module that selects a processing rule to be registered from processing rule candidates presented on a display unit and notifies the IoT-PF 210 of the selected rule. A processing rule input module is a module that inputs a processing rule to be registered from a processing rule input screen presented on a display unit and notifies the IoT-PF 210 of the input rule. A data processing result presentation module is a module that presents a data processing result of a device transmitted from the IoT-PF 210 on the display unit.

In the RAM 1244 and the storage 1254 in FIG. 12C, a program and data relating to a general-purpose function included in the user terminal 240 and another realizable function are not illustrated.

<<Processing Procedure of a Gateway>>

Figure 13A:
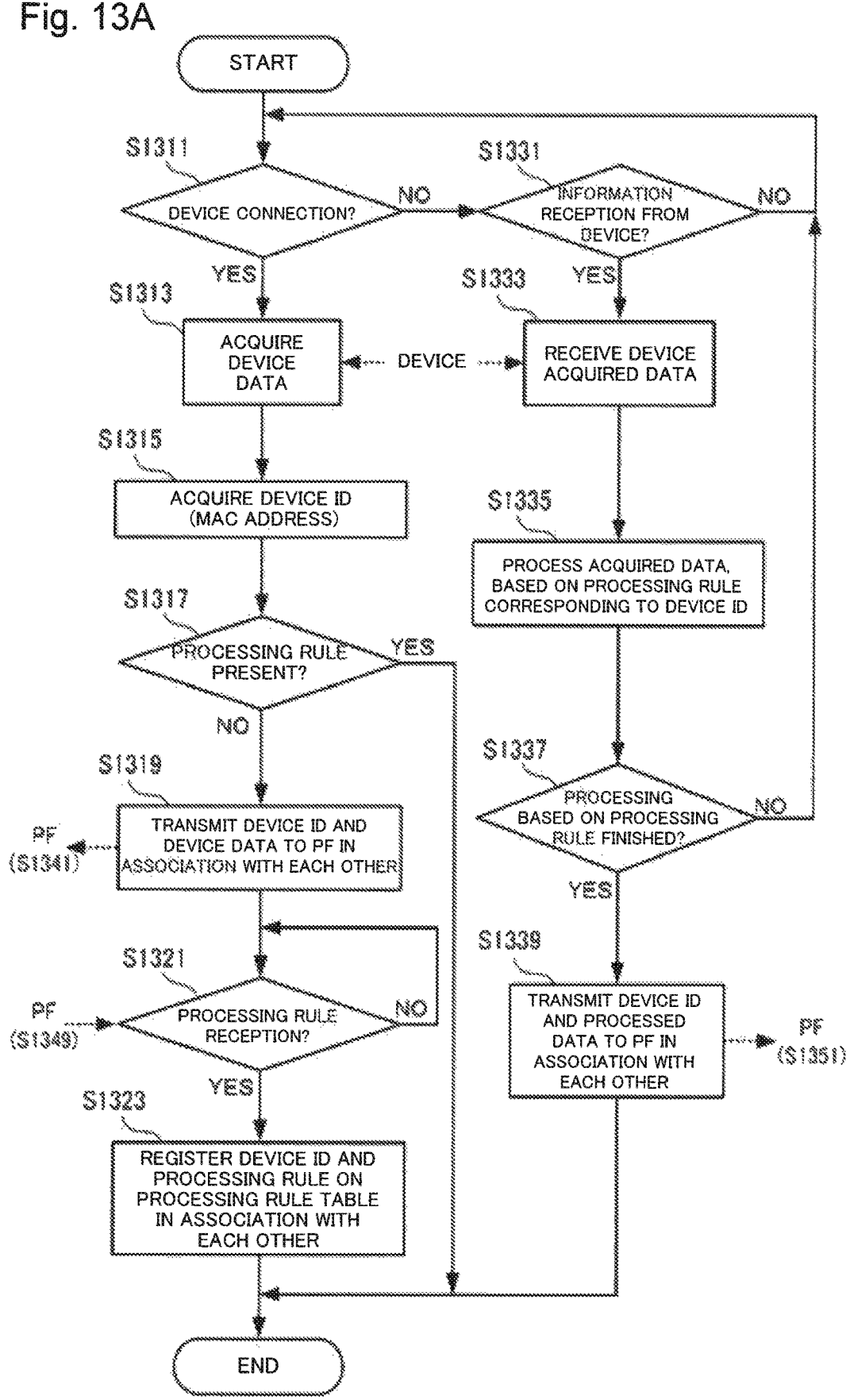
FIG. 13A is a flowchart illustrating a processing procedure of the gateway included in the information processing apparatus according to the second example embodiment of the present invention.

FIG. 13A is a flowchart illustrating a processing procedure of a gateway (the GW 220) included in the information processing apparatus according to the present example embodiment. This flowchart is executed using the RAM 1242 by the CPU 1212 in FIG. 12B and realizes the function configuring units of the GW 220 in FIG. 6. In FIG. 13A, illustration of a flowchart relating to input of a processing rule from the user terminal 240 executed by a user is omitted.

The GW 220 determines whether a device is connected in step S1311. When a device is connected, the GW 220 acquires device data from the connected device in step S1313. The GW 220 acquires a device ID (MAC address) of the connected device in step S1315.

The GW 220 determines whether a processing rule in association with the acquired device ID is registered in step S1317. When a processing rule is registered, the processing is finished and the registered processing rule is used. When a processing rule is not registered, the GW 220 transmits the device ID and the device data (or prediction information) to the PF 210 in association with each other in step S1319.

The GW 220 awaits reception of a registered processing rule from PF 210 in step S1321 and registers, upon reception of the processing rule, the device ID and the processing rule on the processing rule registration table 370 in association with each other in step S1323.

On the other hand, when a device is not connected, the GW 220 determines whether or not information from a connected device is received in step S1331. When information from a device is received, the GW 220 receives, in step S1333, data acquired and transmitted by the device. The GW 220 processes the received data in accordance with a processing rule corresponding to a device ID in step S1335.

The GW 220 determines whether the processing based on the processing rule is finished in step S1337. When a processing rule is, for example, an operation for a plurality of pieces of received data, the processing rule is repeated during reception of a plurality of pieces of data. In this manner, when processing based on the processing rule has not been finished, the GW 220 returns to steps S1311 and S1331 and awaits next data reception. When processing based on the processing rule is finished, the GW 220 transmits the device ID and processed data to the PF 210 in association with each other in step S1339.

<<Processing Procedure of a Platform>>

Figure 13B:
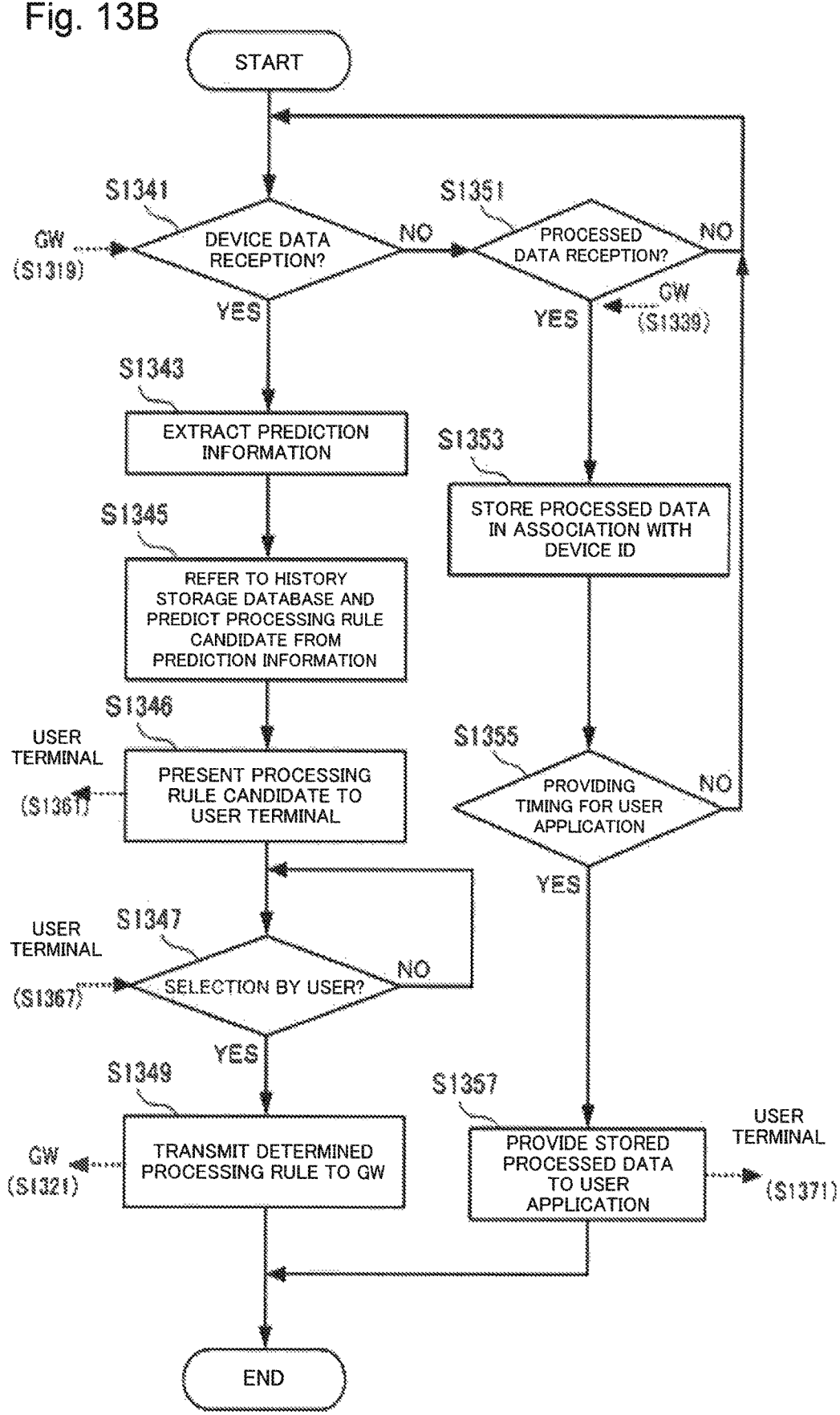
FIG. 13B is a flowchart illustrating a processing procedure of the platform included in the information processing apparatus according to the second example embodiment of the present invention.

FIG. 13B is a flowchart illustrating a processing procedure of a platform (the PF 210) included in the information processing apparatus according to the present example embodiment. This flowchart is executed using the RAM 1241 by the CPU 1211 in FIG. 12A and realizes the function configuring units of the PF 210 in FIG. 6. In FIG. 13B, illustration of a flowchart relating to input of a processing rule from the user terminal 240 executed by a user is omitted.

The PF 210 determines whether or not device data of a device which is connected to the GW 220 but whose processing rule is not registered are received together with a device ID in step S1341. When device data are received, the PF 210 extracts prediction information, based on the device data in step S1343. The PF 210 refers to the history storage database 250 and predicts a processing rule candidate from the prediction information in step S1345.

The PF 210 presents the predicted processing rule to the user terminal 240 in step S1346. The PF 210 awaits a selection instruction for a processing rule made by a user from the user terminal 240 in step S1347. When a selection instruction for a processing rule is made, the PF 210 transmits the determined processing rule to the GW 220 together with the device ID in step S1349.

On the other hand, when the device data are not received, the PF 210 determines, in step S1351, whether data already processed by the GW 220 in accordance with a processing rule are received. When processed data are received, the PF 210 stores the processed data in association with a device ID in step S1353. The PF 210 determines whether or not it is a providing timing for a user application in step S1355. When it is not a providing timing for a user application, the PF 210 returns to steps S1341 and S1351 and awaits next processed data.

When a providing timing for a user application comes, the PF 210 provides, in step S1357, stored processed data or data further processed by an application to the user terminal 240 or a superordinate application server.

<<Processing Procedure of a User Terminal>>

FIG. 13C is a flowchart illustrating a processing procedure of the user terminal 240 according to the present example embodiment. This flowchart is executed using the RAM 1244 by the CPU 1214 in FIG. 12C and realizes the function configuring units of the user terminal 240 in FIG. 7. In FIG. 13C, illustration of a flowchart relating to input of a processing rule from the user terminal 240 executed by a user is omitted.

The user terminal 240 determines whether or not a processing rule candidate is received from the PF 210 in step S1361. When a processing rule candidate is received from the PF 210, the user terminal 240 presents the processing rule candidate to a display unit in association with a device ID in step S1363. The user terminal 240 awaits a selection instruction for a processing rule made by the user in step S1365. When a selection instruction for a processing rule is made by the user, the user terminal 240 transmits information indicating the processing rule selected by the user to the PF 210 together with a device ID in step S1367.

When a processing rule candidate is not received from the PF 210, the user terminal 240 determines whether or not a data processing result is received from the PF 210 in step S1371. When a data processing result is received, the user terminal 24 presents the processing result to the display device in step S1373.

When a processing rule candidate is not received from the PF 21 and a data processing result is not received from the PF 210, the user terminal 240 determines, in step S1381, whether or not a processing rule is input by the user. When a processing rule is input by the user, the user terminal 240 transmits the input processing rule to the PF 210 in step S1383.

The information processing apparatus 600 is, for example, an M2M platform and may be an M2M service infrastructure defined in one M2M that standardizes a machine to machine service. The M2M service infrastructure is equivalent to an infrastructure node (IN) in one M2M architecture. The M2M service infrastructure includes a common services entity (CSE) that provides a common services function (CSF) group defined by one M2M. The information processing apparatus 600 may be an apparatus including a plurality of CSEs. A CSE included in an IN is referred to also as an infrastructure node (IN)-CSE.

A network is, for example, a mobile communication network provided by a communication carrier and may be an underlying network defined in one M2M.

The device 230 is, for example, a sensor device and may be an M2M device defined in one M2M. The M2M device is equivalent to an application service node (ASN) or an application dedicated node (ADN) in one M2M architecture, and of these, the ASN includes a CSE. A CSE in an ASN is referred to also as an ASN-CSE.

An application server, not illustrated, that further processes data collected from a device is, for example, a server that processes a specific operation and may be an M2M application infrastructure defined in one M2M. The application server may include an application entity (AE) in one M2M architecture. An AE existing in an infrastructure domain defined by one M2M and being connected to an IN-CSE is referred to also as an infrastructure node (IN)-AE.

The information processing apparatus 600 may be, for example, a mobile router and may be, in this case, an M2M gateway (gateway device) defined in one M2M. The M2M gateway is equivalent to a middle node (MN) in one M2M architecture and includes a CSE. A CSE in an MN is referred to also as an MN-CSE.

According to the present example embodiment, a data characteristic and a communication characteristic of a device are stored on an IoT-PF, and thereby a processing rule for the device is predicted, whereby registration of association information can be simplified. An association between an identifier of a device and a processing rule for the device is stored on an IoT-PF or an IoT-GW, and thereby connection of a device to a GW can be simplified.

For details, upon new device connection, a device can be simply registered without individual setting for a processing rule by a worker. While a GW can be configured to predict a processing rule, a common PF is configured to execute prediction, and thereby accuracy of prediction information can be improved based on device data acquired from a plurality of GWs. Without changing data structure of data during data collection from a device, a GW can interpret a processing rule. Further, a processing rule can be easily changed.

Third Example Embodiment

Next, an information processing system including an information processing apparatus according to a third example embodiment of the present invention is described. The information processing system including the information processing apparatus according to the present example embodiment is different in a point that the information processing apparatus automatically determines and sets a processing rule without presenting a predicted processing rule candidate to a user terminal and selecting of the presented candidate by a user (operator), compared with the second example embodiment. Other components and operations are similar to corresponding components and operations of the second example embodiment, and therefore the same component and operation are assigned with the same reference signs, respectively and detailed description thereof is omitted.

<<Information Processing System>>

Figure 15:
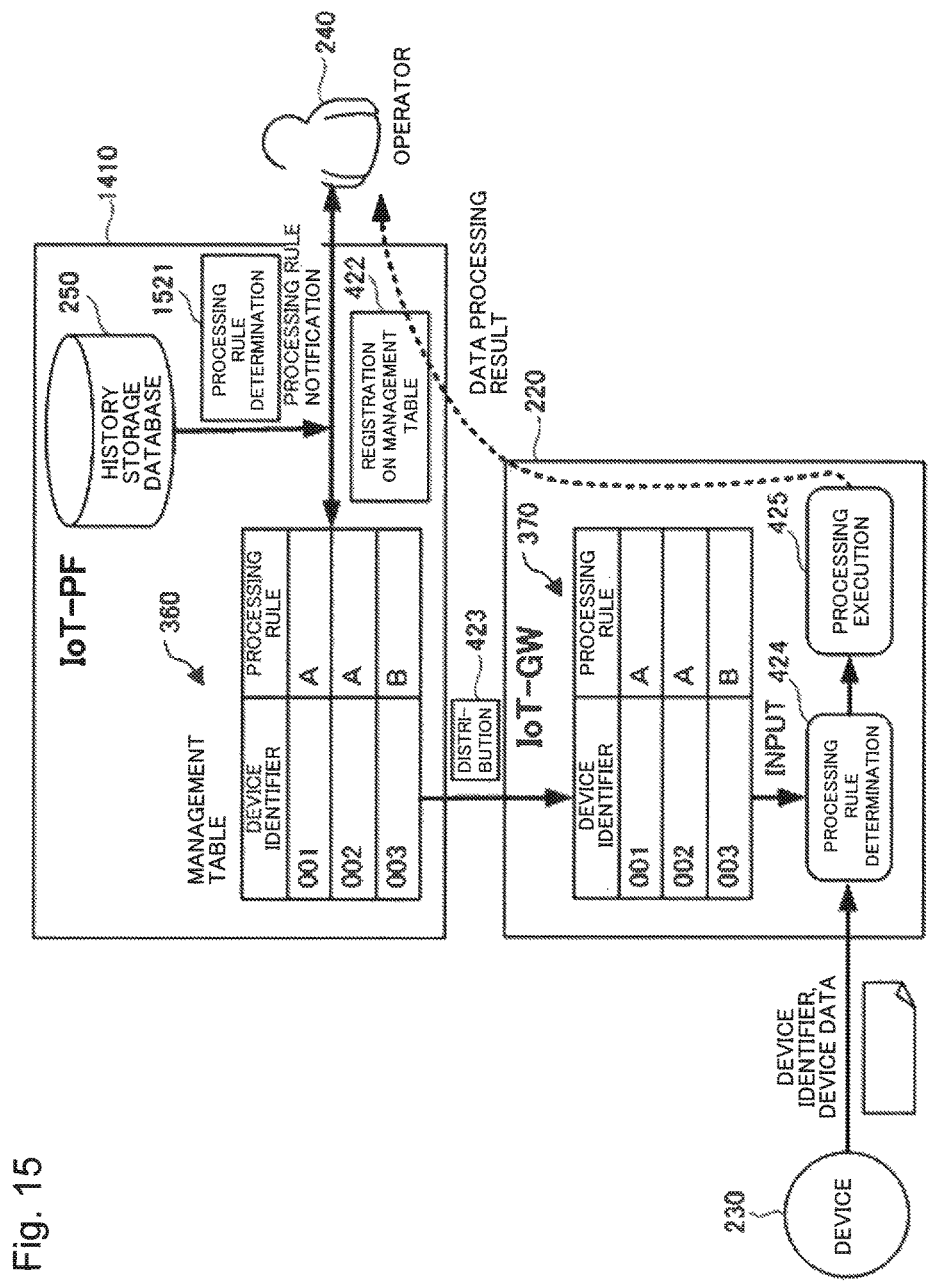
FIG. 15 is a diagram illustrating a processing rule registration procedure of a main configuration of the information processing system including the information processing apparatus according to the third example embodiment of the present invention.

With reference to FIG. 14 and FIG. 15, the information processing system including the information processing apparatus of the present example embodiment is described.

(Operation Sequence)

FIG. 14 is a sequence diagram illustrating an operation procedure of a main configuration of the information processing system including the information processing apparatus according to the present example embodiment. A step and a component similar to a step and a component in FIG. 3 are assigned with the same step number and the same reference number, and thereby overlapping description is omitted. Hereinafter, an IoT-PF 1410 may be abbreviated as a PF 1410.

In step S1407, The IoT-PF 1410 refers to a history storage database 250, determines a processing rule, and registers the processing rule in association with a device ID. In other words, a step in which a processing rule candidate is presented to a user terminal 240 and selected as in the second example embodiment does not exist. The processing rule determined in step S1407 is registered as-determined and in step S1417, the processing rule associated with the device ID is notified from the IoT-PF 1410 to the user terminal 240 and confirmed.

(Processing Rule Registration Procedure)

FIG. 15 is a diagram illustrating a processing rule registration procedure of a main configuration of the information processing system including the information processing apparatus according to the present example embodiment. A component similar to a component in FIG. 5B is assigned with the same reference number, and thereby overlapping description is omitted.

The IoT-PF 1410 refers to the history storage database 250, determines a processing rule from characteristic information of a device ID (1521), and registers the determined rule.

<<Processing Rule for a Platform>>

Figure 16:
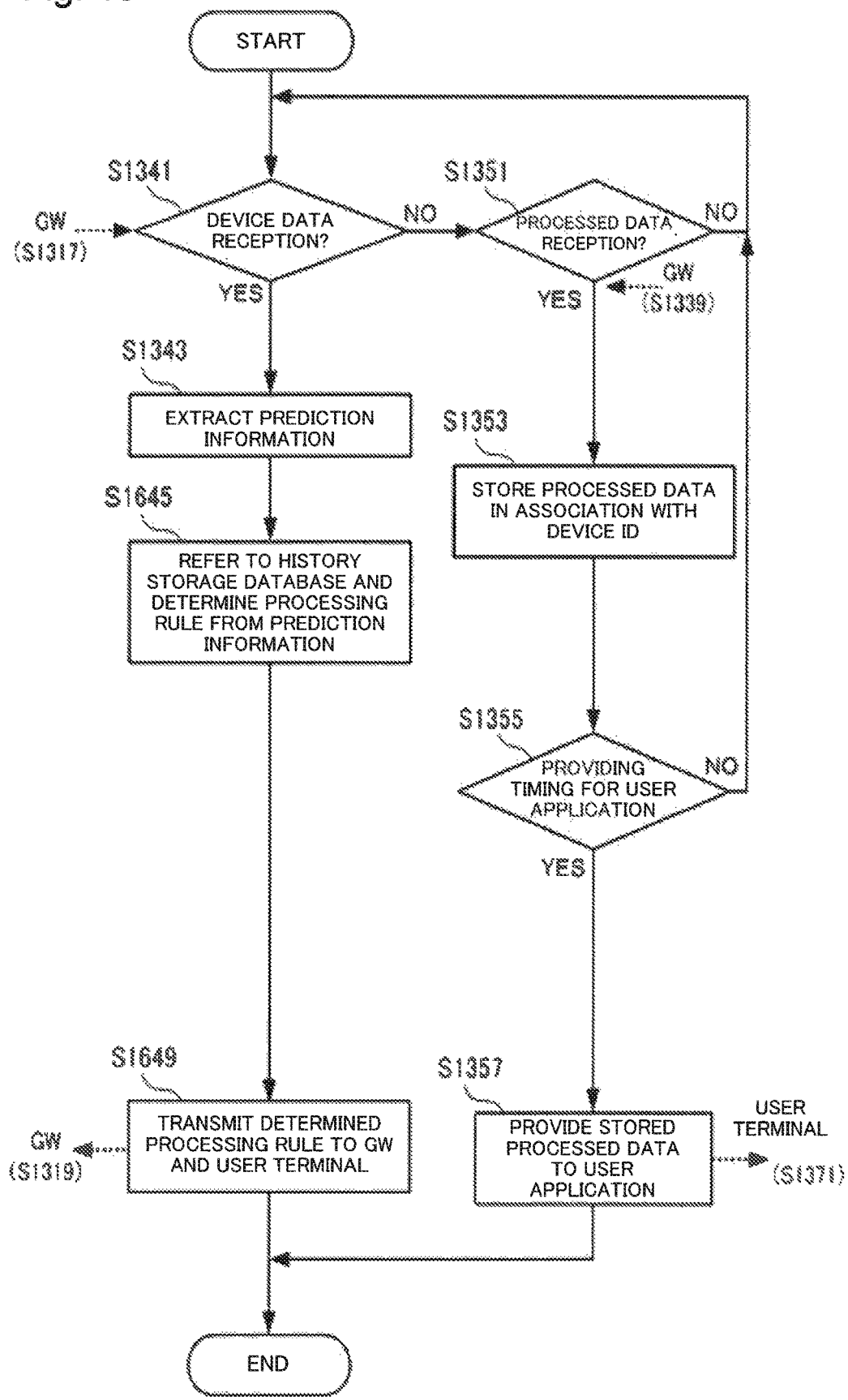
FIG. 16 is a flowchart illustrating a processing procedure of a platform included in the information processing apparatus according to the third example embodiment of the present invention.

FIG. 16 is a flowchart illustrating a processing procedure of a platform (the PF 1410) included in the information processing apparatus according to the present example embodiment. This flowchart is executed using the RAM 1241 by the CPU 1211 in FIG. 12A and realizes the function configuring units of the PH 1410 in FIG. 15. In FIG. 16, a step similar to a step in FIG. 13B is assigned with the same step number, and thereby overlapping description is omitted. In FIG. 16, illustration of a flowchart relating to input of a processing rule from the user terminal 240 executed by a user is omitted.

The PF 1410 refers to the history storage database 250 and determines a processing rule from characteristic information in step S1645. The PF 1410 transmits the determined processing rule to a GW 220 and the user terminal 240 together with a device ID in step S1649.

According to the present example embodiment, a data characteristic and a communication characteristic of a device are stored on an IoT-PF and the IoT-PF predicts and sets a processing rule for a device, and therefore registration of association information can be further simplified.

Fourth Example Embodiment

Next, an information system including an information processing apparatus according to a third example embodiment of the present invention is described. The information system including the information processing apparatus according to the present example embodiment is different in a point that a processing rule for each device corresponding to a set of connected devices is set, compared with the second example embodiment and the third example embodiment. Other components and operations are similar to corresponding components and operations of the second example embodiment and the third example embodiment, and therefore the same component and operation are assigned with the same reference signs, respectively and detailed description thereof is omitted.

<<Information Processing System>>

Hereinafter, with reference to FIG. 17 and FIG. 18, a configuration and an operation of the information system including the information processing apparatus of the present example embodiment is described.

(Processing Rule Registration)

Figure 17:
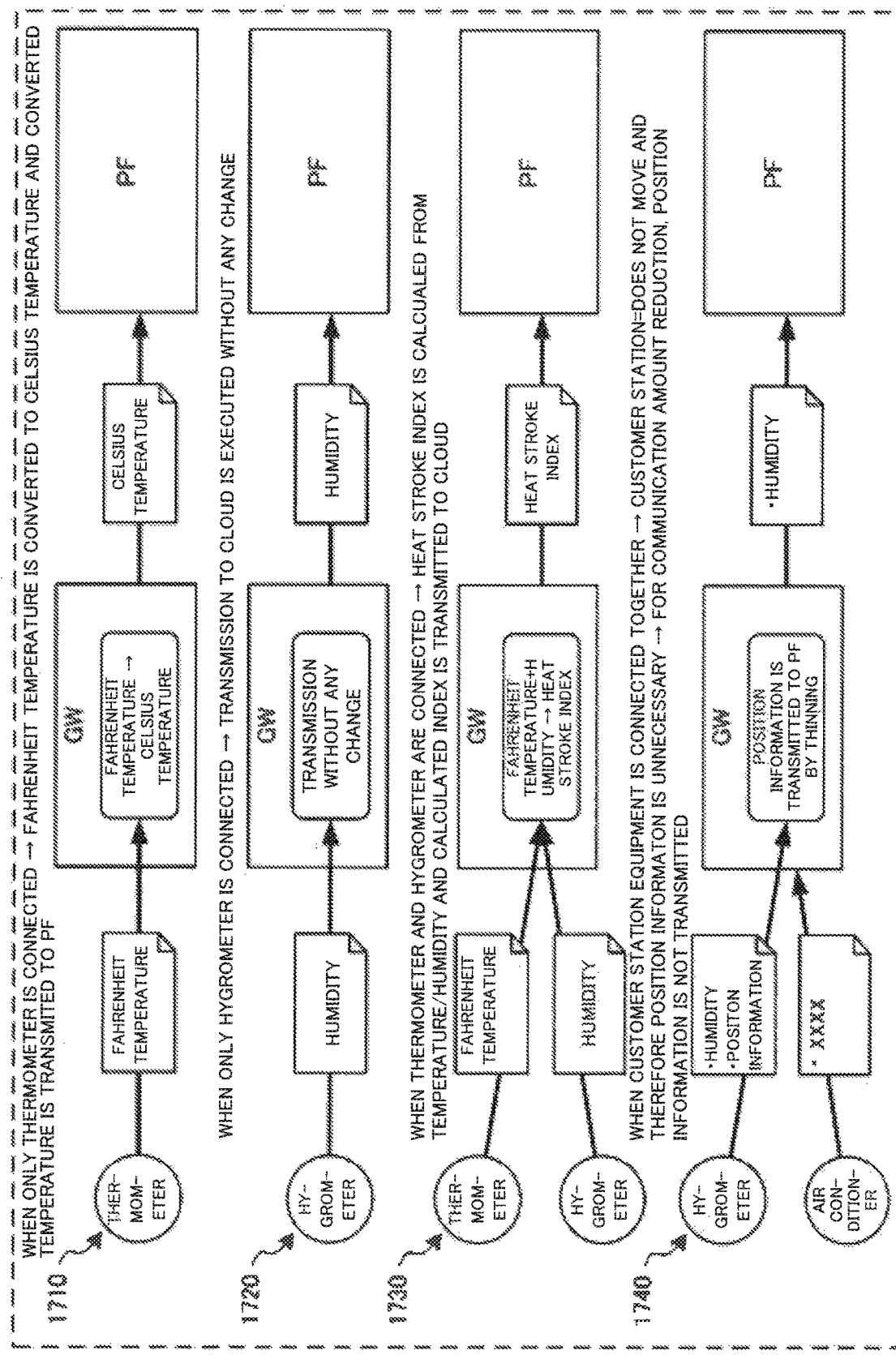
FIG. 17 is a diagram illustrating an outline for registering a processing rule for a device in an information processing system including an information processing apparatus according to a fourth example embodiment of the present invention.

FIG. 17 is a diagram illustrating an outline for registering a processing rule for a device in the information processing system including the information processing apparatus according to the present example embodiment. In FIG. 17, an example of a combination of two devices is illustrated, but there is no limitation on type or number of devices to be combined.

When only a thermometer is connected (1710), in a GW, a Fahrenheit temperature is converted to a Celsius temperature as a processing rule and the converted temperature is transmitted to a PF. When only a hygrometer is connected (1720), in a GW, transmission to a cloud is executed without any change, as a processing rule.

In contrast, when a thermometer and a hygrometer are connected (1730) as in the present example embodiment, in a GW, a heat stroke index is calculated from (temperature/humidity) as a processing rule and transmitted to a cloud. When a piece of customer station equipment (e.g. an air conditioner) is connected together with a hygrometer (1740), since a piece of customer equipment does not move in a customer station, position information is not required as a processing rule in a GW and is not transmitted, for communication amount reduction.

(Operation Sequence)

Figure 18:
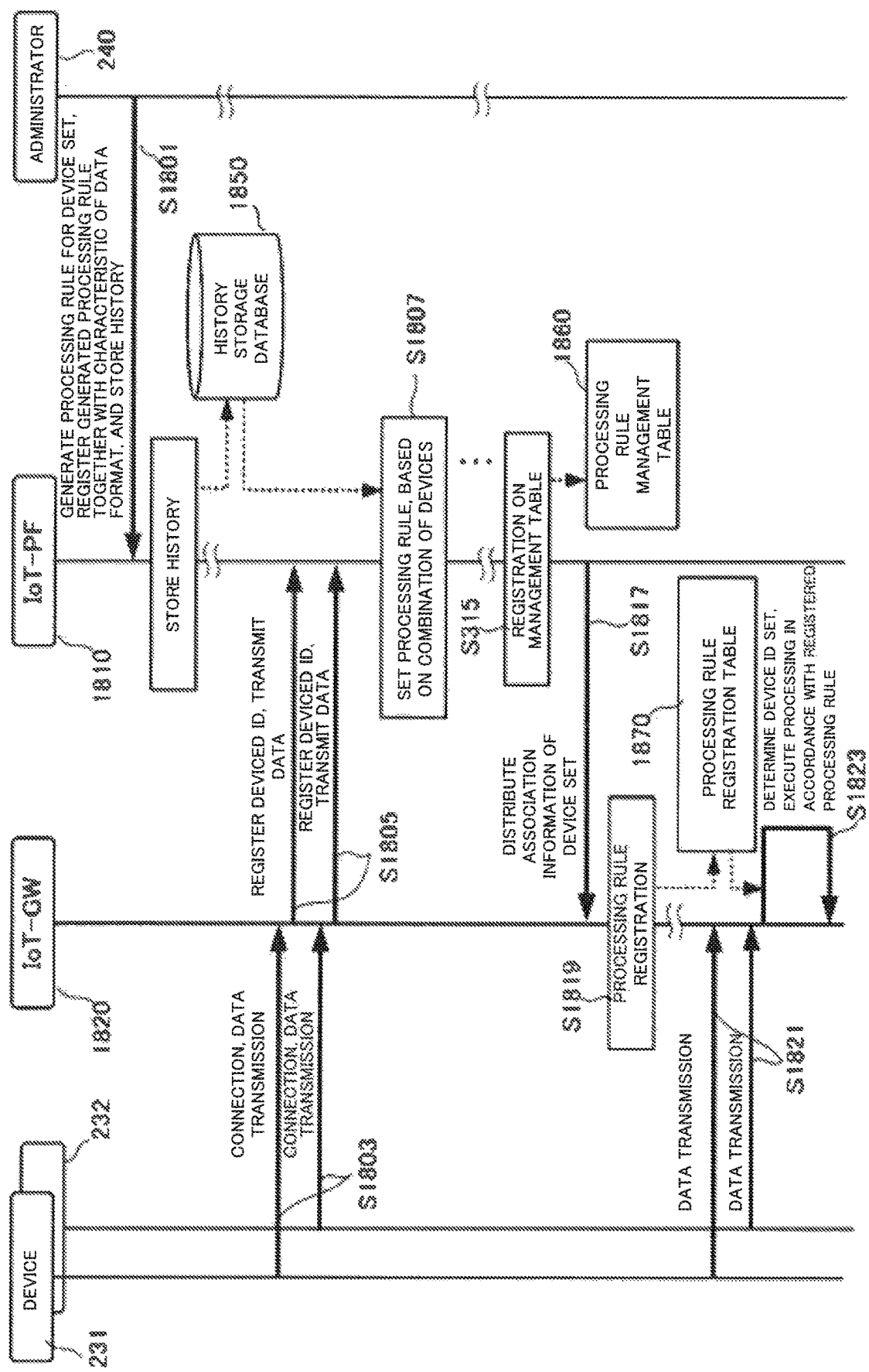
FIG. 18 is a sequence diagram illustrating an operation procedure of a main configuration of the information processing system including the information processing apparatus according to the fourth example embodiment of the present invention.

FIG. 18 is a sequence diagram illustrating an operation procedure of a main configuration of the information processing system including the information processing apparatus according to the present example embodiment. In FIG. 18, a step and a component similar to a step and a component in FIG. 3 are assigned with the same step number and reference number, and thereby overlapping description is omitted. Hereinafter, an IoT-PF 1810 may be abbreviated as a PF 1810, and an IoT-GW 1820 may be abbreviated as a GW 1820.

In step S1801, a processing rule for a device set is generated for the IoT-PF 1810 from a user terminal 240 and registered together with a characteristic of a data format of the device, and a history thereof is stored on a history storage database 1850.

When a device 231 and a device 232 are connected to the IoT-GW 1820 in step S1803, in step S1805, respective device IDs and device data thereof are transmitted to the IoT-PF 1810. In step S1807, the IoT-PF 1810 refers to the history storage database 1850 and sets a processing rule, based on a combination of devices. While being omitted in FIG. 18, it is possible that a processing rule is predicted, and the predicted rule is displayed on the user terminal 240 and selected by a user.

A processing rule corresponding to the device set is registered on a processing rule management table 1860 of the IoT-PF 1810, and thereafter in step S1817, the processing rule is distributed from the IoT-PF 1810 to the IoT-GW 1820 and registered on a processing rule registration table 1870 of the IoT-GW 1820 in step S1819.

When data from the same device set thereafter are received in step S1821, the IoT-GW 1820 determines a device ID set and executes processing in accordance with the processing rule registered on the processing rule registration table 1870 in step S1823.

(History Storage Database)

Figure 19A:
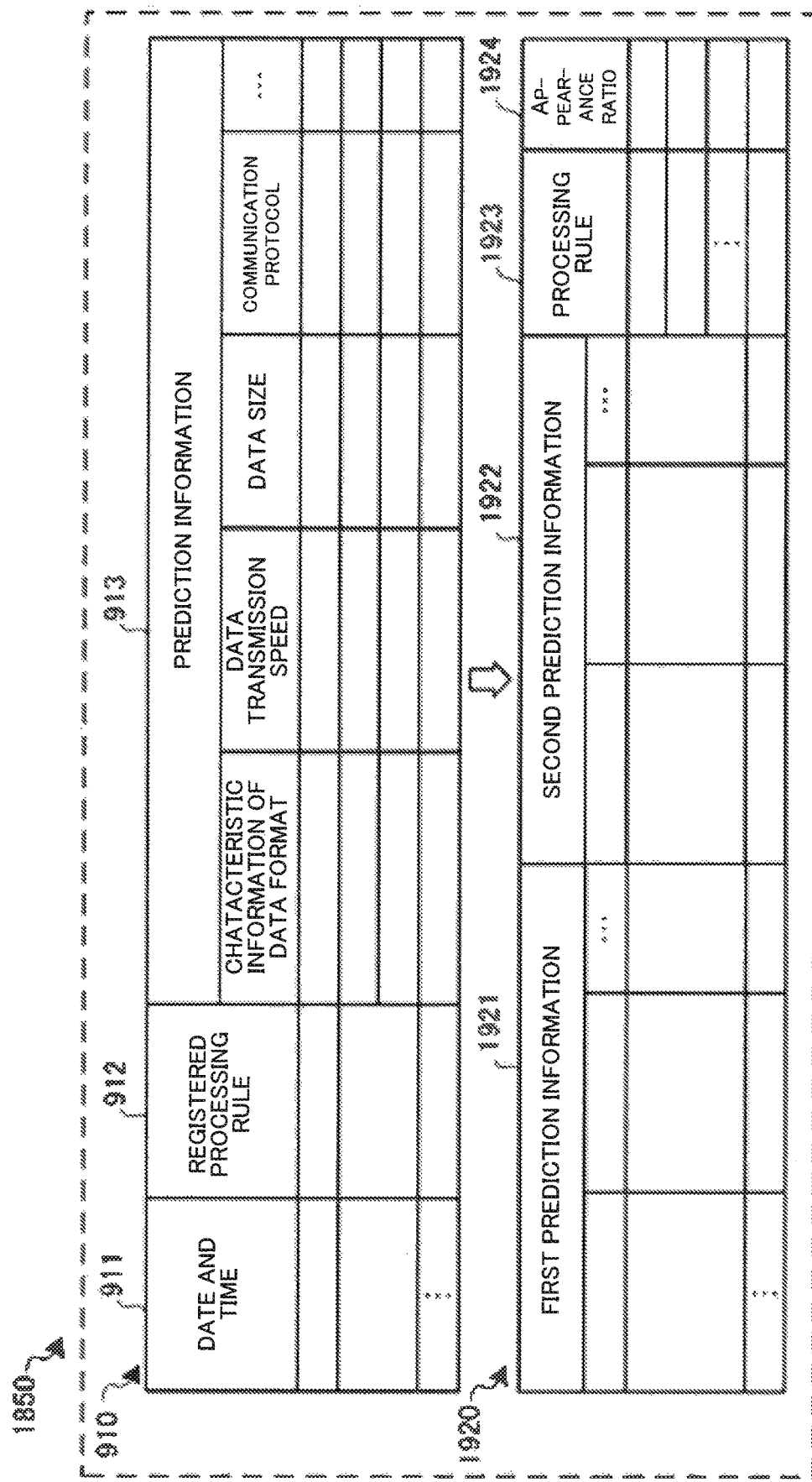
FIG. 19A is a diagram illustrating a configuration of a history storage database according to the fourth example embodiment of the present invention.

FIG. 19A is a diagram illustrating a configuration of the history storage database 1850 according to the present example embodiment. The history storage database 1850 is used for storing a history of a relationship between prediction information and a processing rule and predicting a processing rule to be set and registered for a new device set. The history storage database 1850 includes a history storage area 910 that stores a history of a relationship between prediction information and a processing rule and a prediction table 1920 for predicting a processing rule for a device set from a history stored on the history storage area 910. In FIG. 19A, a component similar to a component in FIG. 9 is assigned with the same reference number, and thereby overlapping description is omitted.

The prediction table 1920 stores first prediction information 1921 of a first device and second prediction information 1922 of a second device. A processing rule 1923 predictable from a set of the first prediction information 1921 and the second prediction information 1922 and an appearance ratio thereof 1924 are stored on the prediction table 1920. This matter is similar in a device set including three or more devices.

(Processing Rule Prediction Table)

Figure 19B:
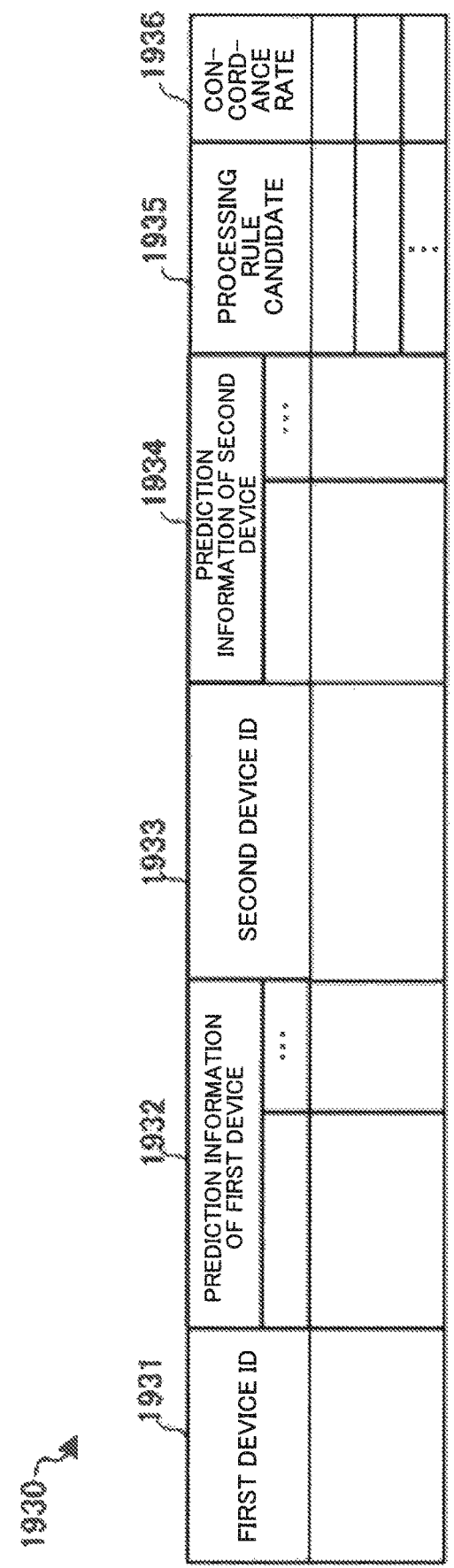
FIG. 19B is a diagram illustrating a configuration of a processing rule prediction table according to the fourth example embodiment of the present invention.

FIG. 19B is a diagram illustrating a configuration of a processing rule prediction table 1930 according to the present example embodiment. The processing rule prediction table 1930 is used for predicting a processing rule candidate corresponding to prediction information of a device set.

The processing rule prediction table 1930 associates a first device ID 1931 and prediction information 1932 extracted from device data thereof with a second device ID 1933 and prediction information 1934 extracted from device data thereof and stores a plurality of processing rule candidates 1935 and concordance rates thereof 1936. This matter is similar in three or more device sets.

(Processing Rule Management Table/Processing Rule Registration Table)

FIG. 19C is a diagram illustrating a configuration of a processing rule management table 1860/a processing rule management table 1870 according to the present example embodiment. The processing rule management table 1860/the processing rule management table/1870 is used for storing a processing rule corresponding to an ID group of a device set and processing data from a connected device set. FIG. 19C is a table in which FIG. 11 is expanded for a plurality of device sets.

The processing rule management table 1860/the processing rule management table/1870 stores a processing rule 1944 in association with a set of a first device ID 1941 to an nth device ID 1943.

<<Processing Procedure of a Gateway>>

Figure 20A:
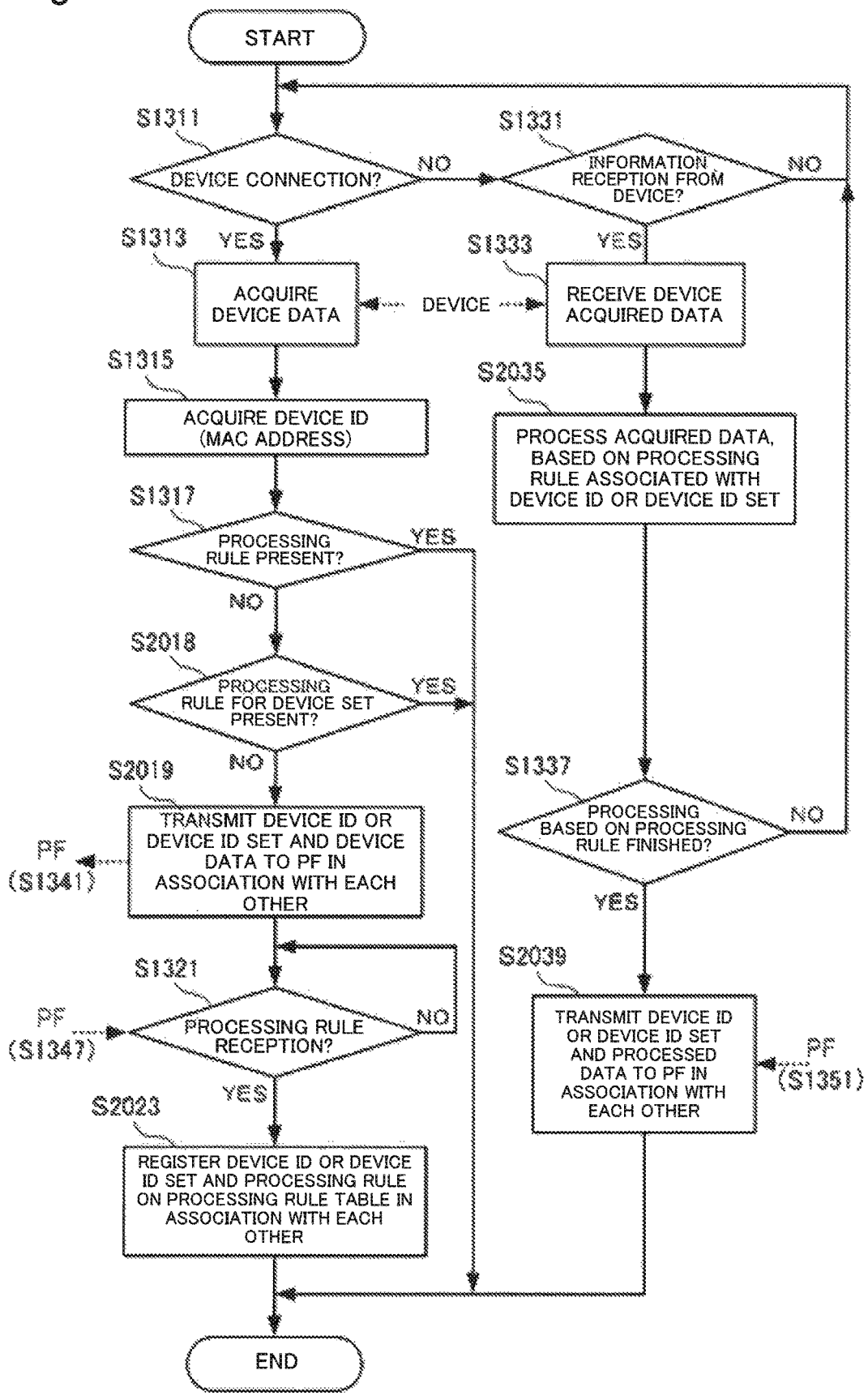
FIG. 20A is a flowchart illustrating a processing procedure of a gateway included in the information processing apparatus according to the fourth example embodiment of the present invention.

FIG. 20A is a flowchart illustrating a processing procedure of a gateway (the GW 1820) included in the information processing apparatus according to the present example embodiment. This flowchart is executed using the RAM 1242 by the CPU 1212 in FIG. 12B and realizes the function configuring units of the GW 1820 in FIG. 18. In FIG. 20A, a step similar to a step in FIG. 13A is assigned with the same step number, and thereby overlapping description is omitted. In FIG. 20A, illustration of a flowchart relating to input of a processing rule from the user terminal 240 executed by a user is omitted.

The GW 1820 determines whether there is a processing rule corresponding to a device set in step S2018. When there is a processing rule corresponding to the device set, the processing is finished and processing is executed using the processing rule. When there is no processing rule corresponding to the device set, the GW 1820 transmits a device ID or a device ID set and device data to the PF 1810 in association with each other in step S2019.

The GW 1820 awaits reception of the processing rule from the PF 1810, and upon receiving the processing rule, registers the device ID or the device ID set and the processing rule on the processing rule registration table 1870 in association with each other in step S2023.

The GW 1820 processes acquired data by using the processing rule corresponding to the device ID or the device ID set, in step S2035. The GW 1820 transmits the device ID or the device ID set and the processed data to the PF 1810 in association with each other in step S2039.

<<Processing Procedure of a Platform>>

Figure 20B:
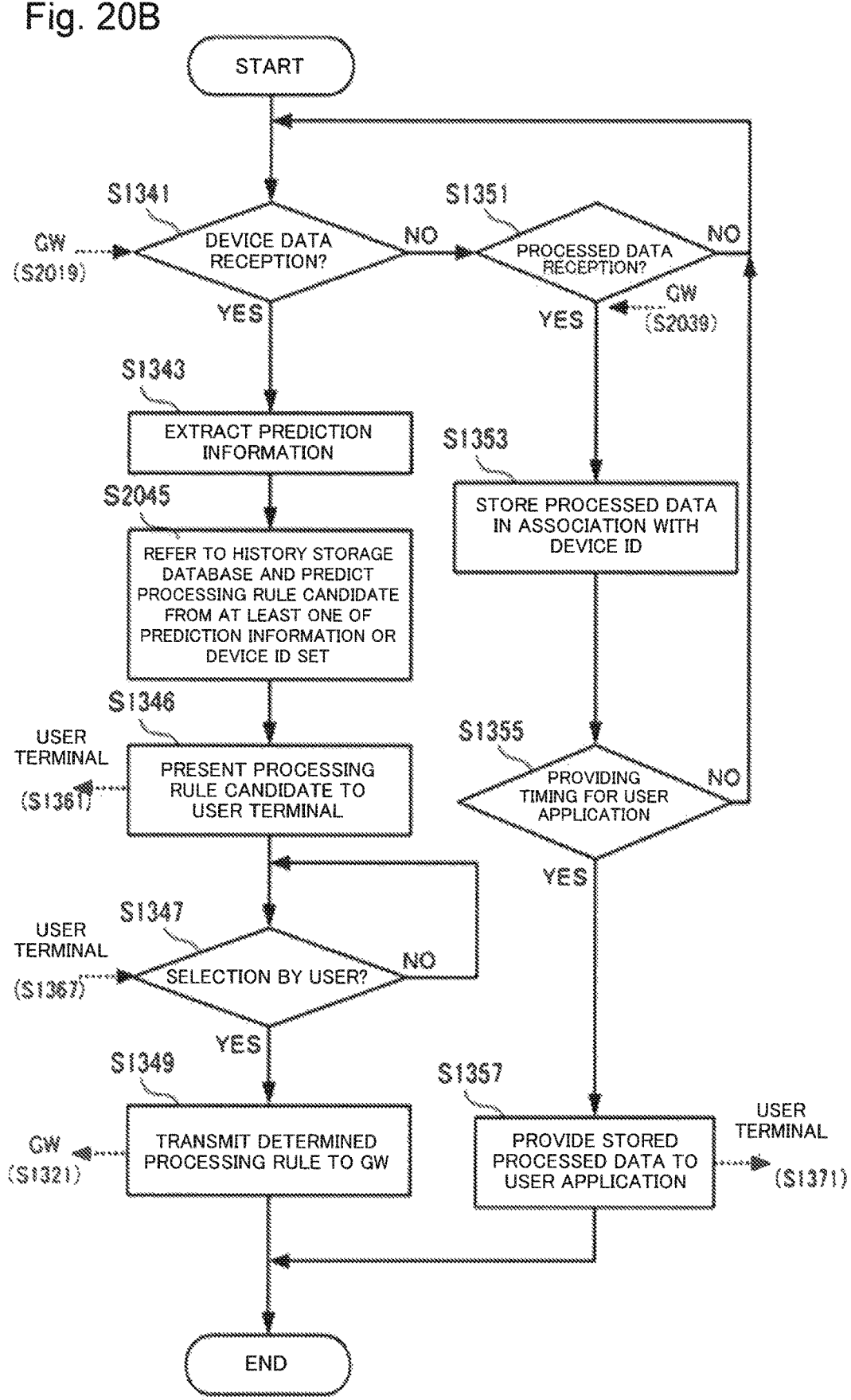
FIG. 20B is a flowchart illustrating a processing procedure of a platform included in the information processing apparatus according to the fourth example embodiment of the present invention.

FIG. 20B is a flowchart illustrating a processing procedure of a platform (the PF 1810) included in the information processing apparatus according to the present example embodiment. This flowchart is executed using the RAM 1241 by the CPU 1211 in FIG. 12A and realizes the function configuring units of the PF 1810 in FIG. 18. In FIG. 20B, a step similar to a step in FIG. 13B is assigned with the same step number, and thereby overlapping description is omitted. In FIG. 20B, illustration of a flowchart relating to input of a processing rule from the user terminal 240 executed by a user is omitted.

The PF 1810 refers to the history storage database 1850 and predicts a processing rule candidate from at least one of prediction information or a device ID set, in step S2045.

According to the present example embodiment, a data characteristic and a communication characteristic of a device set are stored on an IoT-PF and the IoT-PF predicts or sets a processing rule for the device set, and therefore association information associated with a characteristic included in the device set can be registered and connection of a device can be simplified.

Fifth Example Embodiment

Next, an information processing system including an information processing apparatus according to a fifth example embodiment of the present invention is described. The information processing system including the information processing apparatus according to the present example embodiment is different in a point that an appropriate processing rule for a device is set based on, in addition to characteristic information (prediction information) of the device, an application using device data thereof, compared with the second to fourth example embodiments. In other words, in the present example embodiment, for example, in an information processing system in which a plurality of platforms is connected to a plurality of gateways, a processing rule for device data in a gateway is registered in association with an application using the device data. Therefore, depending on an application using device data, device data from the same device can be processed by different processing rules and used. Other components and operations are similar to corresponding components and operations of the second to fourth example embodiments, therefore the same component and operation are assigned with the same reference signs, respectively, and detailed description thereof is omitted.

(Operation Sequence of the Information Processing System)

FIG. 21 is a sequence diagram illustrating an operation procedure of the information processing system including the information processing apparatus according to the present example embodiment. In FIG. 21, a step and a component similar to a step and a component in FIG. 3 are assigned with the same step number and reference number, and thereby overlapping description is omitted. In the present example embodiment, an IoT-PF 2110 indicates a plurality of platforms and an IoT-GW 2120 indicates a plurality of gateways without limitation to these. The IoT-PF 2110 may be abbreviated as a PF 2110, and the IoT-GW 2120 may be abbreviated as a GW 2120.

In step S2101, a processing rule for a device is generated for the IoT-PF 2110 from a user terminal 240, and the generated rule is registered in association with prediction information such as a characteristic of a data format and the like and an application using device data, and stored on a history storage database 2150. When a device 230 is connected and a device ID and device data are transmitted from the IoT-GW 2120 to the IoT-PF 2110, the IoT-PF 2110 presumes, in step S2107, in addition to prediction information extracted from the device data and the like, an application using the device data, based on the prediction information, guesses a processing rule for the device data, and executes temporal association.

The IoT-PF 2110 registers, in step S2115, a processing rule on a processing rule management table 2160 in association with a device ID and an application using device data thereof, based on a registration instruction from the user terminal 240, and the IoT-GW 2120 registers, in step S2119, the processing rule on a processing rule registration table 2170 in association with the device ID and the application using device data thereof.

When receiving acquired data from the device 230, in step S2123, the IoT-GW 2120 refers to the processing rule registration table 2170 and executes processing in accordance with the registered processing rule in association with a device ID and an application using device data thereof. While not illustrated in FIG. 21, device data processed in accordance with a processing rule are provided to an application using the device data via the IoT-PF 2110 from the IoT-GW 2120.

(History Storage Database)

Figure 22A:
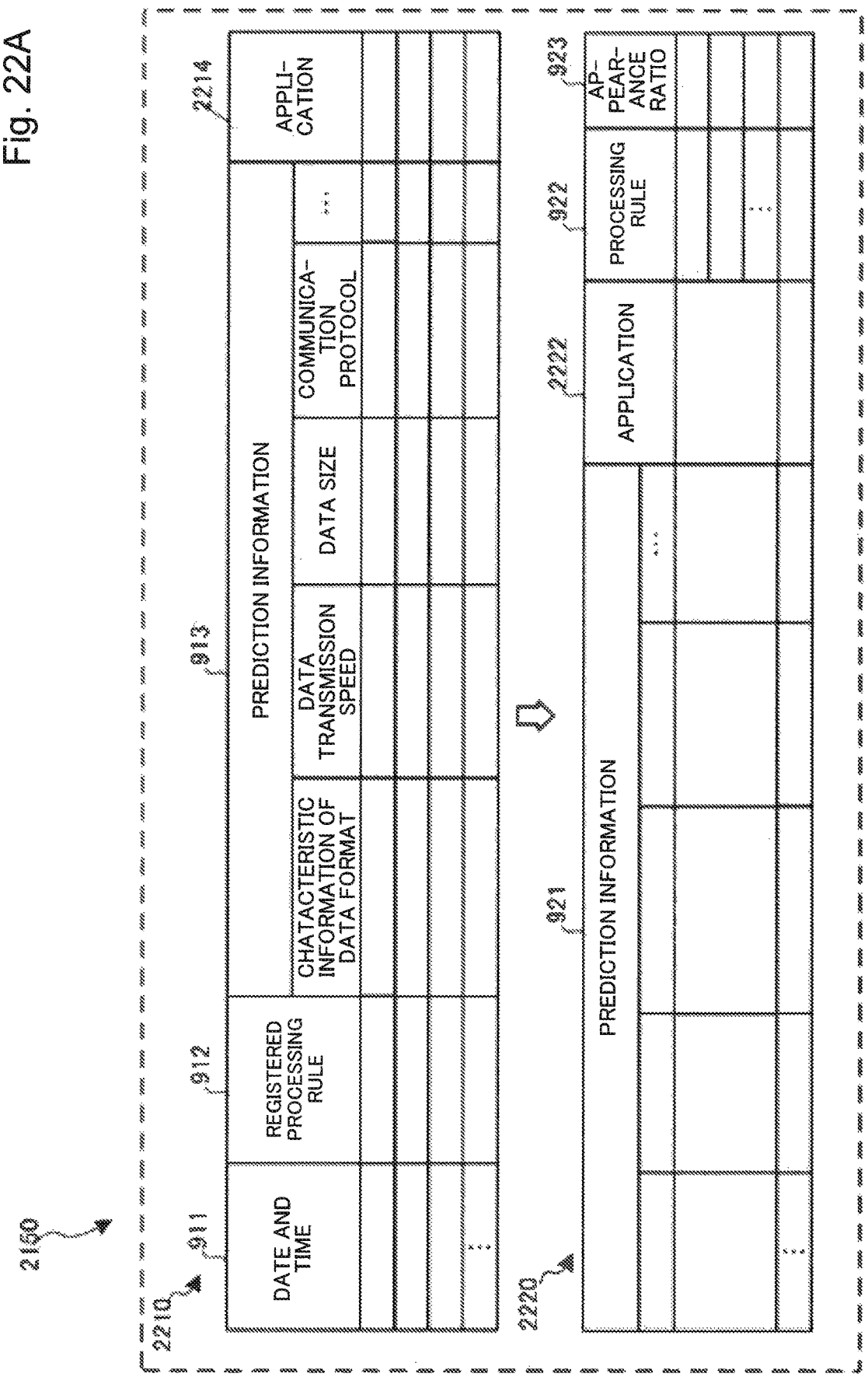
FIG. 22A is a diagram illustrating a configuration of a history storage database according to the fifth example embodiment of the present invention.

FIG. 22A is a diagram illustrating a configuration of the history storage database 2150 according to the present example embodiment. The history storage database 2150 is used for storing a history of a relationship between prediction information and a processing rule and predicting a processing rule to be set and registered for a new device and an application using device data thereof. The history storage database 2150 includes a history storage area 2210 that stores a history of a relationship between prediction information and a processing rule and a prediction table 2220 for predicting a processing rule for a device from a history stored on the history storage area 2210. In FIG. 22A, a component similar to a component in FIG. 9 is assigned with the same reference number, and thereby overlapping description is omitted.

The history storage area 2210 stores an application 2214 using device data in association with a data and time 911, a processing rule 912, and prediction information 913. The prediction table 2220 stores a processing rule 922 and an appearance ratio thereof 923 in association with prediction information 921 and an application 2222 using device data thereof.

(Processing Rule Prediction Table)

Figure 22B:
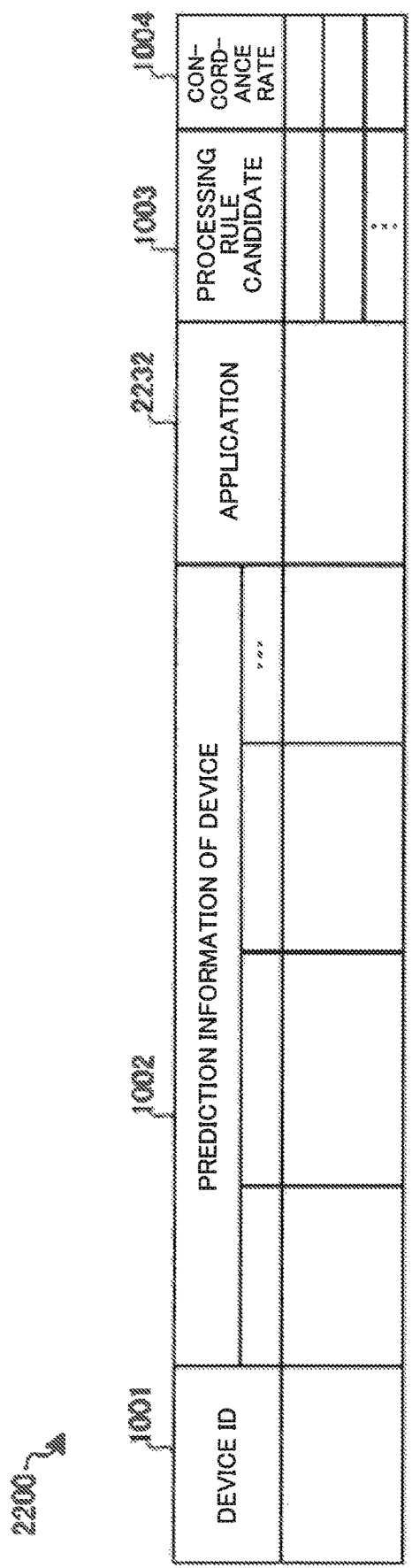
FIG. 22B is a diagram illustrating a configuration of a processing rule prediction table according to the fifth example embodiment of the present invention.

FIG. 22B is a diagram illustrating a configuration of the processing rule prediction table 2220 according to the present example embodiment. The processing rule prediction table 2220 is used for predicting a processing rule candidate, corresponding to prediction information of a device and an application using device data thereof. In FIG. 22B, an element similar to an element in FIG. 10 is assigned with the same reference number, and thereby overlapping description is omitted.

The processing rule prediction table 2220 stores a plurality of processing rule candidates 1003 and concordance rates thereof 1004 in association with a device ID 1001, prediction information 1002 of a device, and an application (or an application ID) 2232.

(Processing Rule Management Table/Processing Rule Registration Table)

Figure 22C:
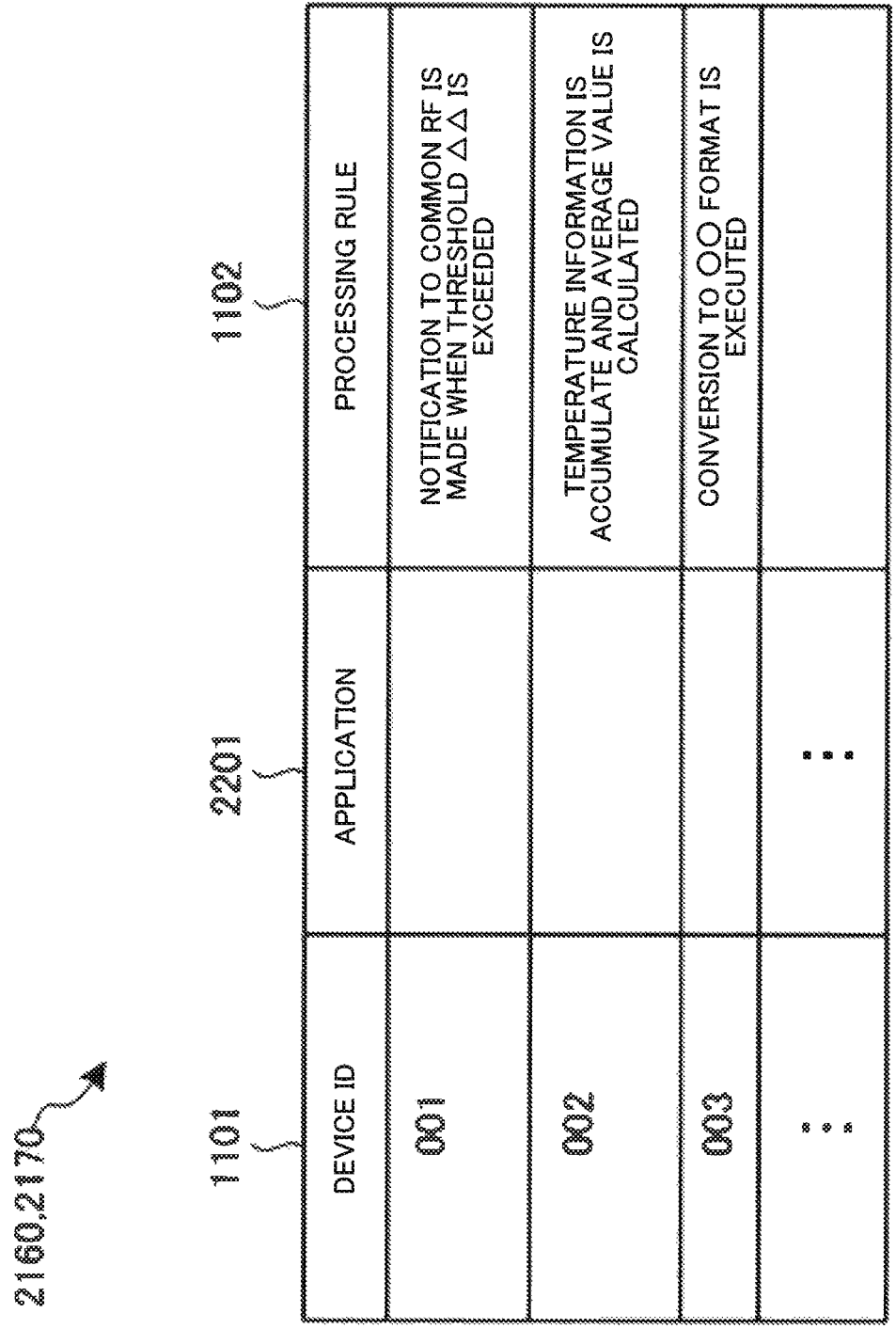
FIG. 22C is a diagram illustrating a configuration of a processing rule management table/a processing rule registration table according to the fifth example embodiment of the present invention.

FIG. 22C is a diagram illustrating a configuration of a processing rule management table 2160/a processing rule management table 2170 according to the present example embodiment. The processing rule management table 2160/ the processing rule registration table 2170 is used for storing a processing rule corresponding to a device ID and an application and processing data from a connected device.

The processing rule management table 2160/the processing rule registration table 2170 stores an application (or an application ID) 2201 using device data and a processing rule 1102 in association with a device ID 1101.

In the present example embodiment, the processing rule management table 2160 registers a processing rule 1102 covering a plurality of gateways in association with a device ID 1101 and an application 2201. Therefore, it is possible that, in association with a set of the same device ID 1101 and a different application 2201, a different processing rule 1102 is registered, and in association with a set of a different device ID 1101 and the same application 2201, a processing rule 1102 associated according to an application is registered. On the other hand, the processing rule registration table 2170 registers a processing rule 1102 corresponding to one gateway in association with a device ID 1101 and an application 2201 using the device. Therefore, when device data of one device connected to one gateway are not used by a plurality of applications, different applications 2210 are not registered for one device ID 1101. However, when device data of one device connected to one gateway are used by a plurality of applications, different applications 2201 may be registered for one device ID 1101. In association with a set of a different device ID 1101 and the same application 2210, for example, as in the fourth example embodiment, an associated processing rule 1102 may be registered.

<<Processing Procedure of a Platform>>

Figure 23:
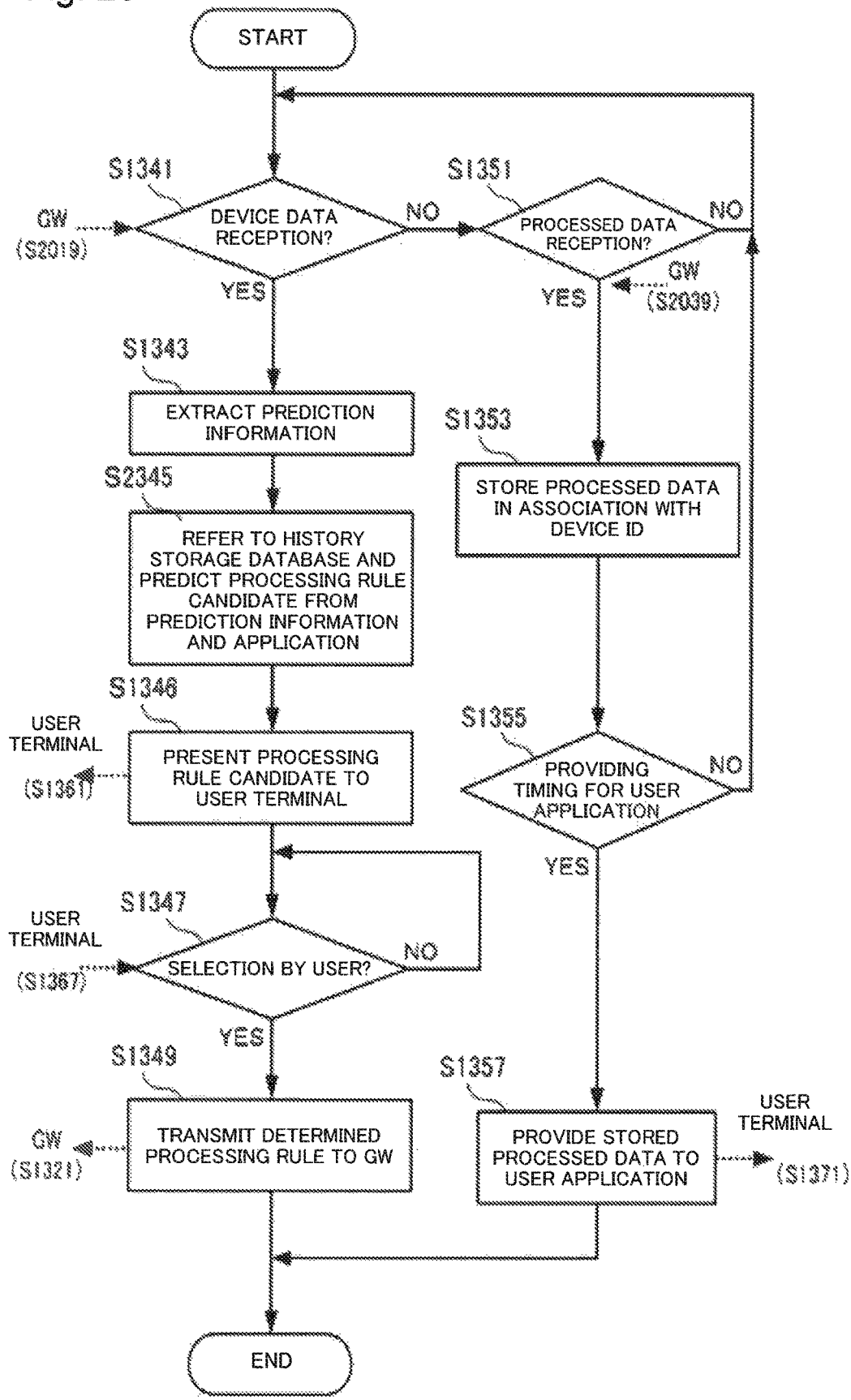
FIG. 23 is a flowchart illustrating a processing procedure of a platform included in the information processing apparatus according to the fifth example embodiment of the present invention.

FIG. 23 is a flowchart illustrating a processing procedure of a platform (the PF2110) included in the information processing apparatus according to the present example embodiment. This flowchart is executed using the RAM 1241 by the CPU 1211 in FIG. 12A and realizes the function configuring units of the PF 2110 in FIG. 21. In FIG. 23, a step similar to a step in FIG. 13B is assigned with the same step number, and thereby overlapping description is omitted. In FIG. 23, illustration of a flowchart relating to input of a processing rule from the user terminal 240 executed by a user is omitted.

The PF 2110 refers to the history storage database 2150 and predicts a processing rule candidate from prediction information and an application using device data thereof in step S2345.

While description of details of a processing procedure of the GW 2120 in the present example embodiment is omitted in order to avoid overlapping, for example, in step S1335 in FIG. 13A, an application to be provided with further received device data is acquired and in step S1339, processed data are transmitted to the acquired application.

According to the present example embodiment, a relationship between a data characteristic and a communication characteristic of a device and an application is stored on an IoT-PF, and the IoT-PF predicts or sets a processing rule for a device and an application, and therefore association information associated with characteristics included in a device and an application can be registered and connection of a device can be simplified.

Sixth Example Embodiment

Next, an information processing system including an information processing apparatus according to a sixth example embodiment of the present invention is described. The information processing system including the information processing apparatus according to the present example embodiment is different in a point that an appropriate processing rule for a device is set based on, in addition to characteristic information (prediction information) of a device, an IoT-gateway (GW) connected to the device, compared with the second to fifth example embodiments. In other words, in the present example embodiment, in an information processing system connected with a plurality of gateways, a processing rule for device data in a gateway is registered in association with a gateway connected with the device. Therefore, it is possible that device data from the same device are used by being processed with different processing rules, depending on a gateway to which a device is connected. Other components and operations are similar to corresponding components and operations of the second to fifth example embodiments, and therefore the same component and operation are assigned with the same reference signs, respectively and detailed description thereof is omitted.

(Operation Sequence of the Information Processing System)

Figure 24:
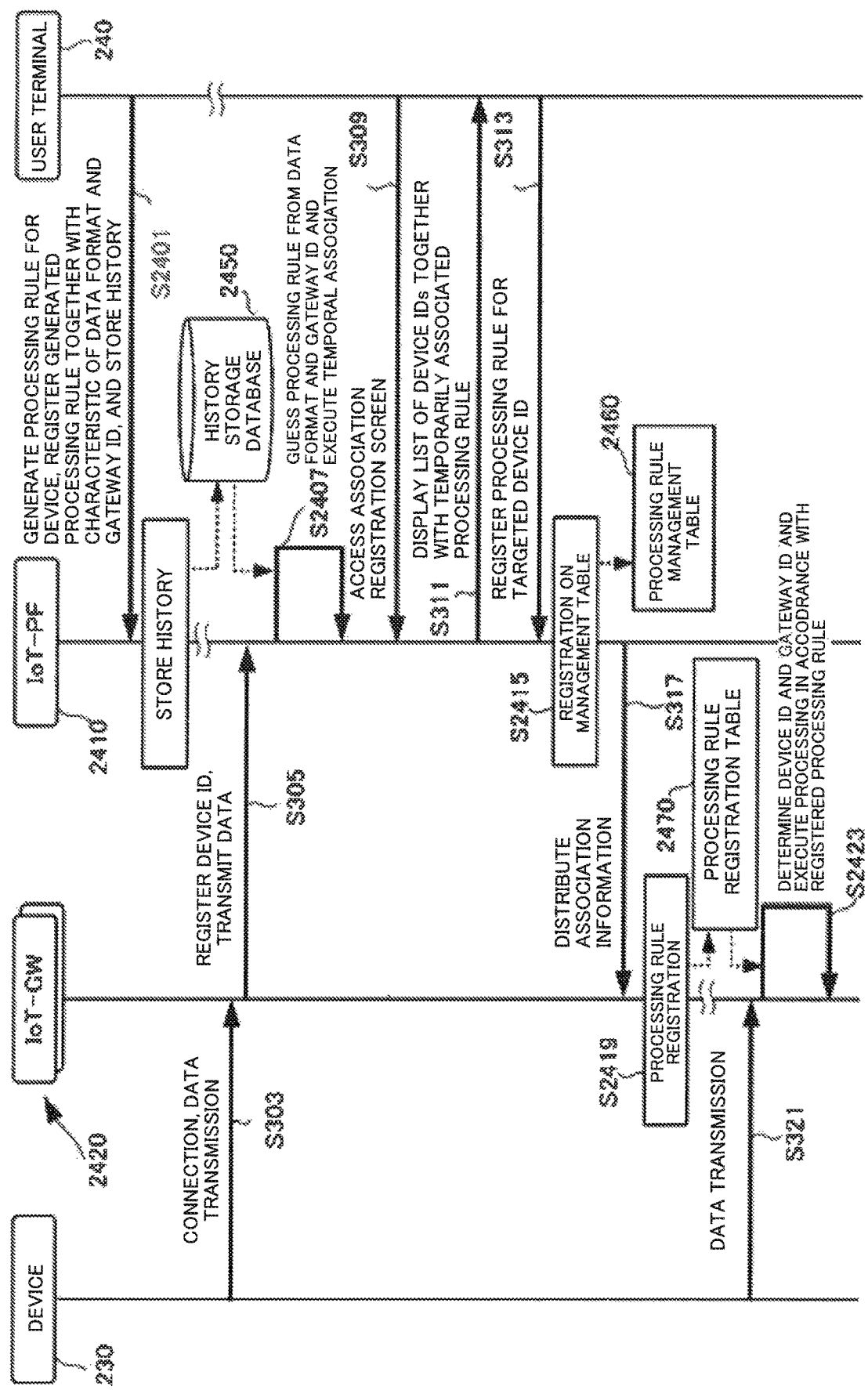
FIG. 24 is a sequence diagram illustrating an operation procedure of a main configuration of an information processing system including an information processing apparatus according to a sixth example embodiment of the present invention.

FIG. 24 is a sequence diagram illustrating an operation procedure of a main configuration of the information processing system including the information processing apparatus according to the present example embodiment. In FIG. 24, a step and a component similar to a step and a component in FIG. 3 are assigned with the same step number and reference number, and thereby overlapping description is omitted. In the present example embodiment, while an IoT-GW 2420 indicates a plurality of gateways, an IoT-PF 2410 may be a plurality of platforms. The IoT-PF 2410 may be abbreviated as a PF 2410, and the IoT-GW 2420 may be abbreviated as a GW 2420.

In step S2401, a processing rule for a device is generated for the IoT-PF 2410 from a user terminal 240 and the generated rule is registered together with a characteristic of a data format and a gateway ID connected with the device, and a history is stored on a history storage database 2450. When a device 230 is connected and a device ID and device data are transmitted from the IoT-GW 2420 to the IoT-PF 2410, the IoT-PF 2410 guesses, in step S2407, a processing rule from a data format and a gateway ID connected with the device and executes temporal association.

The IoT-PF 2410 registers, in step S2415, a processing rule on a processing rule management table 2460 in association with a device ID and a gateway ID of a gateway to which the device is connected, and the IoT-GW 2420 registers, in step S2419, the processing rule on a processing rule registration table 2470 in association with the device ID and the gateway ID of a gateway to which the device is connected.

When receiving acquired data from a device 230, the IoT-GW 2420 refers to the processing rule registration table 2470, determines a device ID and a gateway ID, and executes processing in accordance with a registered processing rule in step S2423.

(History Storage Database)

Figure 25A:
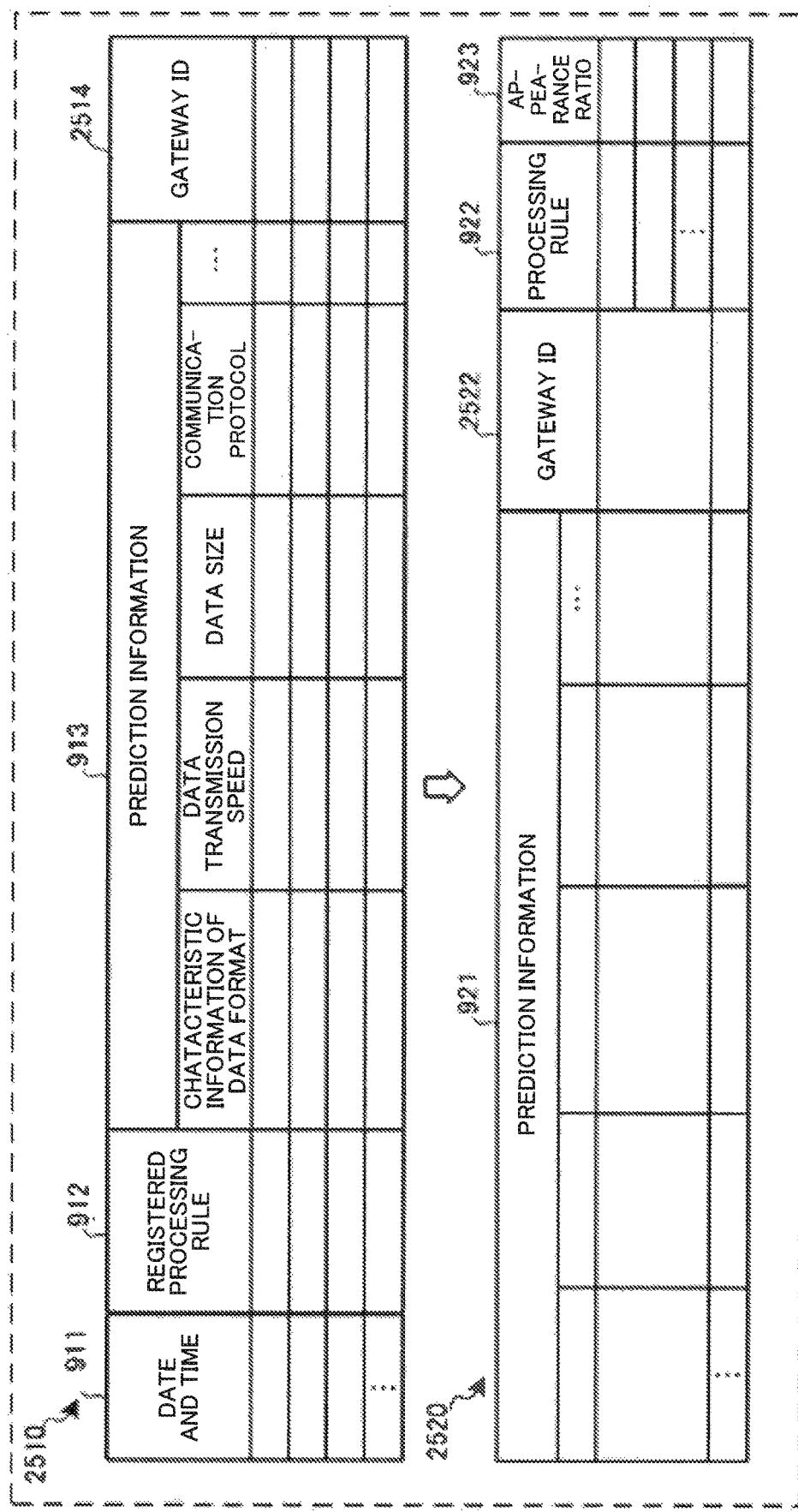
FIG. 25A is a diagram illustrating a configuration of a history storage database according to the sixth example embodiment of the present invention.

FIG. 25A is a diagram illustrating a configuration of the history storage database 2450 according to the present example embodiment. The history storage database 2450 is used for storing a history of a relationship between prediction information and a processing rule and predicting a processing rule to be set and registered for a new device and a gateway connected with the device. The history storage database 2450 includes a history storage area 2510 that stores a history of a relationship between prediction information and a processing rule and a prediction table 2520 for predicting a processing rule for a device from a history stored on the history storage area 2510. In FIG. 25A, a component similar to a component in FIG. 9 is assigned with the same reference number, and thereby overlapping description is omitted.

The history storage area 2510 stores a gateway ID 2514 of a gateway to which a device is connected in association with a date and time 911, a processing rule 912, and prediction information 913. The prediction table 2520 stores a processing rule 922 and an appearance ratio thereof 923 in association with prediction information 921 and a gateway ID 2522 of a gateway to which the device is connected.

(Processing Rule Prediction Table)

FIG. 25B is a diagram illustrating a configuration of a processing rule prediction table 2500 according to the present example embodiment. The processing rule prediction table 2500 is used for predicting a processing rule candidate corresponding to prediction information of a device and a gateway connected to the device. In FIG. 25B, an element similar to an element in FIG. 10 is assigned with the same reference number, and thereby overlapping description is omitted.

The processing rule prediction table 2500 stores a plurality of processing rule candidates 1003 and concordance rates thereof 1004 in association with a device ID 1001, prediction information 1002 of a device, and a gateway ID 2532 of a gateway to which the device is connected.

(Processing Rule Management Table/Processing Rule Registration Table)

Figure 25C:
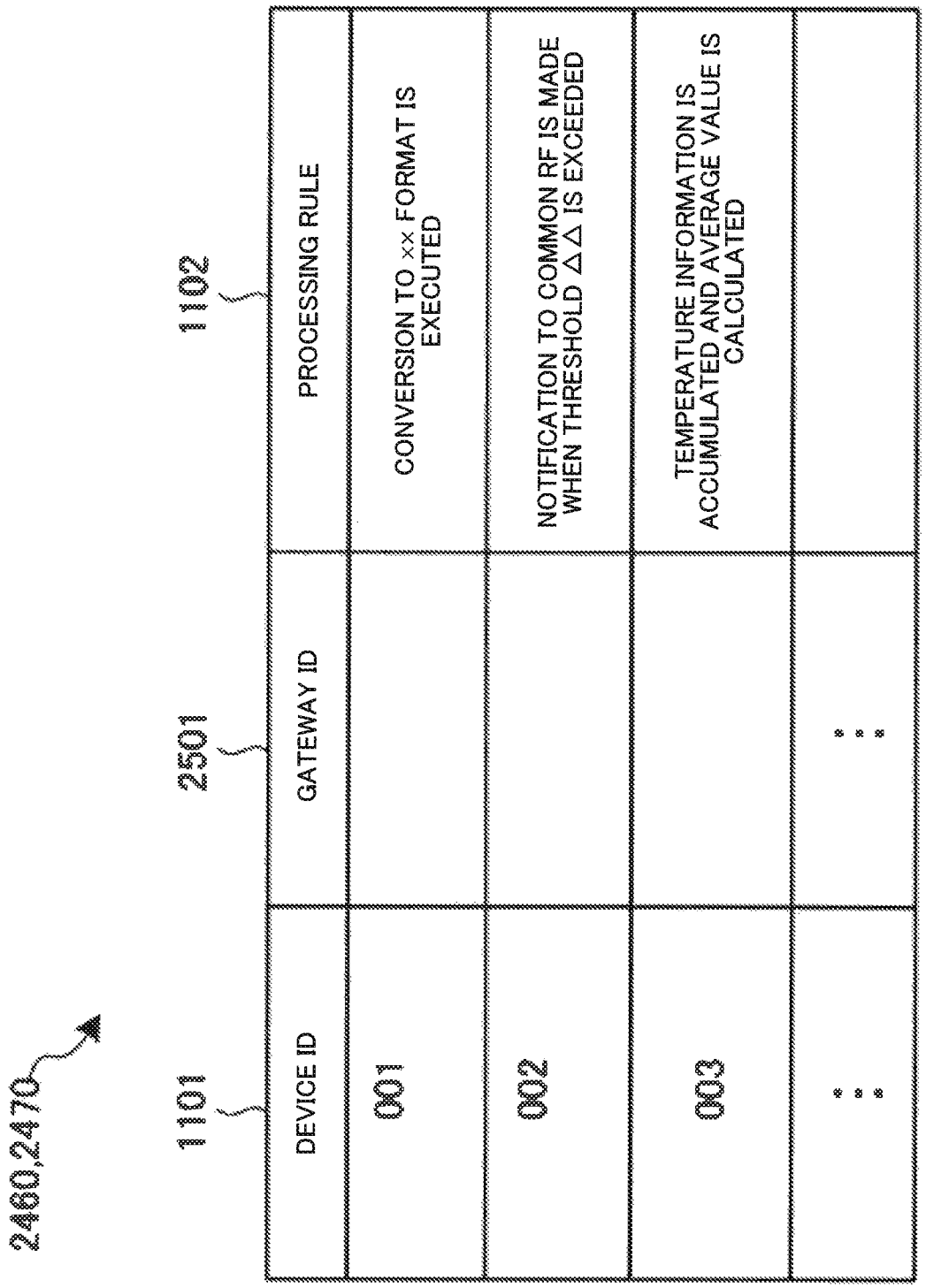
FIG. 25C is a diagram illustrating a configuration of a processing rule management table/a processing rule registration table according to the sixth example embodiment of the present invention.

FIG. 25C is a diagram illustrating a configuration of a processing rule management table 2460/the processing rule registration table 2470 according to the present example embodiment. The processing rule management table 2460/the processing rule registration table 2470 is used for storing a processing rule corresponding to a device ID and a gateway ID of a gateway to which the device is connected, and processing data from the connected device.

The processing rule management table 2460/the processing rule registration table 2470 stores a processing rule 1102 in association with a device ID 1101 and a gateway ID 2501 of a gateway to which the device is connected.

The processing rule management table 2460 registers a processing rule 1102 covering a plurality of gateways in association with a device ID 1101 and a gateway ID 2501. Therefore, it is possible that a different processing rule 1102 is registered in association with a set of the same device ID 1101 and a different gateway ID 2501 and an associated processing rule 1102 is registered, as in the fourth example embodiment, in association with a set of a different device ID 1101 and the same gateway ID 2501. On the other hand, the processing rule registration table 2470 registers a processing rule 1102 corresponding to one gateway in association with a device ID 1101 and a gateway ID 2501. Therefore, the processing rule registration table 2470 does not register another gateway ID 2501. When another gateway ID 2501 is registered on the processing rule registration table 2470, an associated processing rule is not used. An associated processing rule 1102 may be registered, as in the fourth example embodiment, in association with a different device ID 1101.

<<Processing Procedure of a Platform>>

Figure 26:
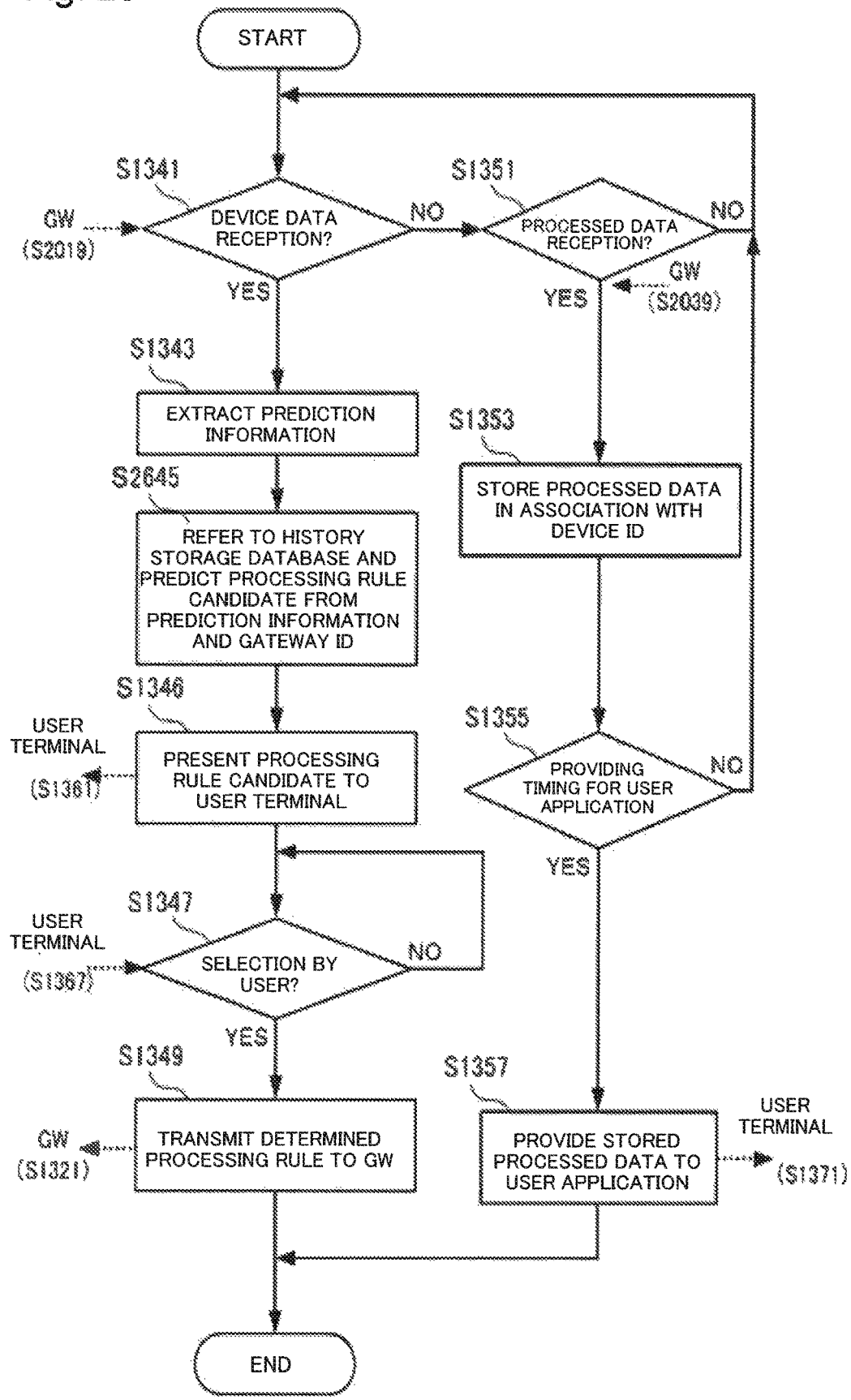
FIG. 26 is a flowchart illustrating a processing procedure of a platform included in the information processing apparatus according to the sixth example embodiment of the present invention.

FIG. 26 is a flowchart illustrating a processing procedure of the platform (the PF 2410) included in the information processing apparatus according to the present example embodiment. This flowchart is executed using the RAM 1241 by the CPU 1211 in FIG. 12A and realizes the function configuring units of the PF 2410 in FIG. 24. In FIG. 26, a step similar to a step in FIG. 13B is assigned with the same step number, and thereby overlapping description will be omitted. In FIG. 26, illustration of a flowchart relating to input of a processing rule from the user terminal 240 executed by a user is omitted.

The PF 2410 refers to the history storage database 2450 and predicts a processing rule candidate from prediction information and a gateway ID in step S2645.

While description of details of a processing procedure of the GW 2420 in the present example embodiment is omitted in order to avoid overlapping, for example, in step S1335 in FIG. 13A, a set of a connected device ID and a gateway ID is further confirmed, and when the set is confirmed, a processing rule associated with the device ID and the gateway ID is executed.

According to the present example embodiment, a relationship between a data characteristic and a communication characteristic of a device and a connected gateway is stored on an IoT-PF, and the IoT-PF predicts or sets a processing rule for a device and a gateway, and therefore association information associated with characteristics included in a device and a gateway can be registered and connection of a device can be simplified.

Seventh Example Embodiment

Next, an information processing system including an information processing apparatus according to a seventh example embodiment of the present invention is described.

The information processing system including the information processing apparatus according to the present example embodiment is different in a point that an IoT-gateway (GW) or an IoT-platform (PF) collectively predicts, sets, and executes a processing rule for a device, compared with the second to sixth example embodiments. Other components and operations are similar to corresponding components and operations of the second to sixth example embodiments, and therefore the same component and operation are assigned with the same reference signs, respectively and detailed description thereof is omitted. Specifically, a processing rule management table that manages a processing rule is not necessarily included in a common PF, and each gateway may include the processing rule management table. Alternatively, a different function may be further distributed to a common PF and a GW.

<<Information Processing System>>

Figure 27A:
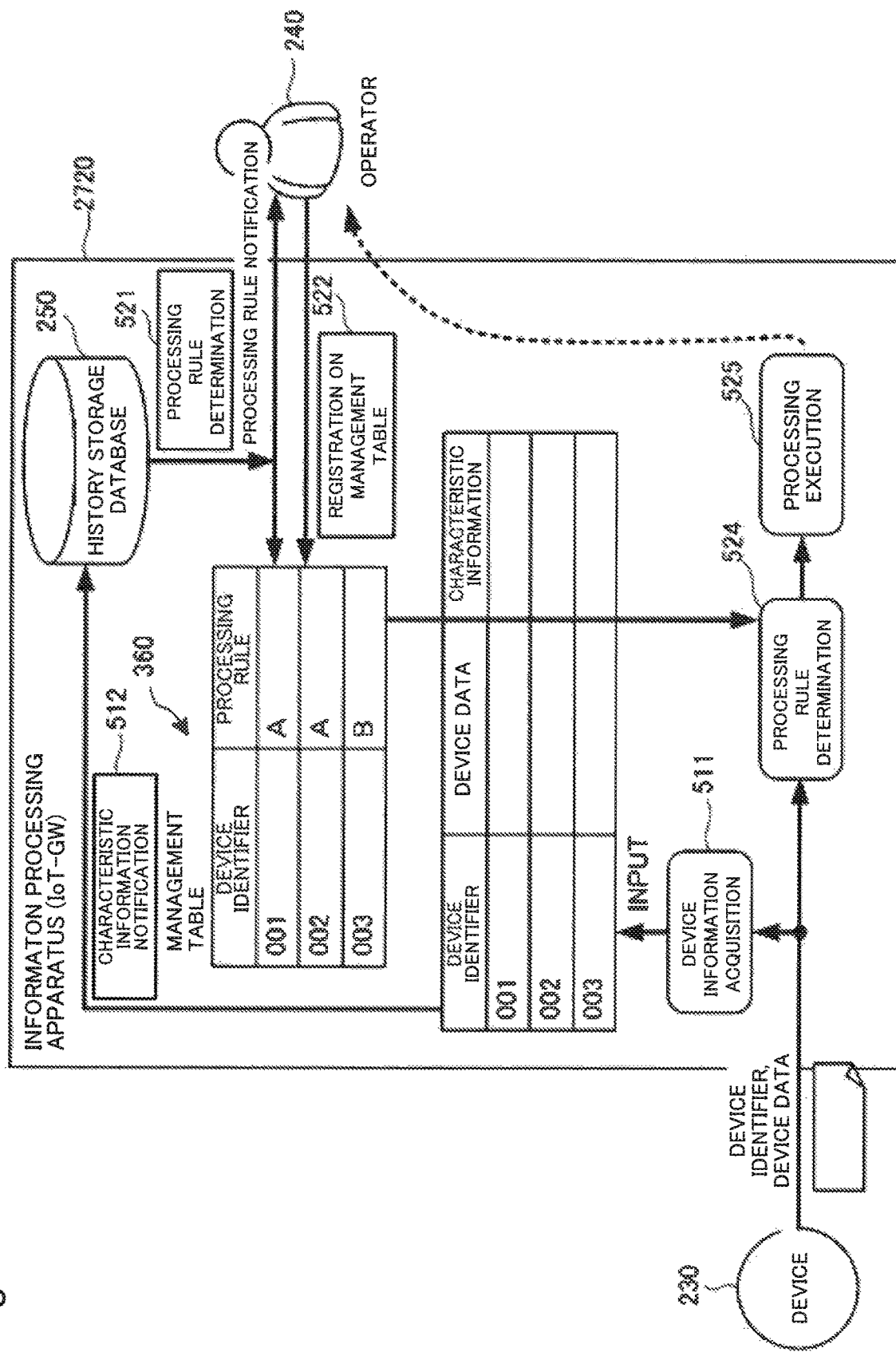
FIG. 27A is a block diagram illustrating a main configuration of an information processing system including an information processing apparatus according to a seventh example embodiment of the present invention.

FIG. 27A is a block diagram illustrating a main configuration of an information processing system including an information processing apparatus 2720 according to the present example embodiment. In FIG. 27A, the information processing apparatus 2720 is an IoT-GW. A component in FIG. 27A is equal to each component assigned with the same reference number in FIG. 5A and FIG. 5B. In FIG. 27A, a content of a processing rule management table 360 is used as a processing rule for data received from a device without a change.

<<Another Processing System>>

Figure 27B:
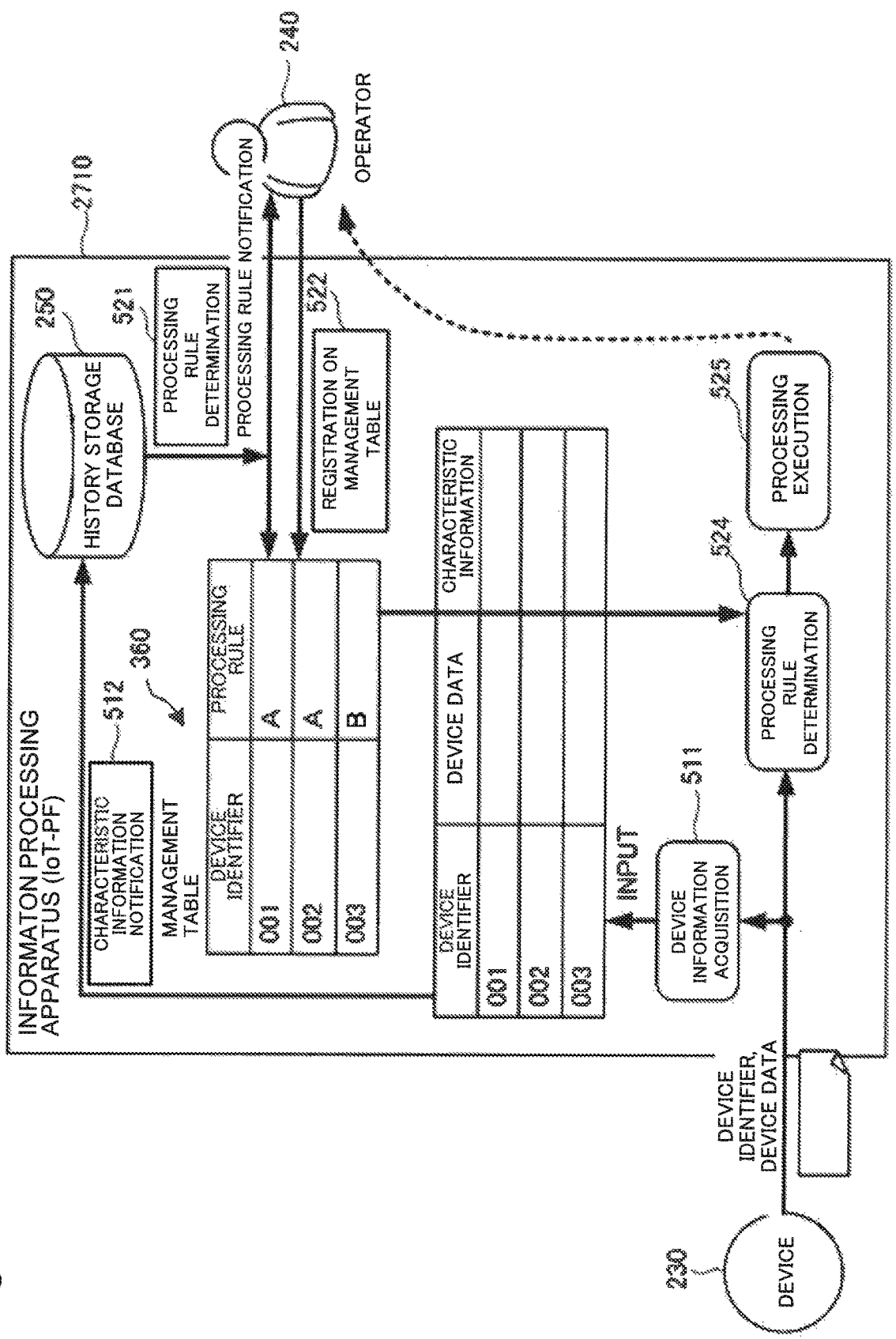
FIG. 27B is a block diagram illustrating a main configuration of another information processing system including the information processing apparatus according to the seventh example embodiment of the present invention.

FIG. 27B is a block diagram illustrating a main configuration of another information processing system including an information processing apparatus 2710 according to the present example embodiment. In FIG. 27B, the information processing apparatus 2710 is an IoT-PF. A component in FIG. 27B is equal to each component assigned with the same reference number in FIG. 5A and FIG. 5B. In FIG. 27B, a content of a processing rule management table 360 is used as a processing rule for data received from a device without a change.

According to the present example embodiment, it is possible to provide a common PF or a GW integrally including a function of storing a data characteristic and a communication characteristic of a device and predicting or setting a processing rule and a function of processing data of a connected device in accordance with a set processing rule. Even when a different function is further distributed to a common PF and a GW, a similar advantageous effect can be produced.

Another Example Embodiment

In the present example embodiment, a key of a processing rule management table that manages a processing rule or a processing rule registration table that registers a processing table is an identifier (device ID) capable of identifying a device and may not necessarily be a MAC address used in the example embodiments, and an identifier (device ID) capable of uniquely identifying a device is specifically preferable as the key.

The present example embodiment is widely applicable to a system that connects a sensor or an actuator as a device to an IoT-GW via a network and executes data collection from the device, data processing, data storage, data providing, device control and device management and services of the system.

A transmission/reception interface between a device and a gateway (GW) of the present example embodiment is not specified or limited. Applications to, as examples, file transfer by a protocol such as a file transfer protocol (FTP)/a secure copy protocol (SCP) and the like and streaming transfer of a voice and a video are possible.

While the present invention is described with reference to example embodiments, the present invention is not limited to the example embodiments. The constitution and details of the present invention may be subjected to various modifications which can be understood by those skilled in the art, without departing from the scope of the present invention. A system or a device obtained through any combination of different features included in the example embodiments is also included in the scope of the present invention.

The present invention may be applied to a system including a plurality of apparatuses and may be applied to a single apparatus. The present invention is applicable to a case where an information processing program that realizes a function of an example embodiment is supplied directly or remotely to a system or an apparatus. Therefore, for realizing a function of the present invention by a computer, a program installed on a computer, a medium storing the program, and a world wide web (WWW) server for downloading the program are also included in the scope of the present invention. In particular, a non-transitory computer readable medium storing a program that causes a computer to execute processing steps included in the above-described example embodiments is at least included in the scope of the present invention.

Other Expressions of Example Embodiments

A part or the whole of the exemplary embodiments can be described as the following supplementary notes, but not limited thereto.
(Supplementary Note 1)
An information processing apparatus comprising:
storage means for storing a history of a relationship between device data received from a device and a processing rule registered for the device;
prediction means for referring to, when a processing rule for processing a connected device is not registered, the history and predicting a processing rule for the connected device, based on device data received from the connected device; and
registration means for registering the processing rule predicted by the prediction means in association with identification information of the connected device.
(Supplementary Note 2)
The information processing apparatus according to supplementary note 1, further comprising:
presentation means for presenting the processing rule predicted by the prediction means, to a user; and
reception means for receiving a registration instruction for the presented processing rule made by the user, wherein
the registration means registers the processing rule in accordance with the received registration instruction.
(Supplementary Note 3)
The information processing apparatus according to supplementary note 1 or 2, further comprising device processing means for processing the connected device in accordance with the processing rule registered on the registration means in association with the identification information of the connected device.
(Supplementary Note 4)
The information processing apparatus according to any one of supplementary notes claims 1 to 3, wherein the storage means stores, with respect to the device data, a history of a relationship between prediction information for predicting the processing rule and the processing rule, and
the prediction information includes at least one of characteristic information of a data format, a data transmission frequency, a size of data, or a communication protocol.
(Supplementary Note 5)
The information processing apparatus according to supplementary note 4, wherein the characteristic information of a data format includes at least one of a character type, a number of characters, a number of rows, a number of columns, or a delimiter.
(Supplementary Note 6)
The information processing apparatus according to any one of supplementary notes 1 to 5, further comprising a gateway connected with a plurality of device groups, and a platform being connected to a plurality of the gateways and controlling the plurality of device groups, wherein
the storage means and the prediction means are included in the platform, and
the registration means is included in the gateway.
(Supplementary Note 7)
The information processing apparatus according to supplementary note 6, wherein
the storage means is included in the platform and stores a history of a relationship among a gateway connected with the device, the device data, and the processing rule, and
the prediction means is included in the platform, and refers to the history and predicts a processing rule for the connected device, based on the gateway and the device data.
(Supplementary Note 8)
The information processing apparatus according to any one of supplementary notes 1 to 6, wherein
the storage means stores a history of a relationship among a plurality of pieces of the device data, an application executed by a plurality of the devices, and the processing rule, and
the prediction means refers to the history and predicts a processing rule for a plurality of the connected devices, based on the plurality of pieces of device data and the application.
(Supplementary Note 9)
The information processing apparatus according to any one of supplementary notes 1 to 6, wherein
the storage means stores a history of a relationship among an application provided by a user, the device data, and the processing rule, and
the prediction means refers to the history and predicts a processing rule for the connected device, based on the application and the device data.
(Supplementary Note 10)
The information processing apparatus according to any one of supplementary notes 1 to 9, wherein identification information of the device is an identifier that uniquely identifies the device, and the identifier includes a MAC address.
(Supplementary Note 11)
A control method for an information processing apparatus, the method comprising:
a storage step of storing a history of a relationship between device data received from a device and a processing rule registered for the device, on storage means;
a prediction step of referring to, when a processing rule for processing a connected device is not registered, the history and predicting a processing rule for the connected device, based on device data received from the connected device; and a registration step of registering the processing rule predicted in the prediction step on registration means in association with identification information of the connected device.

(Supplementary Note 12)

A control program for an information processing apparatus, the program causing a computer to execute:

a storage step of storing a history of a relationship between device data received from a device and a processing rule registered for the device, on storage means;

a prediction step of referring to, when a processing rule for processing a connected device is not registered, the history and predicting a processing rule for the connected device, based on device data received from the connected device; and a registration step of registering the processing rule predicted in the prediction step on registration means in association with identification information of the connected device.

(Supplementary Note 13)

A communication terminal comprising:

candidate reception means for receiving, from an information processing apparatus, a candidate for a processing rule corresponding to identification information of a connected device, the candidate being predicted, based on device data received from the connected device, by referring to a history of a relationship between the device data stored on the information processing apparatus and a processing rule for the device;

display means for displaying the received candidate for the processing rule in such a way as to enable a user to make a registration instruction; and notification means for accepting the registration instruction made by the user and notifying the information processing apparatus of a processing rule to be registered on registration means in association with the identification information of the connected device.

(Supplementary Note 14)

The communication terminal according to supplementary note 13, wherein the display means displays a plurality of rule candidates for the processing rule or a plurality of parameter candidates included in the processing rule in such a way as to enable a user to make a registration instruction.

(Supplementary Note 15)

A control method for a communication terminal, the method comprising:

a candidate reception step of receiving, from an information processing apparatus, a candidate for a processing rule corresponding to identification information of a connected device, the candidate being predicted, based on device data received from the connected device, by referring to a history of a relationship between the device data stored on the information processing apparatus and a processing rule for the device;

a display step of displaying the received candidate for the processing rule on display means in such a way as to enable a user to make a registration instruction; and a notification step of accepting the registration instruction made by the user and notifying the information processing apparatus of a processing rule to be registered on registration means in association with the identification information of the connected device.

(Supplementary note 16)

A control program for a communication terminal, the program causing a computer to execute:

a candidate reception step of receiving, from an information processing apparatus, a candidate for a processing rule corresponding to identification information of a connected device, the candidate being predicted, based on device data received from the connected device, by referring to a history of a relationship between the device data stored on the information processing apparatus and a processing rule for the device;

a display step of displaying the received candidate for the processing rule on display means in such a way as to enable a user to make a registration instruction; and a notification step of accepting the registration instruction made by the user and notifying the information processing apparatus of a processing rule to be registered on registration means in association with the identification information of the connected device.

(Supplementary Note 17)

An information processing system comprising:

storage means for storing a history of a relationship between device data received from a device and a processing rule registered for the device;

prediction means for referring to, when a processing rule for processing a connected device is not registered, the history and predicting a processing rule for the connected device, based on device data received from the connected device;

presentation means for presenting the processing rule predicted by the prediction means to a user:

registration instruction means for accepting a registration instruction for the presented processing rule made by the user;

registration means for registering the processing rule predicted by the prediction means in association with identification information of the connected device in accordance with the accepted registration instruction; and device processing means for processing the connected device in accordance with a processing rule registered on the registration means in association with the identification information of the connected device.

(Supplementary Note 18)

A device registration method comprising:

a storage step of storing a history of a relationship between device data received from a device and a processing rule registered for the device, on storage means;

a prediction step of referring to, when a processing rule for processing a connected device is not registered, the history and predicting a processing rule for the connected device, based on device data received from the connected device;

a presentation step of presenting the processing rule predicted in the prediction step to a user:

a registration instruction step of accepting a registration instruction for the presented processing rule made by the user;

a registration step of registering the processing rule predicted in the prediction step on registration means in association with identification information of the connected device in accordance with the accepted registration instruction; and a device processing step of processing the connected device in accordance with a processing rule registered on the registration means in association with the identification information of the connected device.

This application is based upon and claims the benefit of priority from Japanese patent application No. 2016-007354, filed on Jan. 18, 2016, the disclosure of which is incorporated herein in its entirety by reference.

What is claimed is:

1. An information processing apparatus comprising:
a storage which stores a history of a relationship among device data received from a device, and application provided by a user, and a processing rule registered for the device;
at least one memory storing a computer program; and
at least one processor configured to execute the computer program to:
when a processing rule for processing a connected device is not registered, refer to the history and predict a processing rule for the connected device, based on the application and device data received from the connected device; and
register the processing rule predicted in association with identification information of the connected device.

2. The information processing apparatus according to claim 1, wherein the processor is configured to execute the computer program to
present the processing rule predicted to a user;
receive a registration instruction for the presented processing rule made by the user; and
register the processing rule in accordance with the received registration instruction.

3. The information processing apparatus according claim 1, wherein the processor is configured to execute the computer program to process the connected device in accordance with the processing rule registered in association with the identification information of the connected device.

4. The information processing apparatus according to claim 1, wherein
the storage stores, with respect to the device data, a history of a relationship between prediction information for predicting the processing rule and the processing rule, and
the prediction information includes at least one of characteristic information of a data format, a data transmission frequency, a size of data, or a communication protocol.

5. The information processing apparatus according to claim 4, wherein the characteristic information of a data format includes at least one of a character type, a number of characters, a number of rows, a number of columns, or a delimiter.

6. The information processing apparatus according to claim 1, further comprising a gateway connected with a plurality of device groups, and a platform being connected to a plurality of the gateways and controlling the plurality of device groups, wherein
the storage is included in the platform,
the platform, when a processing rule for processing a connected device is not registered, refers to the history and predicts a processing rule for the connected device, based on the application and device data received from the connected device, and
the gateway registers the processing rule predicted by the prediction unit in association with identification information of the connected device.

7. The information processing apparatus according to claim 6, wherein
the storage is included in the platform and stores a history of a relationship among a gateway connected with the device, the device data, and the processing rule, and
the platform refers to the history and predicts a processing rule for the connected device, based on the gateway and the device data.

8. The information processing apparatus according to claim 1, wherein
the storage stores a history of a relationship among a plurality of pieces of the device data, an application executed by a plurality of the devices, and the processing rule, and
to the processor is configured to execute the computer program to refer to the history and predict a processing rule for a plurality of the connected devices, based on the plurality of pieces of device data and the application.

9. The information processing apparatus according to claim 1, wherein identification information of the device is an identifier that uniquely identifies the device, and the identifier includes a MAC address.

10. A control method for an information processing apparatus, the method comprising:
a storage step of storing a history of a relationship among device data received from a device, an application provided by a user, and a processing rule registered for the device, on a storage;
a prediction step of referring to, when a processing rule for processing a connected device is not registered, the history and predicting a processing rule for the connected device, based on the application and device data received from the connected device; and
a registration step of registering the processing rule predicted in the prediction step on registration unit in association with identification information of the connected device.

11. A computer-readable non-transitory recording medium on which a control program for an information processing apparatus is recorded, the program causing a computer to execute:
a storage step of storing a history of a relationship among device data received from a device, an application provided by a user, and a processing rule registered for the device, on a storage;
a prediction step of referring to, when a processing rule for processing a connected device is not registered, the history and predicting a processing rule for the connected device, based on the application and device data received from the connected device; and
a registration step of registering the processing rule predicted in the prediction step on registration unit in association with identification information of the connected device.

12. An information processing system comprising:
a storage which stores a history of a relationship among device data received from a device, an application provided by a user, and a processing rule registered for the device;
at least one memory storing a computer program; and
at least one processor configured to execute the computer program to:
when a processing rule for processing a connected device is not registered, refer to the history and predict a processing rule for the connected device, based on the application and device data received from the connected device;
present the processing rule predicted to a user;
accept a registration instruction for the presented processing rule made by the user;

register the processing rule predicted in association with identification information of the connected device in accordance with the accepted registration instruction; and process the connected device in accordance with a processing rule registered in association with the identification information of the connected device.

13. A device registration method comprising:

a storage step of storing a history of a relationship among device data received from a device, an application provided by a user, and a processing rule registered for the device, on a storage;

a prediction step of referring to, when a processing rule for processing a connected device is not registered, the history and predicting a processing rule for the connected device, based on the application and device data received from the connected device;

a presentation step of presenting the processing rule predicted in the prediction step to a user;

a registration instruction step of accepting a registration instruction for the presented processing rule made by the user;

a registration step of registering the processing rule predicted in the prediction in association with identification information of the connected device in accordance with the accepted registration instruction; and a device processing step of processing the connected device in accordance with a processing rule registered in association with the identification information of the connected device.

* * * * *